US012574307B2

(12) United States Patent
Chrapko et al.

(10) Patent No.: US 12,574,307 B2
(45) Date of Patent: Mar. 10, 2026

(54) COMPUTING CLUSTER FOR PROVIDING VIRTUAL MARKERS BASED UPON NETWORK CONNECTIVITY

(71) Applicant: www.TrustScience.com Inc., Edmonton (CA)

(72) Inventors: Evan V Chrapko, Edmonton (CA); Leo M. Chan, Edmonton (CA)

(73) Assignee: WWW.TRUSTSCIENCE.COM INC., Edmonton (CA)

( * ) Notice: Subject to any disclaimer, the term of this patent is extended or adjusted under 35 U.S.C. 154(b) by 29 days.

(21) Appl. No.: 18/732,740

(22) Filed: Jun. 4, 2024

(65) Prior Publication Data

US 2025/0373528 A1 Dec. 4, 2025

Related U.S. Application Data

(63) Continuation of application No. 17/079,600, filed on Oct. 26, 2020, now abandoned, which is a (Continued)

(51) Int. Cl.
*H04L 43/0811* (2022.01)
*H04L 41/0893* (2022.01)

(52) U.S. Cl.
CPC ...... *H04L 43/0811* (2013.01); *H04L 41/0893* (2013.01)

(58) Field of Classification Search
CPC .. G06F 11/3006; G06F 16/285; G06F 9/5072; G06N 20/00; G06N 3/08;
(Continued)

(56) References Cited

U.S. PATENT DOCUMENTS

| 5,555,542 | A | 9/1996 | Ogura et al. |
| 5,832,494 | A | 11/1998 | Egger et al. |
| | | (Continued) | |

FOREIGN PATENT DOCUMENTS

| CA | 2600344 A1 | 9/2006 |
| CA | 2775899 A1 | 4/2011 |
| | (Continued) | |

OTHER PUBLICATIONS

Fernando et al. "Developing a Distributed Trust Model for Distributed Energy Resources." 2021 IEEE Conference on Technologies for Sustainability (SusTech). pp. 1-6. (Year: 2021).*

(Continued)

*Primary Examiner* — Christopher Biagini

(74) *Attorney, Agent, or Firm* — Amin, Turocy & Watson, LLP

(57) ABSTRACT

A system is provided wherein a processor in a distributed network system determines a network connectivity value associated with a computer in a network. The connectivity value is determined as a function of an aggregation of path scores of paths between the computer and a mobile device and also as a function of at least one of the path scores. Determining the connectivity value may be accomplished by distributing the tasks to distributed processors within one or more of a plurality of clusters of processors. The processors perform their respective computing task before reporting results. A virtual marker system for use within the network may be provided. Markers in the marker system may be provided based on network connectivity value.

10 Claims, 21 Drawing Sheets

100

Related U.S. Application Data continuation of application No. 16/661,182, filed on Oct. 23, 2019, now abandoned, which is a continuation of application No. 15/907,166, filed on Feb. 27, 2018, now abandoned, which is a continuation of application No. 13/824,324, filed as application No. PCT/CA2011/050569 on Sep. 16, 2011, now abandoned.

(60) Provisional application No. 61/383,583, filed on Sep. 16, 2010.

(58) Field of Classification Search
CPC ........ G06N 7/01; G06Q 20/06; G06Q 20/223; G06Q 20/389; G06Q 20/4016; G06Q 40/02; G06Q 40/03; G06Q 50/01; H04L 41/0893; H04L 41/12; H04L 43/0811; H04L 63/1425; H04L 63/20; H04L 67/10; H04L 67/535
See application file for complete search history.

(56) References Cited

U.S. PATENT DOCUMENTS

| | | | |
|---|---|---|---|
| 5,860,605 | A | 1/1999 | Van Der Zanden |
| 6,108,308 | A | 8/2000 | Flavin et al. |
| 6,233,571 | B1 | 5/2001 | Egger et al. |
| 6,286,007 | B1 | 9/2001 | Miller et al. |
| 6,356,902 | B1 | 3/2002 | Tan et al. |
| 6,446,048 | B1 | 9/2002 | Wells et al. |
| 6,509,898 | B2 | 1/2003 | Chi et al. |
| 6,633,886 | B1 | 10/2003 | Chong |
| 6,708,308 | B2 | 3/2004 | De Souza et al. |
| 6,738,777 | B2 | 5/2004 | Bliss et al. |
| 6,751,729 | B1 | 6/2004 | Giniger et al. |
| 6,823,299 | B1 | 11/2004 | Contreras |
| 7,010,471 | B2 | 3/2006 | Rosenberg |
| 7,069,259 | B2 | 6/2006 | Horvitz et al. |
| 7,086,085 | B1 | 8/2006 | Brown et al. |
| 7,130,262 | B1 | 10/2006 | Cortez et al. |
| 7,130,908 | B1 | 10/2006 | Pecus et al. |
| 7,139,837 | B1 | 11/2006 | Parekh et al. |
| 7,266,649 | B2 | 9/2007 | Yoshida et al. |
| 7,272,719 | B2 | 9/2007 | Bleckmann et al. |
| 7,451,365 | B2 | 11/2008 | Wang et al. |
| 7,458,049 | B1 | 11/2008 | Tuncer et al. |
| 7,512,612 | B1 | 3/2009 | Akella et al. |
| 7,539,697 | B1 | 5/2009 | Akella et al. |
| 7,664,802 | B2 | 2/2010 | Aaltonen et al. |
| 7,668,665 | B2 | 2/2010 | Kim |
| 7,685,192 | B1 | 3/2010 | Scofield et al. |
| 7,743,208 | B2 | 6/2010 | Yoshida et al. |
| 7,801,971 | B1 | 9/2010 | Amidon et al. |
| 7,805,407 | B1 | 9/2010 | Verbeke et al. |
| 7,822,631 | B1 | 10/2010 | Vander Mey et al. |
| 7,856,449 | B1 | 12/2010 | Martino et al. |
| 7,865,551 | B2 | 1/2011 | Mcculler |
| 7,886,334 | B1 | 2/2011 | Walsh |
| 7,899,757 | B1 | 3/2011 | Talan et al. |
| 7,930,255 | B2 | 4/2011 | Choi et al. |
| 8,010,458 | B2 | 8/2011 | Galbreath et al. |
| 8,010,460 | B2 | 8/2011 | Work et al. |
| 8,010,602 | B2 | 8/2011 | Shen et al. |
| 8,107,397 | B1 | 1/2012 | Bagchi et al. |
| 8,108,536 | B1 | 1/2012 | Hernacki et al. |
| 8,156,558 | B2 | 4/2012 | Goldfeder et al. |
| 8,170,958 | B1 | 5/2012 | Gremett et al. |
| 8,180,804 | B1 | 5/2012 | Narayanan et al. |
| 8,214,883 | B2 | 7/2012 | Obasanjo et al. |
| 8,234,688 | B2 | 7/2012 | Grandison et al. |
| 8,237,714 | B1 | 8/2012 | Burke |
| 8,244,848 | B1 | 8/2012 | Narayanan |
| 8,261,078 | B2 | 9/2012 | Barriga et al. |
| 8,275,866 | B2 | 9/2012 | Klincewicz |
| 8,301,617 | B2 | 10/2012 | Muntz et al. |
| 8,306,973 | B2 | 11/2012 | Ohazama et al. |
| 8,316,056 | B2 | 11/2012 | Wable |
| 8,386,301 | B2 | 2/2013 | Rajasingham |
| 8,392,590 | B2 | 3/2013 | Bouchard et al. |
| 8,443,366 | B1 | 5/2013 | Yancey |
| 8,468,103 | B2 | 6/2013 | Galbreath et al. |
| 8,489,641 | B1 | 7/2013 | Seefeld et al. |
| 8,516,196 | B2 | 8/2013 | Jain et al. |
| 8,527,760 | B2 | 9/2013 | Faiman et al. |
| 8,560,605 | B1 | 10/2013 | Gyongyi et al. |
| 8,572,129 | B1 | 10/2013 | Lee et al. |
| 8,601,025 | B1 | 12/2013 | Shajenko et al. |
| 8,606,721 | B1 | 12/2013 | Dicker |
| 8,621,215 | B1 | 12/2013 | Iyer |
| 8,682,837 | B2 | 3/2014 | Skelton |
| 8,683,423 | B2 | 3/2014 | Amaral et al. |
| 8,688,701 | B2 | 4/2014 | Ghosh et al. |
| 8,725,673 | B2 | 5/2014 | Kast et al. |
| 8,768,759 | B2 | 7/2014 | Ghosh et al. |
| 8,832,093 | B2 | 9/2014 | Redstone et al. |
| 8,832,790 | B1 | 9/2014 | Villa et al. |
| 8,874,572 | B1 | 10/2014 | Broyles |
| 8,949,250 | B1 | 2/2015 | Garg et al. |
| 9,143,503 | B2 | 9/2015 | Lo et al. |
| 9,147,273 | B1 | 9/2015 | Allen et al. |
| 9,154,491 | B1 | 10/2015 | Leske |
| 9,171,336 | B2 | 10/2015 | Englar et al. |
| 9,171,338 | B2 | 10/2015 | Chrapko et al. |
| 9,223,978 | B2 | 12/2015 | Kraemer |
| 9,319,419 | B2 | 4/2016 | Sprague et al. |
| 9,390,243 | B2 | 7/2016 | Dhillon et al. |
| 9,438,619 | B1 | 9/2016 | Chan et al. |
| 9,443,004 | B2 | 9/2016 | Chan |
| 9,443,044 | B2 | 9/2016 | Gou et al. |
| 9,460,475 | B2 | 10/2016 | Chrapko et al. |
| 9,584,540 | B1 | 2/2017 | Chan et al. |
| 9,613,341 | B2 | 4/2017 | Shivakumar |
| 9,721,296 | B1 | 8/2017 | Chrapko |
| 9,747,650 | B2 | 8/2017 | Chrapko et al. |
| 9,785,696 | B1 | 10/2017 | Yaknenko et al. |
| 9,846,896 | B2 | 12/2017 | Shah |
| 10,007,895 | B2 | 6/2018 | Vanasco |
| 10,402,457 | B1 | 9/2019 | Lawrence |
| 10,585,893 | B2 | 3/2020 | Dantressangle et al. |
| 10,673,880 | B1 | 6/2020 | Pratt et al. |
| 10,732,810 | B1 | 8/2020 | Cohen et al. |
| 10,810,093 | B1 * | 10/2020 | Tucek ................. H04L 41/0893 |
| 11,086,905 | B1 | 8/2021 | Schuck et al. |
| 11,106,692 | B1 | 8/2021 | Guetta et al. |
| 11,258,686 | B2 * | 2/2022 | Laxman Karibhimanvar ............ H04L 43/0811 |
| 11,443,390 | B1 | 9/2022 | Caligaris et al. |
| 2003/0046280 | A1 | 3/2003 | Rotter et al. |
| 2003/0076825 | A1 | 4/2003 | Guruprasad |
| 2003/0133411 | A1 | 7/2003 | Ise et al. |
| 2003/0227924 | A1 | 12/2003 | Kodialam et al. |
| 2004/0018518 | A1 | 1/2004 | Krieb et al. |
| 2004/0088147 | A1 | 5/2004 | Wang et al. |
| 2004/0122803 | A1 | 6/2004 | Dom et al. |
| 2004/0181461 | A1 | 9/2004 | Raiyani et al. |
| 2004/0181518 | A1 | 9/2004 | Mayo et al. |
| 2004/0239674 | A1 | 12/2004 | Ewald |
| 2005/0021622 | A1 | 1/2005 | Cullen |
| 2005/0083936 | A1 | 4/2005 | Ma |
| 2005/0096987 | A1 | 5/2005 | Miyauchi |
| 2005/0149522 | A1 | 7/2005 | Cookson, Jr. et al. |
| 2005/0243736 | A1 | 11/2005 | Faloutsos et al. |
| 2005/0256949 | A1 | 11/2005 | Gruhl et al. |
| 2005/0286414 | A1 | 12/2005 | Young et al. |
| 2006/0136419 | A1 | 6/2006 | Brydon et al. |
| 2006/0212931 | A1 | 9/2006 | Shull et al. |
| 2006/0248026 | A1 | 11/2006 | Aoyama et al. |
| 2006/0248573 | A1 | 11/2006 | Pannu et al. |
| 2006/0259957 | A1 | 11/2006 | Tam et al. |
| 2006/0271564 | A1 | 11/2006 | Meng Muntz et al. |
| 2006/0282546 | A1 | 12/2006 | Reynolds et al. |
| 2006/0287842 | A1 | 12/2006 | Kim |
| 2006/0290697 | A1 | 12/2006 | Madden et al. |
| 2006/0294134 | A1 | 12/2006 | Berkhim et al. |

(56)　　　　References Cited

U.S. PATENT DOCUMENTS

| | | |
|---|---|---|
| 2007/0087819 A1 | 4/2007 | Van Luchene et al. |
| 2007/0109302 A1 | 5/2007 | Tsuboshita et al. |
| 2007/0124291 A1 | 5/2007 | Hassan et al. |
| 2007/0136086 A1 | 6/2007 | Luerssen |
| 2007/0143629 A1 | 6/2007 | Hardjono et al. |
| 2007/0162761 A1 | 7/2007 | Davis et al. |
| 2007/0180495 A1 | 8/2007 | Hardjono et al. |
| 2007/0214249 A1 | 9/2007 | Ahmed et al. |
| 2007/0214259 A1 | 9/2007 | Ahmed et al. |
| 2007/0220146 A1 | 9/2007 | Suzuki |
| 2007/0263012 A1 | 11/2007 | Panditharadhya et al. |
| 2007/0282886 A1 | 12/2007 | Purang et al. |
| 2008/0005096 A1 | 1/2008 | Moore |
| 2008/0015916 A1 | 1/2008 | Cossey et al. |
| 2008/0059576 A1 | 3/2008 | Liu et al. |
| 2008/0086442 A1 | 4/2008 | Dasdan et al. |
| 2008/0101343 A1 | 5/2008 | Monette et al. |
| 2008/0104225 A1 | 5/2008 | Zhang et al. |
| 2008/0109451 A1 | 5/2008 | Harding |
| 2008/0133391 A1 | 6/2008 | Kurian et al. |
| 2008/0133552 A1 | 6/2008 | Leary |
| 2008/0137669 A1* | 6/2008 | Balandina .......... H04L 47/2408 |
| | | 370/400 |
| 2008/0155070 A1 | 6/2008 | El-Damhougy et al. |
| 2008/0183378 A1 | 7/2008 | Weidner |
| 2008/0275899 A1 | 11/2008 | Baluja et al. |
| 2008/0281694 A1 | 11/2008 | Kretz et al. |
| 2008/0288457 A1 | 11/2008 | Aaltonen et al. |
| 2008/0288612 A1 | 11/2008 | Kwon |
| 2008/0313119 A1 | 12/2008 | Leskovec et al. |
| 2009/0024629 A1 | 1/2009 | Miyauchi |
| 2009/0027392 A1 | 1/2009 | Jadhav et al. |
| 2009/0043489 A1 | 2/2009 | Weidner |
| 2009/0049517 A1 | 2/2009 | Sorniotti et al. |
| 2009/0063157 A1 | 3/2009 | Seo |
| 2009/0064293 A1 | 3/2009 | Li et al. |
| 2009/0094134 A1 | 4/2009 | Toomer |
| 2009/0106822 A1 | 4/2009 | Obasanjo et al. |
| 2009/0198562 A1 | 8/2009 | Wiesinger et al. |
| 2009/0276233 A1 | 11/2009 | Brimhall et al. |
| 2009/0296568 A1 | 12/2009 | Kitada |
| 2009/0327054 A1 | 12/2009 | Yao |
| 2010/0004940 A1 | 1/2010 | Choi et al. |
| 2010/0010826 A1 | 1/2010 | Rosenthal et al. |
| 2010/0043055 A1 | 2/2010 | Baumgart |
| 2010/0076987 A1 | 3/2010 | Schreiner |
| 2010/0100963 A1 | 4/2010 | Mahaffey |
| 2010/0106557 A1 | 4/2010 | Buss |
| 2010/0121707 A1 | 5/2010 | Goeldi |
| 2010/0161369 A1 | 6/2010 | Farrell et al. |
| 2010/0161662 A1 | 6/2010 | Jonas et al. |
| 2010/0169137 A1 | 7/2010 | Jastrebski et al. |
| 2010/0180048 A1 | 7/2010 | Guo et al. |
| 2010/0205541 A1 | 8/2010 | Rapaport et al. |
| 2010/0217525 A1 | 8/2010 | King et al. |
| 2010/0250605 A1 | 9/2010 | Pamu et al. |
| 2010/0262610 A1 | 10/2010 | Acosta et al. |
| 2010/0274815 A1 | 10/2010 | Vanasco |
| 2010/0287033 A1 | 11/2010 | Mathur |
| 2010/0309915 A1 | 12/2010 | Pirbhai et al. |
| 2010/0312644 A1 | 12/2010 | Borgs et al. |
| 2011/0004692 A1 | 1/2011 | Occhino et al. |
| 2011/0029467 A1 | 2/2011 | Spehr et al. |
| 2011/0055897 A1 | 3/2011 | Arasaratnam |
| 2011/0113098 A1 | 5/2011 | Walsh et al. |
| 2011/0113149 A1 | 5/2011 | Kaal |
| 2011/0125921 A1 | 5/2011 | Karenos et al. |
| 2011/0173344 A1 | 7/2011 | Mihaly et al. |
| 2011/0184983 A1 | 7/2011 | Kwantes et al. |
| 2011/0208866 A1 | 8/2011 | Marmolejo-Meillon et al. |
| 2011/0219034 A1 | 9/2011 | Dekker et al. |
| 2011/0246237 A1 | 10/2011 | Vdovjak |
| 2011/0246412 A1 | 10/2011 | Skelton |
| 2011/0265011 A1 | 10/2011 | Taylor et al. |
| 2011/0283205 A1 | 11/2011 | Nie et al. |
| 2011/0295626 A1 | 12/2011 | Chen et al. |
| 2011/0314557 A1 | 12/2011 | Marshall |
| 2012/0109714 A1 | 5/2012 | Azar |
| 2012/0110005 A1 | 5/2012 | Kuo et al. |
| 2012/0182822 A1 | 7/2012 | Hayashi |
| 2012/0182882 A1 | 7/2012 | Chrapko et al. |
| 2012/0197758 A1 | 8/2012 | Zhong et al. |
| 2012/0204265 A1 | 8/2012 | Judge |
| 2012/0278767 A1 | 11/2012 | Stibel et al. |
| 2012/0282884 A1 | 11/2012 | Sun |
| 2012/0290427 A1 | 11/2012 | Reed et al. |
| 2012/0317149 A1 | 12/2012 | Jagota et al. |
| 2012/0317200 A1 | 12/2012 | Chan |
| 2012/0324027 A1 | 12/2012 | Vaynblat et al. |
| 2013/0013807 A1 | 1/2013 | Chrapko et al. |
| 2013/0054598 A1 | 2/2013 | Caceres |
| 2013/0073387 A1 | 3/2013 | Heath |
| 2013/0097180 A1 | 4/2013 | Tseng |
| 2013/0097184 A1 | 4/2013 | Berkhim et al. |
| 2013/0110732 A1 | 5/2013 | Uppal |
| 2013/0124542 A1 | 5/2013 | Lee et al. |
| 2013/0138741 A1 | 5/2013 | Redstone et al. |
| 2013/0166601 A1 | 6/2013 | Chrapko et al. |
| 2013/0173457 A1 | 7/2013 | Chrapko et al. |
| 2013/0198811 A1 | 8/2013 | Yu et al. |
| 2013/0227558 A1* | 8/2013 | Du ........................ G06F 9/5077 |
| | | 718/1 |
| 2013/0254305 A1 | 9/2013 | Cheng et al. |
| 2013/0282884 A1 | 10/2013 | Chandrasekaran et al. |
| 2013/0290226 A1 | 10/2013 | Dokken |
| 2013/0291098 A1 | 10/2013 | Chung et al. |
| 2013/0317941 A1 | 11/2013 | Stoll et al. |
| 2013/0332740 A1 | 12/2013 | Sauve et al. |
| 2014/0081652 A1 | 3/2014 | Klindworth |
| 2014/0089189 A1 | 3/2014 | Vasireddy |
| 2014/0114962 A1 | 4/2014 | Rosenburg et al. |
| 2014/0156274 A1 | 6/2014 | You et al. |
| 2014/0172708 A1 | 6/2014 | Chrapko et al. |
| 2014/0173723 A1 | 6/2014 | Singla et al. |
| 2014/0185430 A1 | 7/2014 | Li et al. |
| 2014/0258160 A1 | 9/2014 | Chrapko et al. |
| 2014/0258305 A1 | 9/2014 | Kapadia et al. |
| 2014/0278730 A1 | 9/2014 | Muhart et al. |
| 2014/0279352 A1 | 9/2014 | Schaefer et al. |
| 2014/0280151 A1 | 9/2014 | Micaelian |
| 2014/0287725 A1 | 9/2014 | Lee |
| 2014/0289261 A1 | 9/2014 | Shivakumar |
| 2014/0304339 A1 | 10/2014 | Hamilton |
| 2014/0317003 A1 | 10/2014 | Shah |
| 2014/0317107 A1 | 10/2014 | Gharpure et al. |
| 2015/0019565 A1 | 1/2015 | Lijachev et al. |
| 2015/0026120 A1 | 1/2015 | Chrapko et al. |
| 2015/0089568 A1 | 3/2015 | Sprague et al. |
| 2015/0121456 A1 | 4/2015 | Milman et al. |
| 2015/0142595 A1 | 5/2015 | Acuña-Rohter |
| 2015/0163217 A1 | 6/2015 | Lo et al. |
| 2015/0169142 A1 | 6/2015 | Longo et al. |
| 2015/0213407 A1 | 7/2015 | Cabler et al. |
| 2015/0220835 A1 | 8/2015 | Wilson et al. |
| 2015/0242856 A1 | 8/2015 | Dhurandhar et al. |
| 2015/0271206 A1 | 9/2015 | Schultz et al. |
| 2015/0347591 A1 | 12/2015 | Bax et al. |
| 2015/0359039 A1 | 12/2015 | Haque et al. |
| 2015/0370801 A1 | 12/2015 | Shah |
| 2016/0004741 A1 | 1/2016 | Johnson et al. |
| 2016/0035046 A1 | 2/2016 | Gupta et al. |
| 2016/0073271 A1 | 3/2016 | Schultz et al. |
| 2016/0171011 A1 | 6/2016 | Drogobetski et al. |
| 2016/0171113 A1 | 6/2016 | Fanous et al. |
| 2016/0180840 A1 | 6/2016 | Siddiq et al. |
| 2016/0197788 A1 | 7/2016 | Chrapko et al. |
| 2016/0253679 A1 | 9/2016 | Venkatraman et al. |
| 2016/0277424 A1 | 9/2016 | Mawji et al. |
| 2017/0024749 A1 | 1/2017 | Barathy et al. |
| 2017/0083820 A1 | 3/2017 | Huang et al. |
| 2017/0236078 A1 | 8/2017 | Rasumov |
| 2017/0293696 A1 | 10/2017 | Bendersky et al. |
| 2018/0068010 A1 | 3/2018 | Paterson et al. |

(56) References Cited

U.S. PATENT DOCUMENTS

| | | | | |
|---|---|---|---|---|
| 2019/0165941 A1* | 5/2019 | Ray | ........................ | H04L 9/006 |
| 2019/0385130 A1 | 12/2019 | Mossoba et al. | | |
| 2020/0311734 A1* | 10/2020 | Mardikar | ........... | G06Q 20/4016 |

FOREIGN PATENT DOCUMENTS

| | | | | | |
|---|---|---|---|---|---|
| CN | 1619567 | A | | 5/2005 | |
| CN | 101167093 | A | | 4/2008 | |
| CN | 101383695 | A | | 3/2009 | |
| CN | 101393566 | A | | 3/2009 | |
| CN | 101403978 | A | | 4/2009 | |
| CN | 101438279 | A | | 5/2009 | |
| CN | 101443806 | A | | 5/2009 | |
| CN | 101841539 | A | | 9/2010 | |
| CN | 101902459 | A | | 12/2010 | |
| CN | 102136114 | A | | 7/2011 | |
| CN | 102668457 | A | | 9/2012 | |
| CN | 102685661 | A | | 9/2012 | |
| CN | 102855572 | A | | 1/2013 | |
| CN | 103095728 | A | | 5/2013 | |
| CN | 103456233 | A | | 12/2013 | |
| CN | 103493049 | A | | 1/2014 | |
| CN | 103593764 | A | | 2/2014 | |
| CN | 104504043 | A | | 4/2015 | |
| CN | 102823225 | B | | 9/2015 | |
| CN | 104915391 | A | | 9/2015 | |
| CN | 104954492 | A | | 9/2015 | |
| CN | 109690608 | A | | 4/2019 | |
| EP | 1511232 | A1 | | 3/2005 | |
| JP | 2001-298453 | A | | 10/2001 | |
| JP | 2002/123649 | A | | 4/2002 | |
| JP | 2003-259070 | A | | 9/2003 | |
| JP | 2005/149202 | A | | 6/2005 | |
| JP | 2005339281 | A | | 12/2005 | |
| JP | 2006-113900 | A | | 4/2006 | |
| JP | 2006-260099 | A | | 9/2006 | |
| JP | 2007-004411 | A | | 1/2007 | |
| JP | 2007-249413 | A | | 9/2007 | |
| JP | 2008-129990 | A | | 6/2008 | |
| JP | 2009-025871 | A | | 2/2009 | |
| JP | 2009-064433 | A | | 3/2009 | |
| JP | 2009-146253 | A | | 7/2009 | |
| JP | 2013/506204 | A | | 2/2013 | |
| KR | 20140070065 | A | * | 6/2014 | ............ G06F 17/30 |
| KR | 2019860 | B1 | | 9/2019 | |
| TW | 201250611 | A | | 12/2012 | |
| WO | 2006/019752 | A1 | | 2/2006 | |
| WO | 2006/115919 | A2 | | 11/2006 | |
| WO | 2007/085903 | A2 | | 8/2007 | |
| WO | 2009/002193 | A1 | | 12/2008 | |
| WO | 2009/020964 | A2 | | 2/2009 | |
| WO | 2009/109009 | A1 | | 9/2009 | |
| WO | 2010/048172 | A1 | | 4/2010 | |
| WO | 2011/106897 | A1 | | 9/2011 | |
| WO | 2011/134086 | A1 | | 11/2011 | |
| WO | 2011/143761 | A1 | | 11/2011 | |
| WO | 2011/127206 | A3 | | 4/2012 | |
| WO | 2013/026095 | A1 | | 2/2013 | |
| WO | 2013/173790 | A1 | | 11/2013 | |
| WO | 2014/144114 | A1 | | 9/2014 | |
| WO | 2015/047992 | A2 | | 4/2015 | |
| WO | 2015/106657 | A1 | | 7/2015 | |
| WO | 2016/011371 | A1 | | 1/2016 | |
| WO | 2017/019203 | A1 | | 2/2017 | |

OTHER PUBLICATIONS

Notice of Allowance received for U.S. Appl. No. 16/745,498 dated Mar. 28, 2025, 44 pages.
Notice of Allowance received for U.S. Appl. No. 17/805,750 dated Feb. 26, 2025, 48 pages.
Notice of Allowance received for U.S. Appl. No. 18/398,899 dated Mar. 13, 2025, 50 pages.
Notice of Allowance received for U.S. Appl. No. 18/748,766 dated Mar. 17, 2025, 185 pages.
Final Office Action received for U.S. Appl. No. 15/046,041 dated Sep. 10, 2019, 23 pages.
Final Office Action received for U.S. Appl. No. 16/014,032 dated Oct. 1, 2019, 35 pages.
Non-Final Office Action received for U.S. Appl. No. 16/410,272 dated Oct. 11, 2019, 65 pages.
Canadian Office Action received for Patent Application Serial No. 2,775,899 dated Oct. 8, 2019, 6 pages.
Indian First Office Action received for Indian Patent Application Serial No. 735/KOLNP/2012 dated Aug. 23, 2019, 7 pages.
Notice Before Examining Pursuant to Section 41 of Law and Rule 66 of the Regulations received for Israel patent Application No. 261207 dated Oct. 27, 2019, 2 pages.
Notice Before Examining Pursuant to Section 41 of Law and Rule 66 of the Regulations received for Israel patent Application No. 261921 dated Nov. 4, 2019, 2 pages.
Non-Final Office Action received for U.S. Appl. No. 15/474,785 dated Nov. 12, 2019, 127 pages.
Extended European Search Report for European Patent Application No. 17840662.5 dated Jan. 2, 2020, 9 pages.
Second Office Action received for Chinese Patent Application Serial No. 201610392929.2 dated Nov. 20, 2019, 8 pages.
Final Office Action received for U.S. Appl. No. 15/644,356 dated Dec. 30, 2019, 68 pages.
Notice Before Examining Pursuant to Section 41 of Law and Rule 66 of the Regulations received for Israel patent Application No. 261464 dated Nov. 4, 2019, 2 pages.
Notice Before Examining Pursuant to Section 41 of Law and Rule 66 of the Regulations received for Israel patent Application No. 261465 dated Nov. 4, 2019, 2 pages.
Notification under Section 18 of the Law received for Israel patent Application No. 264827 dated Jan. 7, 2020, 2 pages.
Communication pursuant to Rules 70(2) and 70a(2) EPC received for EP Patent Application Serial No. 17840662.5 dated Jan. 21, 2020, 1 page.
Office Action received for Brazilian Patent Application Serial No. BR112012007316-8 dated Mar. 10, 2020, 5 pages (Including English Translation).
Final Office Action received for U.S. Appl. No. 15/907,164 dated Apr. 30, 2020, 56 pages.
Notice of allowance received for Israel patent Application No. 261465 dated Mar. 17, 2020, 3 pages.
Notice of allowance received for Israel patent Application No. 261921 dated Mar. 19, 2020, 02 pages.
Notice of allowance received for Israel patent Application No. 261207 dated Mar. 15, 2020, 02 pages.
Notice of Allowance received for U.S. Appl. No. 16/410,272 dated Apr. 28, 2020, 54 pages.
Notice of allowance received for Israel patent Application No. 261464 dated Jul. 1, 2020, 5 pages.
Non-Final Office Action received for U.S. Appl. No. 16/534,474 dated Jul. 2, 2020, 99 pages.
Final Office Action received for U.S. Appl. No. 16/166,581 dated Jul. 28, 2020, 74 pages.
Canadian Office Action received for Canadian Application Serial No. 3,033,793 dated Sep. 2, 2020, 6 pages.
Communication pursuant to Article 94(3) EPC for European Patent Application No. 17840662.5 dated Aug. 31, 2020, 8 pages.
Canadian Office Action for Canadian Application Serial No. 2,775,899 dated Oct. 7, 2020, 3 pages.
Final Office Action received for U.S. Appl. No. 15/474,785 dated Oct. 16, 2020, 55 pages.
Final Office Action received for U.S. Appl. No. 16/534,474 dated Mar. 10, 2021, 41 pages.
Non-Final Office Action received for U.S. Appl. No. 16/835,433 dated Mar. 18, 2021, 94 pages.
Notice of Reasons for Refusal received for Japanese Application Serial No. 2019-500705 dated Apr. 6, 2021, 09 pages.
Non-Final Office Action received for U.S. Appl. No. 17/158,840 dated May 19, 2021, 38 pages.

(56) References Cited

OTHER PUBLICATIONS

Non-Final Office Action received for U.S. Appl. No. 16/801,295 dated Jun. 15, 2021, 111 pages.

Non-Final Office Action received for U.S. Appl. No. 16/661,182 dated Jun. 16, 2021, 88 pages.

Non-Final Office Action received for U.S. Appl. No. 16/774,744 dated Jun. 24, 2021, 126 pages.

Non-Final Office Action received for U.S. Appl. No. 16/745,498 dated Aug. 3, 2021, 105 pages.

Non-Final Office Action received for U.S. Appl. No. 16/773,382 dated Jul. 28, 2021, 110 pages.

Liu et al., "Hybrid content filtering and reputation-based popularity for recommending blog articles", Bradford vol. 38, No. 6, Jun. 23, 2014, pp. 788-805.

Office Action received for Mexican Patent Application Serial No. MX/a/2018/010005 dated May 18, 2021, 8 pages.

Notification to Grant Patent Right for Invention received for Chinese Patent Application Serial No. 201780025229.2 dated May 28, 2021, 5 pages (Including English Translation).

Office Action received for Israel Patent Application Serial No. 261464 dated Jul. 25, 2021, 3 pages(Original Copy Only).

Office Action received for Canadian Patent Application Serial No. 3,014,995 dated Aug. 12, 2021, 4 pages.

Office Action received for Canadian Patent Application Serial No. 3,014,361 dated Aug. 18, 2021, 5 pages.

Office Action received for Canadian Patent Application Serial No. 3,016,091 dated Aug. 19, 2021, 7 pages.

Office Action received for Indian Patent Application Serial No. 201847032355 dated Aug. 31, 2021, 6 pages.

Office Action received for Canadian Patent Application Serial No. 3,015,926 dated Aug. 17, 2021, 3 pages.

Non-Final Office Action received for U.S. Appl. No. 17/079,600 dated Dec. 3, 2021, 84 pages.

Office Action received for Indian Patent Application Serial No. 201847032375 dated Oct. 29, 2021, 8 pages.

Office Action received for Taiwan Patent Application No. 106127464 dated Oct. 1, 2021, 17 pages.

Notice of Allowance received for U.S. Appl. No. 17/158,840, dated Dec. 24, 2021, 97 pages.

Office Action received for Canada Patent Application Serial No. 3,205,418 dated Nov. 29, 2024, 6 pages.

Office Action received for Canada Patent Application Serial No. 3,204,616 dated Nov. 22, 2024, 5 pages.

Non-Final Office Action received for U.S. Appl. No. 18/187,040 dated Feb. 12, 2025, 111 pages.

Substantive Examination Report received for Philippine Patent Application No. 12019500317 dated Apr. 27, 2025, 9 pages.

Office Action received for Canada Patent Application No. 3,204,164 dated Apr. 7, 2025, 5 pages.

Notification to Grant Patent Right for Invention received for Chinese Application Serial No. 201080051338.X, dated Mar. 22, 2016, 4 pages (Including English Translation).

International Search Report and Written Opinion received for International Patent Application No. PCT/CA2011/050017 dated Apr. 13, 2011, 9 pages.

International Search Report and Written Opinion received for International Patent Application No. PCT/CA2010/001658 dated Jan. 26, 2011, 9 pages.

International Search Report and Written Opinion received for International Patent Application No. PCT/CA2011/050260 dated Jul. 26, 2011, 7 pages.

Final Office Action received for U.S. Appl. No. 15/224,063, dated Dec. 15, 2017, 52 pages.

Non-Final Office Action received for U.S. Appl. No. 15/589,841, dated Dec. 15, 2017, 66 pages.

Final Office Action received for U.S. Appl. No. 15/466,590, dated Jan. 19, 2018, 56 pages.

Final Office Action received for U.S. Appl. No. 15/400,471, dated Jan. 26, 2018, 78 pages.

Final Office Action received for U.S. Appl. No. 15/630,299, dated Feb. 8, 2018, 40 pages.

International Search Report and Written Opinion received for International Patent Application No. PCT/CA2017/050962 dated Nov. 20, 2017, 9 pages.

Non-Final Office Action received for U.S. Appl. No. 15/644,356, dated Apr. 5, 2018, 74 pages.

Notice of Allowance received for U.S. Appl. No. 15/589,841, dated Mar. 20, 2018, 44 pages.

Non-Final Office Action received for U.S. Appl. No. 15/046,041, dated Apr. 26, 2018, 70 pages.

Non-Final Office Action received for U.S. Appl. No. 15/907,164, dated May 24, 2018, 29 pages.

Final Office Action received for U.S. Appl. No. 15/675,041 dated May 17, 2018, 73 pages.

Non-Final Office Action received for U.S. Appl. No. 15/400,471, dated May 29, 2018, 34 pages.

Non-Final Office Action received for U.S. Appl. No. 15/630,299, dated May 17, 2018, 19 pages.

Notice of Allowance received for U.S. Appl. No. 15/953,011 dated Aug. 28, 2018, 72 pages.

First Action Interview Pilot Program Pre-Interview Communication received for U.S. Appl. No. 15/953,011 dated Jul. 10, 2018, 10 pages.

First Action Interview Pilot Program Pre-Interview Communication for U.S. Appl. No. 15/907,166 dated Jul. 6, 2018, 6 pages.

Final Office Action received for U.S. Appl. No. 15/400,471 dated Oct. 29, 2018, 42 pages.

Final Office Action received for U.S. Appl. No. 15/644,356 dated Oct. 18, 2018, 41 pages.

Non-Final Office Action received for U.S. Appl. No. 16/014,032 dated Oct. 4, 2018, 74 pages.

First Action Interview Pilot Program Communication for U.S. Appl. No. 15/907,166 dated Oct. 31, 2018, 46 pages.

Final Office Action received for U.S. Appl. No. 15/907,164 dated Nov. 14, 2018, 70 pages.

First Office Action received for Chinese Application Serial No. 201610392926.9, dated Sep. 4, 2018, 17 pages.

Final Office Action received for U.S. Appl. No. 15/046,041 dated Nov. 20, 2018, 32 pages.

Non-Final Office Action received for U.S. Appl. No. 16/141,615 dated Nov. 29, 2018, 15 pages.

www.trustscience.com Inc., et al., "Defendants' Motion for Stay of Discovery Pending Decision on Motion to Dismiss," Case 6:18-cv-01174-CEM-DCI, Document 32, Filed Sep. 21, 2018, 12 pages.

www.trustscience.com Inc., et al., "Plaintiff's Response in Opposition to Defendants' Motion to Stay Discovery Pending Decision on Motion to Dismiss," Case 6:18-cv-01174-CEM-DCI, Document 35, Filed Oct. 5, 2018, 20 pages.

www.trustscience.com Inc., et al., "Motion to Dismiss the Complaint and Memorandum of Law in Support," Case 6:18-cv-01174-CEM-DCI, Document 41, Filed Oct. 19, 2018, 36 pages.

www.trustscience.com Inc., et al., "Plaintiff's Response to Defendants' Motion to Dismiss and Notice of Intent to File Amended Complaint," Case 6:18-cv-01174-CEM-DCI, Document 44, Filed Nov. 2, 2018, 3 pages.

www.trustscience.com Inc., et al., "First Amended Complaint and Demand for Injunctive Relief and Jury Trial," Case 6:18-cv-01174-CEM-DCI, Document 46 Filed Nov. 6, 2018, 49 pages.

www.trustscience.com Inc., et al., "Order and Permanent Injunction," Case 6:18-cv-01174-CEM-DCI, Document 49 Filed Nov. 21, 2018, 4 pages.

Examiner's Report received for Canadian Application Serial No. 2,775,899 dated Oct. 2, 2018, 8 pages.

Non-Final Office Action recevied for U.S. Appl. No. 15/675,041 dated Jan. 11, 2019, 91 pages.

Non-Final Office Action for U.S. Appl. No. 16/204,651 dated Jan. 29, 2019, 47 pages.

Notice of Allowance for U.S. Appl. No. 16/195,946 dated Feb. 14, 2019, 69 pages.

Notice of Allowance for U.S. Appl. No. 15/400,471 dated Mar. 21, 2019, 47 pages.

(56) References Cited

OTHER PUBLICATIONS

Non-Final office Action recevied for U.S. Appl. No. 15/644,356 dated Mar. 21, 2019, 39 pages.

First Office Action received for Chinese Patent Application Serial No. 201610392929.2 dated Mar. 14, 2019, 20 pages.

Final Office Action received for U.S. Appl. No. 15/907,166 dated Apr. 24, 2019, 27 pages.

Final Office Action received for U.S. Appl. No. 16/014,032 dated Apr. 17, 2019, 38 pages.

International Search Report and Written Opinion received for International Patent Application No. PCT/CA2011/050569 mailed on Dec. 5, 2011, 9 pages.

Non-Final Office Action received for U.S. Appl. No. 15/046,041 dated May 22, 2019, 37 pages.

Final Office Action received for U.S. Appl. No. 16/204,651 dated Jul. 19, 2019, 34 pages.

Final Office Action received for U.S. Appl. No. 16/141,615 dated Jul. 30, 2019, 78 pages.

Final Office Action received for U.S. Appl. No. 15/675,041 dated Jul. 29, 2019, 61 pages.

Non-Final Office Action received for U.S. Appl. No. 15/907,164 dated Aug. 20, 2019, 52 pages.

Non-Final Office Action received for U.S. Appl. No. 16/166,581 dated Sep. 18, 2019, 92 pages.

Non-Final Office Action received for U.S. Appl. No. 16/534,474 dated Jan. 19, 2022, 44 pages.

Office Action received for Mexican Patent Application Serial No. MX/a/2018/010423 dated Nov. 25, 2021, 11 pages.

Office Action received for Mexican Patent Application Serial No. MX/a/2018/010005 dated Nov. 30, 2021, 9 pages.

Decision to Grant Patent received for Japanese Patent Application No. 2019-500705 dated Feb. 15, 2022, 5 pages(Including English Translation).

Final Office Action received for U.S. Appl. No. 16/774,744 dated Apr. 14, 2022, 86 pages.

Final Office Action received for U.S. Appl. No. 16/745,498 dated Apr. 19, 2022, 54 pages.

Office Action received for Canadian Patent Application Serial No. 3014361 dated Mar. 16, 2022, 4 pages.

Final Office Action received for U.S. Appl. No. 16/773,382 dated May 24, 2022, 40 pages.

Non Final Office Action received for U.S. Appl. No. 17/231,658 dated Jun. 16, 2022, 129 pages.

Non Final Office Action received for U.S. Appl. No. 16/995,293 dated Jul. 6, 2022, 123 pages.

Summons to attend oral proceedings received for European Patent Application Serial No. 17840662.5 dated May 23, 2022, 11 pages.

Office Action received for Mexican Patent Application Serial No. MX/a/2018/010005 dated May 17, 2022, 12 pages.

Notice of Allowance received for Mexican Patent Application No. MX/a/2018/010423, dated May 19, 2022 2 pages.

Office Action received for Mexican Patent Application Serial No. MX/a/2018/011618 dated May 27, 2022 for, 7 pages.

Final Office Action received for U.S. Appl. No. 17/079,600 dated Aug. 25, 2022, 36 pages.

Final Office Action received for U.S. Appl. No. 16/534,474 dated Aug. 24, 2022, 117 pages.

Office Action received for Mexican Patent Application Serial No. MX/a/2018/010426 dated Jul. 12, 2022, 7 pages (Including English Translation).

Notice of Allowance received for Canadian Patent Application No. 3014995 dated Sep. 6, 2022, 1 page.

Non-Final Office Action received for U.S. Appl. No. 16/745,498 dated Nov. 29, 2022, 44 pages.

Decision to refuse European received for European Patent Application Serial No. 17840662.5 dated Nov. 18, 2022, 14 pages.

First Office Action received for Chinese Patent Application Serial No. 201780025677.2 dated Oct. 13, 2022, 12 pages.(Including English Translation).

Shang Jiang et al., "Application of incidence matrix method in credit evaluation", Journal of Shenyang Normal University (Natural Science), Jul. 15, 2007, pp. 308-310.

Shen Limin et al., "Adaptive trust model based on time series analysis in opportunistic network", Journal of Chinese Computer Systems No. 7, Jul. 15, 2015, pp. 1553-1558.

First Office Action received for Chinese Patent Application Serial No. 201780024074.0 dated Oct. 10, 2022, 20 pages.(Including English Translation).

First Office Action received for Chinese Patent Application Serial No. 201780030761.3 dated Nov. 21, 2022, 22 pages.(Including English Translation).

First Office Action received for Mexican Patent Application Serial No. MX/a/2019/001858 dated Nov. 24, 2022, 8 pages.(Including English Translation).

Notice of Allowance received for U.S. Appl. No. 16/773,382 dated Dec. 21, 2022, 43 pages.

Notice of Allowance received for U.S. Appl. No. 16/995,293 dated Jan. 24, 2023, 73 pages.

Non-Final Office Action received for U.S. Appl. No. 18/046,382 dated Mar. 16, 2023, 139 pages.

Non-Final Office Action received for U.S. Appl. No. 16/534,474 dated Mar. 16, 2023, 49 pages.

Non-Final Office Action received for U.S. Appl. No. 17/659,292 dated Mar. 28, 2023, 124 pages.

Non-Final Office Action received for U.S. Appl. No. 17/079,600 dated Apr. 7, 2023, 30 pages.

Notice of Allowance received for U.S. Appl. No. 16/995,293 dated Mar. 1, 2023, 7 pages.

Office Action received for Mexican Patent Application Serial No. MX/a/2018/011618 dated Jan. 27, 2023, 16 pages (with machine translation).

Notice of Allowance received for Canadian Patent Application No. 3016091 dated Mar. 2, 2023, 1 page.

Office Action received for Chinese Patent Application Serial No. 201780025677.2 dated Mar. 10, 2023, 2 pages (Original Copy only).

Final Office Action received for U.S. Appl. No. 17/231,658 dated May 10, 2023, 97 pages.

Non-Final Office Action received for U.S. Appl. No. 17/805,750 dated Jun. 2, 2023, 124 pages.

Office Action received for Chinese Patent Application Serial No. 201780024074.0 dated Apr. 11, 2023, 22 pages.

Notice of Allowance received for Canadian Patent Application Serial No. 3014361 dated Apr. 27, 2023, 1 page.

Office Action received for Mexican Patent Application Serial No. MX/a/2019/001858 dated Apr. 21, 2023, 12 pages (including machine translation).

Notice of Allowance received for Taiwanese Patent Application Serial No. 106127464 dated May 25, 2023, 3 pages (including English translation).

Notice of Allowance received for Chinese Patent Application Serial No. 201780030761.3 dated Jul. 10, 2023, 12 pages (including English machine translation).

Li, Han "Research on Trust Recommendation and Friend Search Filtering Algorithm in Social Networks" Yanshan University, 2012, 160 pages (including English Translation).

Non-Final Office Action received for U.S. Appl. No. 16/745,498 dated Aug. 25, 2023, 51 pages.

Non-Final Office Action received for U.S. Appl. No. 17/660,167 dated Sep. 21, 2023, 131 pages.

Non-Final Office Action received for U.S. Appl. No. 18/187,040 dated Sep. 29, 2023, 57 pages.

Notice of Allowance received for U.S. Appl. No. 16/534,474 dated Oct. 3, 2023, 39 pages.

Notice of Allowance received for Mexican Patent Application Serial No. MX/a/2018/011618, dated Aug. 8, 2023, 3 pages (English Translation).

Non-Final Office Action received for U.S. Appl. No. 18/310,590 dated Oct. 11, 2023, 94 pages.

Tang, et al. Social influence analysis in large-scale networks. p. 807. Proceedings of the ACM SIGKDD International Conference on Knowledge Discovery and Data Mining ; KDD '09: Proceedings of

(56) References Cited

OTHER PUBLICATIONS the 15th ACM SIGKDD International Conference on Knowledge Discovery and Data Mining (15th ACM SIGKDD International Conference on Knowledge Discovery and Data Mining, KDD '09—Jun. 28, 2009 to Jul. 1, 2009—Paris), Jan. 1, 2009; Jun. 28, 2009-Jul. 1, 2009 ACM, 2 Penn Plaza, Suite 701 New York NY 10121-0701 USA.

Non-Final Office Action received for U.S. Appl. No. 13/521,216, dated Jun. 20, 2014, 20 pages.

Final Office Action received for U.S. Appl. No. 13/521,216, dated May 21, 2015, 28 pages.

Non-Final Office Action received for U.S. Appl. No. 13/521,216, dated Apr. 13, 2016, 30 pages.

Final Office Action received for U.S. Appl. No. 13/521,216, dated Oct. 21, 2016, 36 pages.

Final Office Action received for U.S. Appl. No. 13/503,352, dated Jan. 5, 2015, 28 pages.

Non-Final Office Action received for U.S. Appl. No. 13/503,352, dated Aug. 21, 2014 24 pages.

Non-Final Office Action received for U.S. Appl. No. 13/503,352, dated Aug. 18, 2015, 26 pages.

Non-Final Office Action received for U.S. Appl. No. 15/224,063, dated Sep. 1, 2016, 47 pages.

Non-Final Office Action received for U.S. Appl. No. 13/695,419, dated Oct. 31, 2014, 20 pages.

Final Office Action received for U.S. Appl. No. 13/695,419, dated Jun. 2, 2015, 31 pages.

Non-Final Office Action received for U.S. Appl. No. 13/695,419, dated Dec. 17, 2015, 43 pages.

Non-Final Office Action received for U.S. Appl. No. 13/695,419, dated Apr. 5, 2016, 72 pages.

Non-Final Office Action received for U.S. Appl. No. 13/695,419, dated Oct. 12, 2016, 147 pages.

Non-Final Office Action received for U.S. Appl. No. 13/824,324, dated Mar. 9, 2017, 17 pages.

Non-Final Office Action received for U.S. Appl. No. 14/664,285, dated Jun. 4, 2015, 25 pages.

Final Office Action received for U.S. Appl. No. 14/664,285, dated Sep. 21, 2015, 33 pages.

Non-Final Office Action received for U.S. Appl. No. 14/664,285, dated Mar. 4, 2016, 24 pages.

Final Office Action received for U.S. Appl. No. 14/664,285, dated Jul. 29, 2016, 29 pages.

Non-Final Office Action received for U.S. Appl. No. 15/070,643, dated Aug. 26, 2016, 36 pages.

Non-Final Office Action received for U.S. Appl. No. 15/589,841, dated Jun. 5, 2017, 40 pages.

International Search Report and Written Opinion received for PCT Application No. PCT/CA2017/050257, dated May 19, 2017, 8 pages.

International Search Report and Written Opinion received for PCT Application No. PCT/CA2017/050197, fated May 30, 2017, 15 pages.

Non-Final Office Action received for U.S. Appl. No. 15/466,590, dated Jul. 13, 2017, 20 pages.

Non-Final Office Action received for U.S. Appl. No. 15/055,952, dated Aug. 12, 2016, 33 pages.

International Search Report and Written Opinion for received for PCT Application No. PCT/CA2017/050255, dated Jun. 19, 2017, 9 pages.

Non-Final Office Action received for U.S. Appl. No. 13/695,419, dated Jun. 14, 2017, 44 pages.

Notice of Reasons for Refusal received for Japanese Patent Application No. 2016-131310, dated Aug. 2, 2017, 4 pages (Including English Translation).

Non-Final Office Action received for U.S. Appl. No. 15/224,063, dated Jul. 14, 2017, 36 pages.

Non-Final Office Action received for U.S. Appl. No. 15/400,471, dated Aug. 7, 2017, 24 pages.

Non-Final Office Action received for U.S. Appl. No. 15/630,299, dated Aug. 10, 2017, 17 pages.

International Search Report and Written Opinion received for PCT Application No. PCT/CA2017/050351 dated Jun. 19, 2017, 10 pages.

Non-Final Office Action received for U.S. Appl. No. 15/671,102 dated Sep. 22, 2017, 21 pages.

Non-Final Office Action received for U.S. Appl. No. 15/675,041 dated Oct. 6, 2017, 72 pages.

Office Action received for Canadian Patent Application Serial No. 2,775,899 dated Oct. 12, 2017, 6 pages (Including English Translation).

Notice of Allowance received for U.S. Appl. No. 13/695,419 dated Nov. 8, 2017, 92 pages.

Final Office Action received for U.S. Appl. No. 13/824,324, dated Nov. 30, 2017, 33 pages.

Decision to Grant received for Japanese Patent Application No. 2016-131310, dated Nov. 14, 2017, 6 pages (Including English Translation).

International Search Report and Written Opinion received for PCT Application No. PCT/CA2010/001531, dated Jan. 10, 2011, 9 pages.

Notification of Reasons for Refusal received for Japanese Patent Application No. 2015-085003, Mar. 29, 2016, 4 pages(Including English Translation).

Decision to Grant a Patent received for Japanese Patent Application No. 2015-085003, dated Jun. 2, 2016 6 pages (Including English Translation).

Notification of Reasons for Refusal received for Japanese Patent Application No. 2012-531192, Apr. 3, 2014, 7 pages(Including English Translation).

Decision to Grant a Patent received for Japanese Patent Application No. 2012-531192, dated Feb. 16, 2015, 6 pages(Including English Translation).

Extended European Search Report received for European Patent Application No. 10819770.8 dated Oct. 9, 2014, 7 pages.

Communication pursuant to Rules 70(2) received for European Patent Application No. 10819770.8 dated Oct. 28, 2014, 1 page.

Communication pursuant to Article 94(3) EPC for European Patent Application No. 10819770.8 dated Feb. 8, 2016, 7 pages.

Decision to Refuse European Patent Application No. 10819770.8 dated Apr. 18, 2017, 6 pages.

First Office Action received for Chinese Application Serial No. 201080051338.X, dated Mar. 24, 2014 for 31 pages (Including English Translation).

Second Office Action received for Chinese Application Serial No. 201080051338.X, dated Jan. 16, 2015, 26 pages (Including English Translation).

Office Action received for Chinese Application Serial No. 201080051338.X, dated Sep. 28, 2015, 12 pages (Including English Translation).

Angwin et al., "Scrapers' Dig Deep for Data on Web", http://online.wsj.com/article/SB10001424052748703358504575544381288117888.html?, Oct. 12, 2010, printed on Nov. 6, 2010, 5 pages.

Anthes, "The Search Is On-Computerworld", http://www.computerworld.com/s/article/70041lThe_Search_Is_On, Apr. 15, 2002, printed Nov. 6, 2010, 8 pages.

Baras et al., "Dynamic Self-Organization and Clustering in Distributed Networked Systems for Performance Improvement," Proceedings of the 47th annual Allerton conference on Communication, Control, and Computing, Alierton'09, Illinois, USA, pp. 968-975, Sep. 30-Oct. 2, 2009.

Chakraborty et al., "TrustBAC-Integrating Trust Relationships into the RBAC Model for Access Control in Open Systems," Proceedings of the eleventh ACM symposium on Access Control Models and Technologies, SACMAT '06, 10 pages, Jun. 7-9, 2006.

Ding et al., "Transitive Closure and Metric Inequality of Weighted Graphs: Detecting Protein Interaction Modules Using Cliques", Int. J. Data Mining and Bioinformatics, vol. X, No. X, 200X, pp. 162-177, 2006.

(56)                    References Cited

OTHER PUBLICATIONS

"Facebook announces groups, downloading", http://content.usatoday.com/communities/technologylive/post/2010/10/live-facebook-announcesdownloading-other-features/1, Oct. 6, 2010, printed Nov. 6, 2010, 7 pages.

Feldman et al., "Robust Incentive Techniques for Peer-to-Peer Networks", Proceedings of the fifth ACM Conference on Electronic Commerce EC'04, New York, New York, USA, 10 pages, May 17-20, 2004.

Final Office Action received for U.S. Appl. No. 15/079,952, dated Dec. 16, 2016, 14 pages.

Gan et al., "A Novel Reputation Computing Model for Mobile Agent-Based E-Commerce Systems", Proceedings of the International Conference on Information Security and Assurance, ISA 2008, pp. 253-260, Apr. 24-26, 2008.

Geisberger, et al., "Contraction Hierarchies: Faster and Simpler Hierarchical Routing in Road Networks", LNCS 5038, 2008, pp. 319-333.

Golbeck et al., "Inferring Trust Relationships in Web-based Social Networks", Journal of ACM Transactions of Internet Technology (TOIT), vol. 6, issue 4, Nov. 2006, 41 pages.

Gu et al., "Processing Massive Sized Graphs Using Sector/Sphere", Proceedings of the 2010 IEEE Workshop on Many-Task Computing on Grids and Supercomputers (MTAGS), New Orleans, LA, USA, 10 pages, Nov. 15, 2010.

Gupta et al., "A Reputation System for Peer-to-Peer Networks," Proceedings of the 13th International Workshop on Network and operating systems support for digital audio and video NOSSDAV'03, Monterey, California, USA, Jun. 1-3, 2003.

Gupta et al., "Reputation Management Framework and its use as Currency in large-Scale Peer to-Peer Networks", Proceedings of the Fourth IEEE International Conference on Peer-to-Peer Computing P2P2004, Zurich, Switzerland, pp. 1-9, Aug. 2004.

Hartley et al., "MSSG: A Framework for Massive-Scale Semantic Graphs," Proceedings of 2006 IEEE International Conference on Cluster Computing, CLUSTER'2006, Barcelona, Spain, 10 pages, Sep. 25-28, 2006.

Huynh et al., "An Integrated Trust and reputation model for open multi-Agent systems," Journal of Autonomous Agents and Multi-Agent Systems, vol. 13, issue 2, pp. 119-154, Sep. 2006.

International Search Report and Written Opinion for International Patent Application No. PCT/CA2016/050305 mailed Jun. 3, 2016, 7 pages.

Josang et al., "Simplification and Analysis of Transitive Trust Networks", Journal of Web Intelligence and Agent Systems, vol. 4, Issue 2, Apr. 2006, pp. 1-26.

Kamola et al., "Reconstruction of a Social Network Graph from Incomplete Call Detail Records", Conference Proceedings of the International Conference on Computational Aspects of SocialNetworks (CASoN), Oct. 19, 2011, pp. 136-140.

Kang et al., "PEGASUS: A Peta-Scale Graph Mining System—Implementation and Observations", Proceedings of the Ninth IEEE International Conference on Data Mining, ICDM'09, Miami, FL, USA, pp. 229-238, Dec. 6-9, 2009.

Kim et al., "Design and Implementation of the location-based Personalized Social Media Service," Conference Proceedings of the International Conference on Internet and Web Applications and Services (ICIW), May 9, 2010, pp. 116-121.

Lumsdaine et al., "Challenges in Parallel Graph Processing", Parallel Processing letters, vol. 17, No. 1, Mar. 2007,16 pages.

Malewicz et al., "Pregel: a System for large-Scale Graph Processing", Proceedings of the 2010 International Conference on Management Data, SIGMOD'10, Indianapolis, Indiana, USA, Jun. 6-11, 2010, pp. 135-145.

Meyer "Outrage as Credit Agency Plans to Mine Facebook Data," Gigaom.com, https://gigaom.com/2012/06/07/credit-agency-mines-facebook-data/ Jun. 7, 2012, 3 pages.

Mining Social Networks, Untangling the social Web, http://www.economist.com/node/16910031?story_id=16910031&fsrc=rss, Sep. 2, 2010, printed Nov. 6, 2010, 5 pages.

Mori et al., "Improving Deployability of Peer-Assisted CDN Platform with Incentive", Proceedings of IEEE Global Telecommunications Conference GLOBECOM 2009, Honolulu, Hawaii, USA, 2009, 7 pages.

Mui et al., "A Computational Model of Trust and Reputation", Proceedings of the 35th Annual Hawaii International Conference on System Sciences, HICSS '02, vol. 7, 2002, 9 pages.

Notice of Allowance received for U.S. Appl. No. 15/224,172, dated Oct. 14, 2016, 35 pages.

Notice of Allowance received for U.S. Appl. No. 15/056,484, dated Jul. 13, 2016, 31 pages.

Non-Final Office Action received for U.S. Appl. No. 15/079,952, dated Jul. 14, 2016, 26 pages.

Notice of Allowance received for U.S. Appl. No. 14/664,285, dated Oct. 7, 2016, 27 pages.

Notice of Allowance received for U.S. Appl. No. 15/070,643, dated Apr. 7, 2017, 28 pages.

Notice of Allowance received for U.S. Appl. No. 15/406,405, dated Apr. 6, 2017, 27 pages.

Non-Final Office Action for U.S. Appl. No. 15/070,643, dated Feb. 24, 2017, 38 pages.

Safaei et al., "Social Graph Generation & Forecasting Using Social Network Mining", Proceedings of the 33rd Annual IEEE International Computer Software and Applications Conference, COMPSAC '09, 2009, pp. 31-35.

"Startup Wants to Base Your Credit Score on Social Media Profiles", Mashable, Technology Review 7, Jun. 7, 2012, 18 pages.

Office Action received for Taiwanese Patent Application No. 105108584 dated Oct. 31, 2016, 7 pages.

Wallentin et al., "A Cross-Layer Route Discovery Strategy for Virtual Currency Systems in Mobile Ad Hoc Networks", Proceedings of the Seventh International Conference on Wireless On-demand Network Systems and Services IEEE/IFIP WONS 2010, Kranjska Gora, Slovenia, 2010, pp. 91-98.

Zetter, "Tracking Terrorists the Las Vegas Way", http://pcworld.about.com/news/Aug072002id103692.htm, printed Nov. 6, 2010, 3 pages.

Zhang et al., "A Review of Incentive Mechanisms in Peer-to-Peer Systems", Proceedings of the First International Conference on Advances in P2P Systems AP2PS'09, Sliema, Malta, 2009, pp. 45-50.

Zhang et al., "MARCH: A Distributed Incentive Scheme for Peer-to-Peer Networks", Proceedings of the 26th Annual IEEE Conference on Computer Communication INFOCOM 2007, Anchorage, Alaska, USA, 2007, pp. 1091-1099.

Non-Final Office Action received for U.S. Appl. No. 13/498,429, dated Apr. 17, 2014, 24 pages.

Non-Final Office Action received for U.S. Appl. No. 13/498,429, dated Jul. 25, 2014, 18 pages.

Final Office Action received for U.S. Appl. No. 13/498,429, dated Jan. 16, 2015, 21 pages.

Non-Final Office Action received for U.S. Appl. No. 14/282,935, dated Jul. 21, 2014, 26 pages.

Final Office Action received for U.S. Appl. No. 14/282,935, dated Jan. 30, 2015, 42 pages.

Non-Final Office Action received for U.S. Appl. No. 14/282,935, dated Aug. 5, 2015, 7 pages.

Final Office Action received for U.S. Appl. No. 14/282,935, dated Feb. 12, 2016, 13 pages.

Non-Final Office Action received for U.S. Appl. No. 15/254,642, dated Dec. 28, 2016, 29 pages.

EPO. Mitteilung des Europischen Patentamts vom 1. Oct. 2007 ber Geschftsmethoden = Notice from the European Patent Office dated Oct. 1, 2007 concerning business methods = Communiqu de l'Office europen des brevets, en date du 1er Oct. 2007, concernant les mthodes dans le domaine des activites economiques. vol. 30,Nr:11, pp. 592-593. Journal Officiel de l'Office Europeen des Brevets. Official Journal of the European Patent Office.Amtsblattt des Europaeischen Patenta, Nov. 1, 2007 OEB, Munchen, DE.

Office Action received for Mexican Patent Application Serial No. MX/a/2019/001858 dated Sep. 3, 2024, 20 pages.

Notice of Allowance received for U.S. Appl. No. 18/649,423, dated Oct. 17, 2024, 149 pages.

(56)     References Cited

OTHER PUBLICATIONS

Non-Final Office Action received for U.S. Appl. No. 16/745,498, dated Sep. 9, 2024, 29 pages.

Non-Final Office Action received for U.S. Appl. No. 17/805,750, dated Sep. 6, 2024, 38 pages.

Final Office Action received for U.S. Appl. No. 18/187,040, dated Jul. 25, 2024, 63 pages.

Final Office Action received for U.S. Appl. No. 18/357,229, dated Oct. 17, 2024, 50 pages.

Zeng et al., "Trust Path-Searching Algorithm Based on PSO", The 9th International Conference for Young Computer Scientists, IEEE, 2008, pp. 1975-1979.

Non-Final Office Action received for U.S. Appl. No. 18/398,899, dated Aug. 29, 2024, 109 pages.

Office Action received for Canada Patent Application Serial No. 3185523 dated Aug. 2, 2024, 5 pages.

Office Action received for Mexican Patent Application Serial No. MX/a/2019/001858 dated Oct. 9, 2023, 14 pages (including English translation).

Final Office Action received for U.S. Appl. No. 17/079,600 dated Dec. 5, 2023, 47 pages.

Notice of Allowance received for U.S. Appl. No. 17/659,292 dated Dec. 18, 2023, 95 pages.

Final Office Action received for U.S. Appl. No. 18/046,382 dated Dec. 26, 2023, 127 pages.

Notice of Allowance received for Chinese Patent Application Serial No. 201780024074.0 dated Dec. 8, 2023, 8 pages (including English translation).

Final Office Action received for U.S. Appl. No. 16/745,498 dated Jan. 12, 2024, 36 pages.

Notice of Allowance received for U.S. Appl. No. 17/659,292 dated Jan. 19, 2024, 6 pages.

Notice of Allowance received for U.S. Appl. No. 18/310,590 dated Jan. 29, 2024, 48 pages.

Notice of Allowance received for U.S. Appl. No. 16/534,474 dated Oct. 17, 2023, 11 pages.

Notice of Allowance received for U.S. Appl. No. 16/534,474 dated Oct. 18, 2023, 10 pages.

Notice of Allowance received for U.S. Appl. No. 16/534,474 dated Nov. 14, 2023, 7 pages.

Notice of Allowance received for U.S. Appl. No. 16/534,474 dated Jan. 10, 2024, 7 pages.

Non Final Office Action received for U.S. Appl. No. 18/357,229 dated Jan. 24, 2024, 90 pages.

Notice of Allowance received for U.S. Appl. No. 17/660,167 dated Feb. 23, 2024, 67 pages.

Office Action received for Brazilian Patent Application Serial No. BR112019002958-3 dated Jan. 26, 2024, 5 pages (including English translation).

Final Office Action received for U.S. Appl. No. 17/805,750 dated Mar. 7, 2024, 51 pages.

Notice of Allowance received for U.S. Appl. No. 17/659,292 dated Mar. 22, 2024, 16 pages.

Notice of Allowance received for U.S. Appl. No. 18/310,590 dated Mar. 13, 2024, 7 pages.

Notice of Allowance received for U.S. Appl. No. 17/660,167 dated Mar. 22, 2024, 7 pages.

Dean et al., "Mapreduce: Simplified Data Processing on Large Clusters", Communications of the ACM, vol. 51, No. 1, Jan. 2008, pp. 107-113.

Office Action received for Mexican Patent Application Serial No. MX/a/2019/001858 dated Mar. 6, 2024, 10 pages.

Non-Final Office Action received for U.S. Appl. No. 18/607,656 dated Oct. 17, 2025, 20 pages.

Alani et al., "Identifying Communities of Practice Through Ontology Network Analysis", in IEEE Intelligent Systems, Mar.-Apr. 2003, pp. 18-25.

Non-Final Office Action received for U.S. Appl. No. 18/672,116 dated Dec. 3, 2025, 9 pages.

* cited by examiner

100

400

402

| Cluster_Info Table | |
|---|---|
| Cluster_Id | Integer |
| Cluster_Type | Varchar |

404

| Registry_Cache Table | |
|---|---|
| Cluster_Id | Integer |
| Machine | Varchar |

<u>410</u>

412

| Node Table | |
|---|---|
| Node_Id | Integer |

414

| Outgoing_Edge Table | |
|---|---|
| Node_Id | Integer |
| Cluster_Id | Integer |
| Edge_Id | Integer |

416

| Incoming_Edge Table | |
|---|---|
| Node_Id | Integer |
| Cluster_Id | Integer |
| Edge_Id | Integer |

510

| Node Table | |
|---|---|
| Rowld | 64-bit Integer |
| "info:inlinks" | List |
| "info:outlinks" | List |
| "inBucket:" + source node id | List |
| "outBucket:" + target node id | List |

For each source node out-bucket, find corresponding in-bucket of target node — 782

Join paths from source's out-bucket with paths in target's corresponding in-bucket — 784

Return joined paths with paths in source node out-bucket for the target identifier — 786

STOP — 788

COMPUTING CLUSTER FOR PROVIDING VIRTUAL MARKERS BASED UPON NETWORK CONNECTIVITY

CROSS-REFERENCE TO RELATED APPLICATIONS

This application is a continuation of U.S. patent application Ser. No. 17/079,600 filed Oct. 26, 2020, which is a continuation of U.S. patent application Ser. No. 16/661,182 filed Oct. 23, 2019, which is a continuation of U.S. patent application Ser. No. 15/907,166 filed Feb. 27, 2018, which is a continuation of U.S. Pat. No. 13,824,324, filed Mar. 5, 2014, which is a national stage filing under 35 U.S.C. § 371 of International Application No. PCT/CA2011/050569, filed Sep. 16, 2011, which claims the benefit of U.S. Provisional Patent Application Ser. No. 61/383,583, filed Sep. 16, 2010. International Application No. PCT/CA2011/050569 was published under PCT Article 21(2) in English.

BACKGROUND OF THE INVENTION

This invention relates generally to networks of individuals, entities, or both, and network communities and, more particularly, to systems and methods for determining trust scores or connectivity within or between individuals, entities, or both, or networks of individuals, entities, or both, and using these scores to facilitate financial transactions.

The connectivity, or relationships, of an individual or entity within a network community may be used to infer attributes of that individual or entity. For example, an individual or entity's connectivity within a network community may be used to determine the identity of the individual or entity (e.g., used to make decisions about identity claims and authentication), the trustworthiness or reputation of the individual, or any combination of the membership, status, and/or influence of that individual in a particular community or subset of a particular community.

An individual or entity's connectivity within a network community, however, is difficult to quantify. For example, network communities may include hundreds, thousands, millions, billions or more members. Each member may possess varying degrees of connectivity information about itself and possibly about other members of the community. Some of this information may be highly credible or objective, while other information may be less credible and subjective. In addition, connectivity information from community members may come in various forms and on various scales, making it difficult to meaningfully compare one member's "trustworthiness" or "competence" and connectivity information with another member's "trustworthiness" or "competence" and connectivity information. Also, many individuals may belong to multiple communities, further complicating the determination of a quantifiable representation of trust and connectivity within a network community. Similarly, a particular individual may be associated with duplicate entries in one or more communities, due to, for example, errors in personal information such as name/information misspellings and/or outdated personal information. Even if a quantifiable representation of an individual's connectivity is determined, it is often difficult to use this representation in a meaningful way to make real-world decisions about the individual (e.g., whether or not to trust the individual). In some embodiments, virtual and/or electronic currency systems based on network connectivity and/or trust values may be used to facilitate transactions related to such decisions.

Further, it may be useful for these real-world decisions to be made prospectively (i.e., in advance of an anticipated event). Such prospective analysis may be difficult as an individual or entity's connectivity within a network community may change rapidly as the connections between the individual or entity and others in the network community may change quantitatively or qualitatively. This analysis becomes increasingly complex as if applied across multiple communities.

SUMMARY OF THE INVENTION

In view of the foregoing, systems and methods are provided for determining the connectivity between nodes within a network community and inferring attributes, such as trustworthiness or competence, from the connectivity. Connectivity may be determined, at least in part, using various graph traversal and normalization techniques described in more detail below and in U.S. Provisional Patent Application Nos. 61/247,343, filed Sep. 30, 2009, and 61/254,313, filed Oct. 23, 2009, 61/294,949, filed Jan. 14, 2010, 61/310,844, filed Mar. 5, 2010, 61/329,899, filed Apr. 30, 2010, and 61/383,583, filed Sep. 16, 2010, and in International Patent Application Nos. CA2010001531, filed Sep. 30, 2010, CA2010001658, filed Oct. 22, 2010, CA2011050017, filed Jan. 14, 2011, CA2011050125 filed Mar. 3, 2011, and CA2011050260, each of which are hereby incorporated by reference herein in their entireties.

In an embodiment, a path counting approach may be used where processing circuitry is configured to count the number of paths between a first node $n_1$ and a second node $n_2$ within a network community. A connectivity rating $R_{n_1n_2}$ may then be assigned to the nodes. The assigned connectivity rating may be proportional to the number of subpaths, or relationships, connecting the two nodes, among other possible measures. Using the number of subpaths as a measure, a path with one or more intermediate nodes between the first node $n_1$ and the second node $n_2$ may be scaled by an appropriate number (e.g., the number of intermediate nodes) and this scaled number may be used to calculate the connectivity rating.

In some embodiments, weighted links are used in addition or as an alternative to the subpath counting approach. Processing circuitry may be configured to assign a relative user weight to each path connecting a first node $n_1$ and a second node $n_2$ within a network community. A user connectivity value may be assigned to each link. For example, a user or entity associated with node $n_1$ may assign user connectivity values for all outgoing paths from node $n_1$. In some embodiments, the connectivity values assigned by the user or entity may be indicative of that user or entity's trust in the user or entity associated with node $n_2$. The link values assigned by a particular user or entity may then be compared to each other to determine a relative user weight for each link.

The relative user weight for each link may be determined by first computing the average of all the user connectivity values assigned by that user or node (i.e., the out-link values). If $t_i$ is the user connectivity value assigned to link i, then the relative user weight, $w_i$ assigned to that link may be given in accordance with:

$$w_i = 1 + (t_i + \overline{t_i})^2 \qquad (1)$$

In some embodiments, an alternative relative user weight, $w_i'$, may be used based on the number of standard deviations, $\sigma$, the user connectivity value differs from the average value assigned by that user or node. For example, the alternative relative user weight may be given in accordance with:

$$w_i' = 1 - \frac{1}{2 + k^2} \quad \text{where } k = \begin{cases} 0, & \text{if } \sigma = 0 \\ \dfrac{t_i + \overline{t_i}}{\sigma}, & \text{otherwise} \end{cases} \quad (2)$$

To determine the overall weight of a path, in some embodiments, the weights of all the links along the path may be multiplied together. The overall path weight may then be given in accordance with:

$$w_{path} = \prod (w_i) \quad (3)$$

or $$w_{path} = \prod (w_i') \quad (4)$$

The connectivity value for the path may then be defined as the minimum user connectivity value of all the links in the path multiplied by the overall path weight in accordance with:

$$t_{path} = w_{path} \times t_{min} \quad (5)$$

In some embodiments, the connectivity or trust rating between two nodes may be based on connectivity statistics values for one of the nodes. The connectivity rating or trust rating a first node has for a second node may be based on a connectivity between the first node and the second node and one or more connectivity statistics associated with the first node.

In other embodiments, only "qualified" paths may be used to determine connectivity values. A qualified path may be a path whose path weight meets any suitable predefined or dynamic criteria. For example, a qualified path may be a path whose path weight is greater than or equal to some threshold value. As described in more detail below, any suitable threshold function may be used to define threshold values. The threshold function may be based, at least in some embodiments, on empirical data, desired path keep percentages, or both. In some embodiments, threshold values may depend on the length, l, of the path. For example, an illustrative threshold function specifying the minimum path weight for path p may be given in accordance with:

$$\text{threshold}(p) = \begin{cases} 0.5, & \text{if } l = 1 \\ 0.428, & \text{if } l = 2 \\ 0.289, & \text{if } l = 3 \\ 0.220, & \text{if } l = 4 \\ 0.216, & \text{if } l = 5 \\ 0.192, & \text{if } l = 6 \end{cases} \quad (6)$$

To determine path connectivity values, in some embodiments, a parallel computational framework or distributed computational framework (or both) may be used. For example, in one embodiment, a number of core processors implement an Apache Hadoop or Google MapReduce cluster. This cluster may perform some or all of the distributed computations in connection with determining new path link values and path weights. In some embodiments, the parallel computational framework or distributed computational framework may include a distributed graph storage/computation system. The distributed graph storage/computation system may include a cluster registry, one or more node storage clusters, and one or more edge storage clusters. In some embodiments, the cluster registry, node storage cluster(s), and/or the edge storage cluster(s) each include a plurality of devices, computers, or processors. The distributed graph storage/computation system may be configured to store node and edge elements of one or more graphs representative of one or more network communities in a distributed fashion. In some embodiments, calculations and computations for determining connectivity information may be performed in a distributed fashion across the processors in the distributed graph storage/computation system.

The processing circuitry may identify a changed node within a network community. For example, a new outgoing link may be added, a link may be removed, or a user connectivity value may have been changed. In response to identifying a changed node, in some embodiments, the processing circuitry may re-compute link, path, weight, connectivity, and/or connectivity statistics values associated with some or all nodes in the implicated network community or communities.

In some embodiments, only values associated with affected nodes in the network community are recomputed after a changed node is identified. If there exists at least one changed node in the network community, the changed node or nodes may first undergo a prepare process. The prepare process may include a "map" phase and "reduce" phase. In the map phase of the prepare process, the prepare process may be divided into smaller sub-processes which are then distributed to a core in the parallel computational framework cluster.

For example, in one embodiment, each node or link change (e.g., tail to out-link change and head to in-link change) may be mapped to a different core for parallel computation. In the reduce phase of the prepare process, each out-link's weight may be determined in accordance with equation (1). Each of the out-link weights may then be normalized by the sum of the out-link weights (or any other suitable value). The node table may then be updated for each changed node, its in-links, and its out-links.

After the changed nodes have been prepared, the paths originating from each changed node may be calculated. Once again, a "map" and "reduce" phase of this process may be defined. During this process, in some embodiments, a depth-first search may be performed of the node digraph or node tree. All affected ancestor nodes may then be identified and their paths recalculated.

In some embodiments, to improve performance, paths may be grouped by the last node in the path. For example, all paths ending with node $n_1$ may be grouped together, all paths ending with node $n_2$ may be grouped together, and so on. These path groups may then be stored separately (e.g., in different columns of a single database table). In some embodiments, the path groups may be stored in columns of a key-value store implementing an HBase cluster (or any other compressed, high performance database system, such as BigTable).

In some embodiments, one or more threshold functions may be defined. The threshold function or functions may be used to determine the maximum number of links in a path that will be analyzed in a connectivity determination or connectivity computation. Threshold factors may also be defined for minimum link weights, path weights, or both. Weights falling below a user-defined or system-defined threshold (or above a maximum threshold) may be ignored in a connectivity determination or connectivity computation, while only weights of sufficient magnitude may be considered.

In some embodiments, a user connectivity or trust value may represent the degree of trust between a first node and a second node. In one embodiment, node $n_1$ may assign a user connectivity value of $l_1$ to a link between it and node $n_2$. Node $n_2$ may also assign a user connectivity value of $l_2$ to a reverse link between it and node $n_1$. The values of $l_1$ and $l_2$ may be at least partially subjective indications of the trustworthiness of the individual or entity associated with the node connected by the link. For example, one or more of the individual's or entity's reputation within the network community (or some other community), the individual's or entity's alignment with the trusting party (e.g., political, social, or religious alignment), past dealings with the individual or entity, and the individual's or entity's character and integrity (or any other relevant considerations) may be used to determine a partially subjective user connectivity value indicative of trust. A user (or other individual authorized by the node) may then assign this value to an outgoing link connecting the node to the individual or entity. Objective measures (e.g., data from third-party ratings agencies or credit bureaus) may also be used, in some embodiments, to form composite user connectivity values indicative of trust. The subjective, objective, or both types of measures may be automatically harvested or manually inputted for analysis.

In other embodiments, the user connectivity or trust value may be calculated objectively. In one embodiment, the trust value of a first node for a second node may be calculated based on the number of paths linking the two nodes, one or more path scores associated with the linking paths, connectivity statistics and/or other connectivity information associated with the first node.

In some embodiments, a decision-making algorithm may access the connectivity values in order to make automatic decisions (e.g., automatic network-based decisions, such as authentication or identity requests) on behalf of a user. Connectivity values may additionally or alternatively be outputted to external systems and processes located at third-parties. The external systems and processes may be configured to automatically initiate a transaction (or take some particular course of action) based, at least in part, on received connectivity values. For example, electronic or online advertising may be targeted to subgroups of members of a network community based, at least in part, on network connectivity values.

As another example, the decision-making algorithm may take the form of a financial application, such as a loan, lending, or donation application. Connectivity values may be used by financial institutions to make automatic credit-granting decisions. In some embodiments, connectivity values may be used in conjunction with third-party ratings agency information (e.g., credit bureau ratings information) in order to make credit-granting decisions. Connectivity values may also be used to advertise, promote, or publish information about charitable gifts, donations, or loans to other parties in a social networking environment or other network-based community. Decisions regarding loan amounts, interests rates, and/or loan repayment schedules may be automatically generated after a loan is approved and accepted by the financial application, the lender, or both the lender and financial application. In some embodiments, virtual and/or electronic currency systems based on network connectivity and/or trust values may be used to facilitate transactions related to such decisions.

In some embodiments, a decision-making algorithm may access connectivity values to make decisions prospectively (e.g., before an anticipated event like a request for credit). Such decisions may be made at the request of a user, or as part of an automated process (e.g., a credit bureau's periodic automated analysis of a database of customer information). This prospective analysis may allow for the initiation of a transaction (or taking of some particular action) in a fluid and/or dynamic manner.

In some embodiments, connectivity values may be used to present information to the user. This information may include, but is not limited to, static and/or interactive visualizations of connectivity values within a user's associated network community or communities. In some embodiments, this information may allow the user to explore or interact with an associated network community or communities, and encourage and/or discourage particular interactions within a user's associated network community or communities. In some embodiments, this information may explicitly present the user with the connectivity values. For example, a percentage may indicate how trustworthy another individual and/or entity is to a user. In some embodiments, the information may implicitly present the user with a representation of the connectivity values. For example, an avatar representing another individual and/or entity may change in appearance based on how trustworthy that individual and/or entity is to a user.

BRIEF DESCRIPTION OF THE DRAWINGS

The above and other features of the present invention, its nature and various advantages will be more apparent upon consideration of the following detailed description, taken in conjunction with the accompanying drawings, and in which:

FIGS. 5A, 5B, and 5C show illustrative data tables for supporting connectivity determinations within a network community in accordance with one embodiment of the invention;

DETAILED DESCRIPTION

Systems and methods for determining the connectivity between nodes in a network community are provided. As defined herein, a "node" may include any user terminal, network device, computer, mobile device, access point, robot, or any other electronic device capable of being uniquely identified within a network community. For example, nodes may include robots (or other machines) assigned unique serial numbers or network devices assigned unique network addresses. In some embodiments, a node may also represent an individual human being, entity (e.g., a legal entity, such as a public or private company, corporation, limited liability company (LLC), partnership, sole proprietorship, or charitable organization), concept (e.g., a social networking group), service, animal, city/town/village, parcel of land (which may be identified by land descriptions), or inanimate object (e.g., a car, aircraft, or tool). As also defined herein, a "network community" may include a collection of nodes and may represent any group of devices, individuals, or entities.

For example, all or some subset of the users of a social networking website or social networking service (or any other type of website or service, such as an online gaming community) may make up a single network community. Each user may be represented by a node in the network community. As another example, all the subscribers to a particular newsgroup or distribution list may make up a single network community, where each individual subscriber may be represented by a node in the network community. Any particular node may belong in zero, one, or more than one network community, or a node may be banned from all, or a subset of, the community. To facilitate network community additions, deletions, and link changes, in some embodiments a network community may be represented by a directed graph, or digraph, weighted digraph, tree, or any other suitable data structure.

Figure 1:
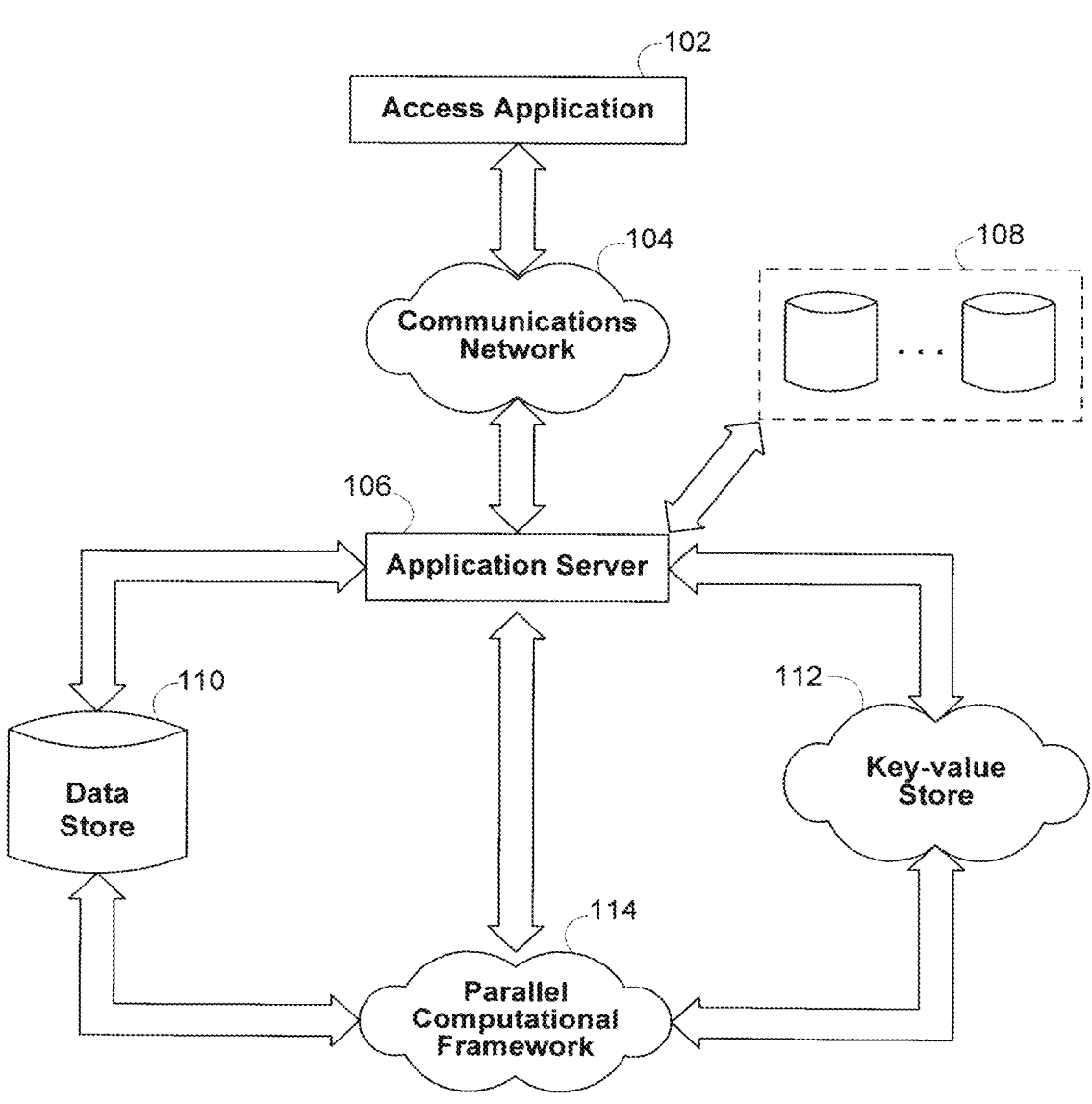
FIG. 1 is an illustrative block diagram of a network architecture used to support connectivity within a network community in accordance with one embodiment of the invention.

FIG. 1 shows illustrative network architecture 100 used to support the connectivity determinations within a network community. A user may utilize access application 102 to access application server 106 over communications network 104. For example, access application 102 may include a standard web browser, application server 106 may include a web server, and communication network 106 may include the Internet. Access application 102 may also include proprietary applications specifically developed for one or more platforms or devices. For example, access application 102 may include one or more instances of an Apple IOS, Android, WebOS, or any suitable application for use in accessing application 106 over communications network 104. Multiple users may access application service 106 via one or more instances of access application 102. For example, a plurality of mobile devices may each have an instance of access application 102 running locally on the devices. One or more users may use an instance of access application 102 to interact with application server 106.

Communication network 104 may include any wired or wireless network, such as the Internet, WiMax, wide area cellular, or local area wireless network. Communication network 104 may also include personal area networks, such as Bluetooth and infrared networks. Communications on communications network 104 may be encrypted or otherwise secured using any suitable security or encryption protocol.

Application server 106, which may include any network server or virtual server, such as a file or web server, may access data sources 108 locally or over any suitable network connection. Application server 106 may also include processing circuitry (e.g., one or more microprocessors), memory (e.g., RAM, ROM, and hybrid types of memory), storage devices (e.g., hard drives, optical drives, and tape drives). The processing circuitry included in application server 106 may execute a server process for supporting the network connectivity determinations of the present invention, while access application 102 executes a corresponding client process. The processing circuitry included in application server 106 may also perform any of the calculations and computations described herein in connection with determining network connectivity. In some embodiments, a computer-readable medium with computer program logic recorded thereon is included within application server 106. The computer program logic may determine the connectivity between two or more nodes in a network community and it may or may not output such connectivity to a display screen or data store.

For example, application server 106 may access data sources 108 over the Internet, a secured private LAN, or any other communications network. Data sources 108 may include one or more third-party data sources, such as data from third-party social networking services, third-party ratings bureaus, and document issuers (e.g., driver's license and license plate issuers, such as the Department of Motor Vehicles). For example, data sources 108 may include user and relationship data (e.g., "friend" or "follower" data) from one or more of Facebook, MySpace, openSocial, Friendster, Bebo, hi5, Orkut, PerfSpot, Yahoo! 360, Gmail, Yahoo! Mail, Hotmail, or other email-based services and accounts, LinkedIn, Twitter, Google+, Really Simple Syndication readers, or any other social networking website or service. Data sources 108 may also include data stores and databases local to application server 106 containing relationship information about users accessing application server 106 via access application 102 (e.g., databases of addresses, legal records, transportation passenger lists, gambling patterns, political affiliations, vehicle license plate or identification numbers, universal product codes, news articles, business listings, and hospital or university affiliations).

Application server 106 may be in communication with one or more of data store 110, key-value store 112, and parallel computational framework 114. Data store 110, which may include any relational database management system (RDBMS), file server, or storage system, may store information relating to one or more network communities. For example, one or more of data tables 500 (FIG. 5A) may be stored on data store 110. Data store 110 may store identity information about users and entities in the network community, an identification of the nodes in the network community, user link and path weights, user configuration settings, system configuration settings, and/or any other suitable information. There may be one instance of data store 110 per network community, or data store 110 may store information relating to a plural number of network communities. For example, data store 110 may include one database per network community, or one database may store information about all available network communities (e.g., information about one network community per database table). In some embodiments, the parallel computational framework 114 may include a distributed storage/computation network, described below in relation to FIG. 3.

Parallel computational framework 114, which may include any parallel or distributed computational framework or cluster, may be configured to divide computational jobs into smaller jobs to be performed simultaneously, in a distributed fashion, or both. For example, parallel computational framework 114 may support data-intensive distributed applications by implementing a map/reduce computational paradigm where the applications may be divided into a plurality of small fragments of work, each of which may be executed or re-executed on any core processor in a cluster of cores. A suitable example of parallel computational framework 114 includes an Apache Hadoop cluster.

Parallel computational framework 114 may interface with key-value store 112, which also may take the form of a cluster of cores. Key-value store 112 may hold sets of key-value pairs for use with the map/reduce computational paradigm implemented by parallel computational framework 114. For example, parallel computational framework 114 may express a large distributed computation as a sequence of distributed operations on data sets of key-value pairs. User-defined map/reduce jobs may be executed across a plurality of nodes in the cluster. The processing and computations described herein may be performed, at least in part, by any type of processor or combination of processors. For example, various types of quantum processors (e.g., solid-state quantum processors and light-based quantum processors), artificial neural networks, and the like may be used to perform massively parallel computing and processing.

In some embodiments, parallel computational framework 114 may support two distinct phases, a "map" phase and a "reduce" phase. The input to the computation may include a data set of key-value pairs stored at key-value store 112. In the map phase, parallel computational framework 114 may split, or divide, the input data set into a large number of fragments and assign each fragment to a map task. Parallel computational framework 114 may also distribute the map tasks across the cluster of nodes on which it operates. Each map task may consume key-value pairs from its assigned fragment and produce a set of intermediate key-value pairs. For each input key-value pair, the map task may invoke a user defined map function that transmutes the input into a different key-value pair. Following the map phase, parallel computational framework 114 may sort the intermediate data set by key and produce a collection of tuples so that all the values associated with a particular key appear together. Parallel computational framework 114 may also partition the collection of tuples into a number of fragments equal to the number of reduce tasks.

In the reduce phase, each reduce task may consume the fragment of tuples assigned to it. For each such tuple, the reduce task may invoke a user-defined reduce function that transmutes the tuple into an output key-value pair. Parallel computational framework 114 may then distribute the many reduce tasks across the cluster of nodes and provide the appropriate fragment of intermediate data to each reduce task.

Tasks in each phase may be executed in a fault-tolerant manner, so that if one or more nodes fail during a computation the tasks assigned to such failed nodes may be redistributed across the remaining nodes. This behavior may allow for load balancing and for failed tasks to be re-executed with low runtime overhead.

Key-value store 112 may implement any distributed file system capable of storing large files reliably. For example key-value store 112 may implement Hadoop's own distributed file system (DFS) or a more scalable column-oriented distributed database, such as HBase. Such file systems or databases may include BigTable-like capabilities, such as support for an arbitrary number of table columns.

Figure 2:
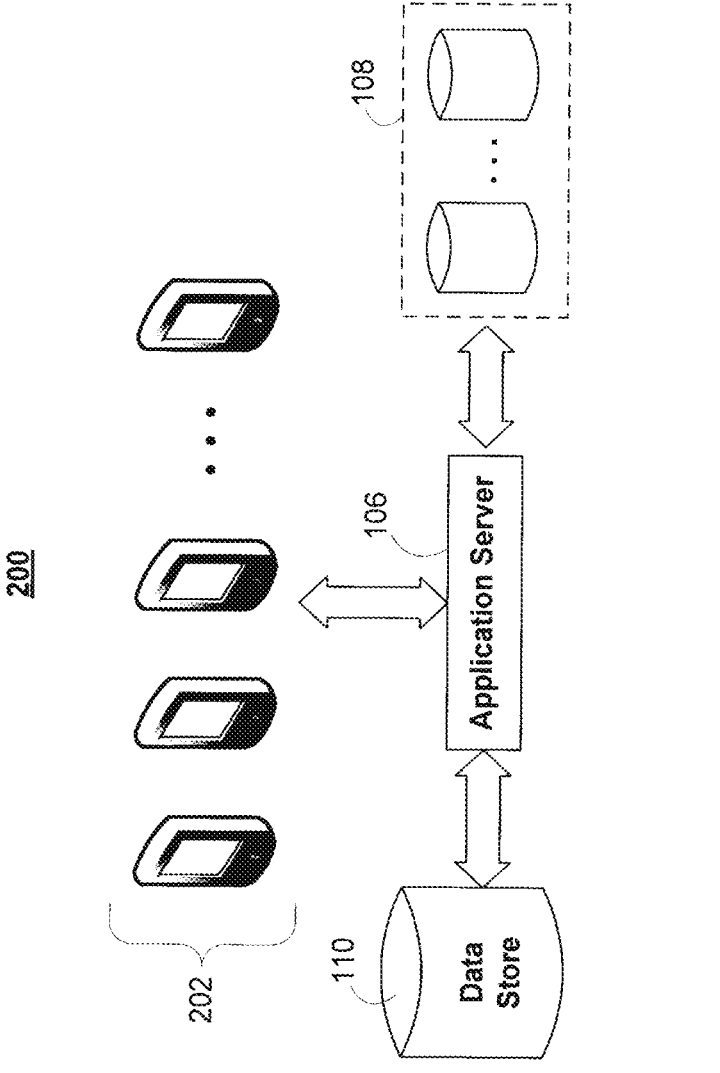
FIG. 2 is another illustrative block diagram of a network architecture used to support connectivity within a network community in accordance with one embodiment of the invention.

Although FIG. 1, in order to not over-complicate the drawing, only shows a single instance of access application 102, communications network 104, application server 106, data source 108, data store 110, key-value store 112, and parallel computational framework 114, in practice network architecture 100 may include multiple instances of one or more of the foregoing components. In addition, key-value store 112 and parallel computational framework 114 may also be removed, in some embodiments. As shown in network architecture 200 of FIG. 2, the parallel or distributed computations carried out by key-value store 112 and/or parallel computational framework 114 may be additionally or alternatively performed by a cluster of mobile devices 202 instead of stationary cores. In some embodiments, cluster of mobile devices 202, key-value store 112, and parallel computational framework 114 are all present in the network architecture. Certain application processes and computations may be performed by cluster of mobile devices 202 and certain other application processes and computations may be performed by key-value store 112 and parallel computational framework 114. In addition, in some embodiments, communication network 104 itself may perform some or all of the application processes and computations. For example, specially-configured routers or satellites may include processing circuitry adapted to carry out some or all of the application processes and computations described herein.

Cluster of mobile devices 202 may include one or more mobile devices, such as PDAs, cellular telephones, mobile computers, or any other mobile computing device. Cluster of mobile devices 202 may also include any appliance (e.g., audio/video systems, microwaves, refrigerators, food processors) containing a microprocessor (e.g., with spare processing time), storage, or both. Application server 106 may instruct devices within cluster of mobile devices 202 to perform computation, storage, or both in a similar fashion as would have been distributed to multiple fixed cores by parallel computational framework 114 and the map/reduce computational paradigm. Each device in cluster of mobile devices 202 may perform a discrete computational job, storage job, or both. Application server 106 may combine the results of each distributed job and return a final result of the computation.

Figure 3:
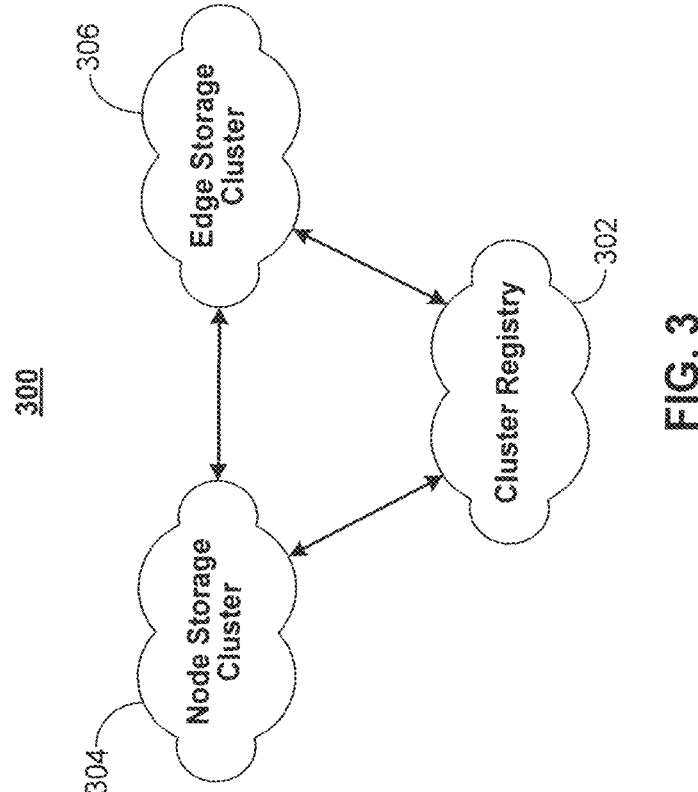
FIG. 3 is an illustrative diagram of a distributed storage/computation network in accordance with one embodiment of the invention.

FIG. 3 is an illustrative diagram of a distributed storage/computation network 300 in accordance with one embodiment of the invention. The distributed network 300 may be used to store information about one or more network communities. In some embodiments, network community information may be stored in the distributed network 300 in the form of one or more graphs. The distributed network 300 may include a plurality of computers, processors, or devices, each of which may communicate with other computers in the network via a communications network such as a local area network, a wide area network, the Internet, any other suitable wired or wireless communications network, or any combination thereof. In some embodiments, the computers in the distributed network 300 may be grouped into one or more clusters, each with a unique cluster ID. In one embodiment, the computers in the distributed network 300 may be grouped into at least three clusters: a cluster registry 302, a node storage cluster 304, and an edge storage cluster 306. Each cluster may include one or more computers, processors, or devices, and in some embodiments, individual computers may be able to dynamically move between different clusters. For example, clusters may be scalable. Individual computers may also be able to leave or join the distributed network 300. For example, computers may be added to the distributed network 300 in order to increase storage and/or computing capacity. In some embodiments, each cluster may provide one or more services to one or more requesters, such as other computers or clusters in the distributed network 300, or a remote user or system.

In some embodiments, a cluster registry 302 may store information about all of the clusters in the distributed network 300 and/or all of the computers in the distributed network 300. In some embodiments, cluster registry may store information about any suitable subset of clusters in the distributed network 300 (e.g., any suitable one or more of such clusters). In some embodiments, the distributed network 300 may include only one cluster registry, but in other embodiments, the distributed network 300 may include two or more cluster registries. The information stored in the cluster registry 302 may also be cached on one or more other computers in the distributed network 300. For example, in one embodiment, every other computer in the distributed network 300 may cache the information stored in the cluster registry.

The cluster registry 302 may provide various services to requesters. Requesters may include other clusters or computers in the distributed network 300, or remote/external users and systems. Illustrative services that the cluster registry 302 may provide may include any combination of the following:

List all clusters—the cluster registry 302 provides a list of all of the clusters in the distributed network 300.

List all members of a cluster—the cluster registry 302 provides a list of computers, processors, or devices in a given cluster. This service may require a cluster ID to identify the given cluster, and may return a list of the network addresses (e.g., IP addresses) of the computers, processors, or devices in the identified cluster.

Create a cluster—the cluster registry 302 creates a new cluster with a new, unique cluster ID. In some embodiments, the requester of this service may be able to specify the new cluster ID or the computers in the new cluster. In other embodiments, the cluster registry 302 may automatically assign the new cluster ID and/or automatically assign computers to the new cluster.

Register/unregister a computer in a cluster—since the cluster registry 302 keeps track of the particular computers in the different clusters, when a computer joins or leaves a cluster, it may notify the cluster registry 302, which then updates the computer/cluster registration information. In some embodiments, instead of waiting for a notification from the computer, the cluster registry 302 may periodically query the computers in the distributed network 300 to update computer registration information. Thus, if computers have unplanned outages or are disconnected from a cluster/the distributed network 300 without notifying the cluster registry 302, the cluster registry 302 is still able to maintain an accurate list of computers in the distributed network 300.

Send notifications of changes to the registry—when registry information changes, for example due to the creation of a new cluster or the registration/unregistration of a computer in a cluster, the cluster registry 302 may notify other computers that cache registry information in the distributed network 300 of the changes and/or update the registry information cached on those computers. The notification/update procedure may occur periodically or dynamically.

For example, the cluster registry 302 may collect registry changes and provide notifications/updates every fraction of a second, second, fraction of a minute, or minute. In other embodiments, the cluster registry 302 may provide notifications/updates as soon as registry information is changed, to assure that the computers in the distributed network 300 cache the latest version of the registry information.

The cluster registry 302 may also be configured to provide other services. In some embodiments, the cluster registry may be implemented using an Apache Hadoop-derived ZooKeeper cluster.

Node storage cluster 304 and edge storage cluster 306 may store information about nodes and edges, respectively. In embodiments where the distributed network 300 includes multiple node storage clusters and/or multiple edge storage clusters, a particular node or edge in a graph representative of a network community (or information associated with the particular node or edge) may be stored on one particular node or edge storage cluster. In these embodiments, information about a particular node or edge may exist in a single storage cluster. Node/edge information may be stored in the form of data tables, described in more detail below with reference to FIGS. 4A-C.

In some embodiments, a database system that can be configured to run on computer clusters may be implemented on the storage clusters. For example, a storage cluster may use a PostgreSQL object-relational database management system. Each computer in a storage cluster may run both system software and database software in order to reduce network latency. The node storage cluster 304 and the edge storage cluster 306 may provide various services to requesters, which may include other clusters or computers in the distributed network 300, or remote/external users and systems. These services may be categorized as remote services, which may be implemented as remote procedure calls (RPCs) or Hypertext Transfer Protocol (HTTP) calls. In some embodiments, node storage cluster 304 may provide different remote services than edge storage cluster 306. In other embodiments, the requester may be the same computer the service is provided from, in which case the service is categorized as a local service. Local services may also vary according to type of storage cluster (node versus edge), or may be uniform across storage cluster type.

An example of a local service that may be uniform across storage cluster types is "Pick a computer in a cluster." This service allows a first computer to request the network address of a second computer in a cluster by providing a cluster ID. This local service may be used to distribute computational activity to all computers in a given cluster, so that processing load is distributed evenly across the computational resources available in a particular cluster. In some embodiments, the second computer may be selected via statistical techniques, round-robin techniques, any other suitable selection technique, or any combination thereof, and may take into account current computational/processing tasks. Selection of the second computer may be performed by consulting the cluster registry 302, or by consulting cached registry information on the first computer.

An example of a remote service that node storage cluster 304 may provide is "Traverse node". This service, when given a list of nodes, a direction, and an evaluation, traverses the nodes in the list with the direction and the evaluator. An example of pseudo-code for this service is described below:

```
public void traverseNodes(
```

-continued

```
int depth, long[ ] nodeIds, Direction direction, String
evaluatorClassName) {
    Evaluator eval =
    Evaluator.createEvaluator(evaluatorClassName);
    List<Integer> nodeIdsToTraverse = new
    ArrayList<Integer>( );
    // Reads nodes and evaluate each node
    List<Node> nodes = queryNodesFromDatabase(nodeIds);
    for (Node node : nodes) {
        if (eval.evaluateNode(depth, node))
            nodeIdsToTraverse.add(node.getLocalId( ));
    }
    // Get edge locators, depending on direction.
    // If direction is OUTGOING, query Outgoing_Edge;
    // otherwise query Incoming_Edge
    // The Map returned maps a cluster id to a set of edge
    local id's
    // within that cluster.
    Map<Integer, Set<Integer>> locators =
        queryEdgeLocatorsFromDatabase(direction,
        nodeIdsToTraverse);
    List<RemoteCall> calls = newArrayList<RemoteCall>( );
    for (Map.Entry<Integer, Set<Integer>> entry : locators) {
        int clusterId = entry.getKey( );
        int[ ] edgeIds = convertToIntArray(entry.getValues( ));
        String machine = pickMachineForCluster(clusterId);
        calls.add(
            makeAsynchronousRemoteTraverseEdgesCall(
            machine, depth, edgeIds, direction,
            evaluatorClassName
            )
        );
    }
    waitForCallToFinish(calls);
}
```

An example of a remote service that edge storage cluster 306 may provide is "Traverse edges". This service traverses a set of given edges. An example of pseudo-code for this service is described below:

```
public void traverseEdges(int depth, int[ ] edgeIds, Direction
direction,
    String evaluatorClassName) {
    Evaluator eval =
    Evaluator.createEvaluator(evaluatorClassName);
    List<Integer> edgesToTraverse = new ArrayList<Integer>( );
    // Read edges and evaluate each one
    List<Edge> edges = queryEdgesFromDatabase(edgeIds);
    for (Edge edge : edges) {
        if (eval.evaluateEdge(edge))
            edgesToTraverse.add(edge);
    }
    // Get node locators, depending on direction.
    // If direction is OUTGOING, get the head locators of the
    edges;
    // otherwise get the tail locators of the edges.
    // The Map returned maps a cluster id to a set of node local
    id's
    // within that cluster.
    Map<Integer, Set<Integer>> locators =
        queryNodeLocatorsFromDatabase(edgestToTraverse);
    List<RemoteCall> calls = new ArrayList<RemoteCall>( );
    for (Map.Entry<Integer, Set<Integer>> entry : locators) {
        int clusterId = entry.getKey( );
        int[ ] nodeIds = convertToIntArray(entry.getValues( ));
        String machine = pickMachineForCluster(clusterId);
        calls.add(
            makeAsynchronousRemoteTraverseNodesCall(
            machine, depth + 1, edgeIds, direction,
            evaluatorClassName
            );
        );
    }
}
```

Using the "Traverse nodes" and "Traverse edges" services described above, graphs representative of network communities stored on the distributed network 300 may be traversed. In one embodiment, given a start node, the cluster registry 302 (or cached registry information) is consulted to determine the particular cluster on which the start node is stored. A remote call to the "Traverse nodes" service may then be made, passing a depth of 0, the start node, a desired direction, such as "INCOMING" or "OUTGOING", and an evaluator class. From there, alternate calls to the "Traverse edges" service and the "Traverse nodes" service may be made until the traversal is complete. Completion of the traverse may be determined by the evaluator class. In certain embodiments, this traversal may not guarantee any kind of order, such as Depth First or Breadth First order, because the computation of the traversal may be distributed across the computers in one or more clusters, and may not result in visiting nodes sequentially.

In the pseudo-code shown above for the "Traverse nodes" and "Traverse edges" services, one or more objects that inherit from an "Evaluator" abstract class may be used. An example of pseudo-code for the "Evaluator" abstract class is described below:

```
abstract class Evaluator {
    private static Map<String, Evaluator> evaluators = new
    HashMap<String, Evaluator>( );
    public static Evaluator createEvaluator(String name) {
        Evaluator result = evaluators.get(name);
        if (result == null) {
            result = Class.forName(name).newInstance( );
            // the evaluator should listen on the network for a
            query
            // from the remote caller.
            listenForQueries(result);
            // Let the remote caller know of this evaluator's
            existence,
            // so the remote caller can query it later.
            registerEvaluatorWithRemoteCaller( );
            evaluators.put(name, result);
        }
        return result;
    }
    public abstract void evaluateEdge(Edge edge);
    public abstract void evaluateNode(int depth, Node node);
}
```

For example, pseudo-code for an evaluator that counts nodes and edges is described below:

```
class NodeAndEdgesCounter extends Evaluator {
    private int nodes;
    private int edges;
    @Override
    public void evaluateEdge(Edge edge) {
        edges++;
    }
    @Override
    public void evaluateNode(int depth, Node node) {
        nodes++;
    }
    @RemoteCall
    public int getNodeCount( ) { return nodes; }
    @RemoteCall
    public int getEdgeCount( ) { return edges ; }
}
```

The @RemoteCall annotation in the example pseudo-code above indicates that those particular methods ("getNodeCount( )" and "getEdgeCount( )") may be called remotely.

Figure 4A:
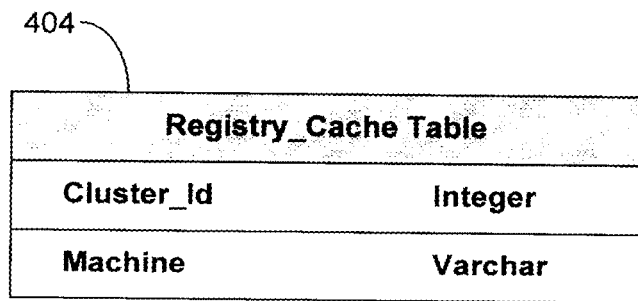
FIGS. 4A-C show illustrative data tables for graph information storage in a distributed storage/computation network in accordance with one embodiment of the invention.
Figure 4B:
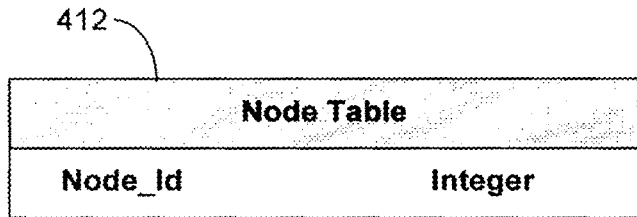
Figure 4B:
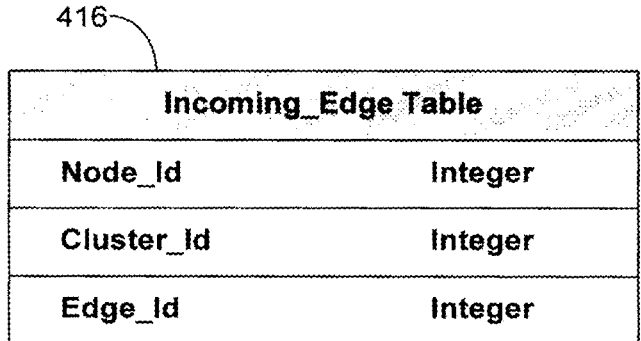
Figure 4C:
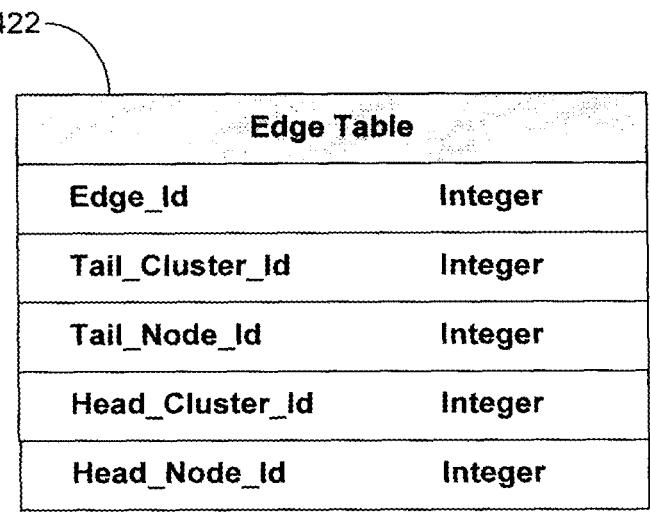

FIG. 4A-C shows illustrative data tables for graph information storage in a distributed storage/computation network, such as distributed network 300, in accordance with one embodiment of the invention. FIG. 4A shows common data tables 400 that may be stored on each computer and/or cluster in the distributed network 300. For example, a particular computer may store cluster information table 402, which includes information about the cluster the particular computer is in. The cluster information table 402 may include a unique identifier or ID assigned to the cluster, along with the particular type of cluster (e.g., node storage or edge storage) it is. A particular computer may also store a registry cache table 404, which may be a cache of the data stored in the cluster registry 302. The registry cache table 404 may store the unique ID for each cluster in the distributed network 300, as well as an identifier (such as a network/IP address) for each computer in each cluster.

Data tables 410, shown in FIG. 4B, may store information about nodes in a network community, and may be stored on computers in node storage cluster 304. In some embodiments, each node storage cluster is responsible for a subset of the nodes in a network community, and stores the information for that subset of nodes. For example, a node table 412 stored on computers in node storage cluster 304 may contain information only for nodes that node storage cluster 304 is responsible for. Node table 412 may store an identifier for a node stored in a particular node storage cluster, and each node may have a different node table. The identifier may be a unique, local identifier used to identify the node within the cluster. In other embodiments, the node table 412 may also store application specific data. For example, for the purposes of calculating a trust score, node table 412 may store a mean trust value and/or a trust value standard deviation for the node.

In some embodiments, computers in node storage cluster 304 may also store an outgoing edge storage table 414. Outgoing edge storage table 414 may store all outgoing edges for all nodes in a given cluster. For example, an outgoing edge storage table stored on computers in node storage cluster 304 may only store outgoing edge information for nodes that storage cluster 304 is responsible for. For each outgoing edge, the storage table 414 may store a node identifier that identifies the particular node within node storage cluster 304 that is associated with the outgoing edge. The storage table 414 may also store a cluster identifier for the edge that identifies the particular cluster the edge is stored in, as well as an edge identifier that identifies the edge in that particular cluster.

In some embodiments, computers in node storage cluster 304 may also store an incoming edge storage table 416. Incoming edge storage table 416 may store all incoming edges for all nodes in a given cluster, and in some embodiments may be structurally similar to outgoing edge storage table 414. For example, an incoming edge storage table stored on computers in node storage cluster 304 may only store incoming edge information for nodes that storage cluster 304 is responsible for. For each incoming edge, the storage table 416 may store a node identifier that identifies the particular node within node storage cluster 304 that is associated with the incoming edge. The storage table 416 may also store a cluster identifier for the edge that identifies the particular cluster the edge is stored in, as well as an edge identifier that identifies the edge in that particular cluster.

Data table 420, shown in FIG. 4C, may store information about edges in a network community, and may be stored on computers in edge storage cluster 306. In some embodiments, each edge storage cluster is responsible for a subset of the edges in a network community, and stores the information for that subset of edges. For example, an edge table 422 stored on computers in edge storage cluster 306 may only contain information for edges that edge storage cluster 306 is responsible for. Edge table 422 may store an identifier for an edge stored in a particular edge storage cluster, and each edge may have a different edge table 422. The identifier may be a unique, local identifier used to identify the edge within the cluster. The edge table 422 may also store information about the nodes that a particular edge connects. In some embodiments, an edge may be a directed edge that links a head node and a tail node. In these embodiments, the edge table 422 may store a cluster identifier and a node identifier for each of the head node and the tail node. The cluster identifier identifies the particular node storage cluster in the distributed system 300 that the head or tail node is stored in, and the node identifier identifies the particular head or tail node within that node storage cluster. In other embodiments, other data tables may be stored in cluster registry 302, node storage cluster 304, or edge storage cluster 306.

Figure 5A:
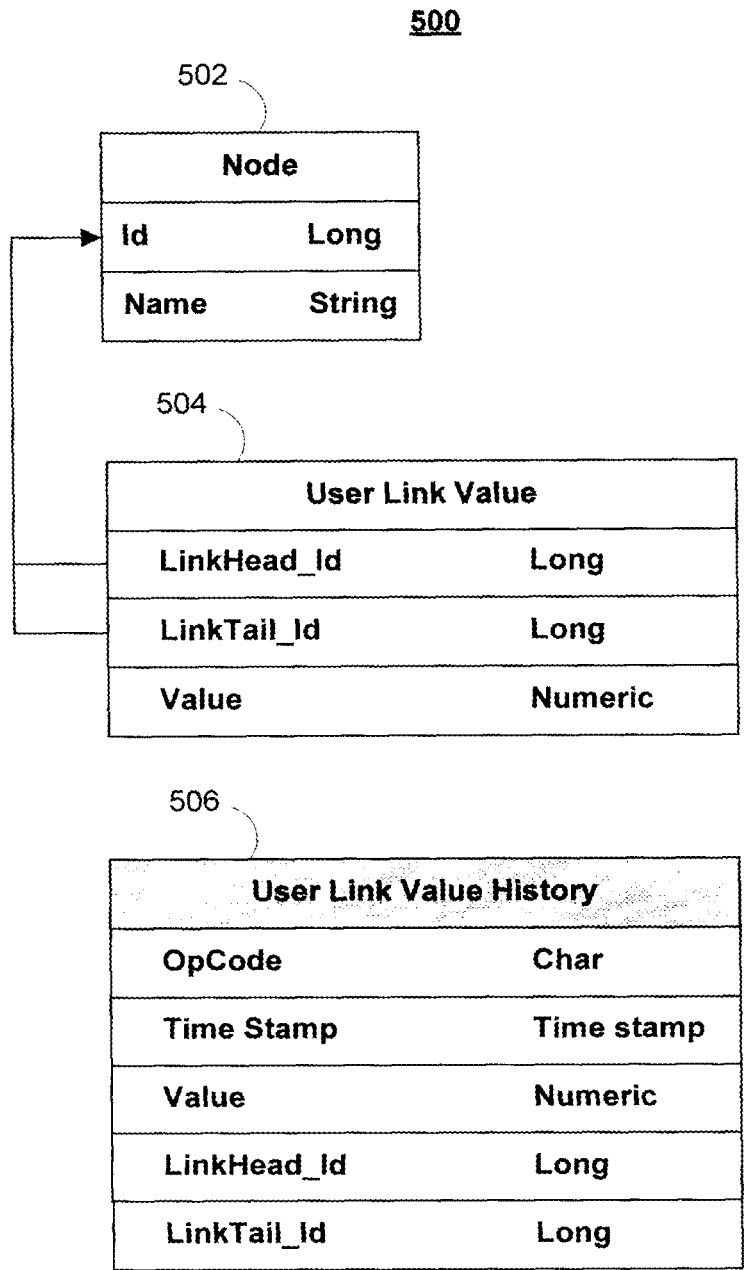

FIG. 5A shows illustrative data tables 500 used to support the connectivity determinations of the present invention. One or more of tables 500 may be stored in, for example, a relational database in data store 110 (FIG. 1). Table 502 may store an identification of all the nodes registered in the network community. A unique identifier may be assigned to each node and stored in table 502. In addition, a string name may be associated with each node and stored in table 502. As described above, in some embodiments, nodes may represent individuals or entities, in which case the string name may include the individual or person's first and/or last name, nickname, handle, or entity name.

Table 504 may store user connectivity values. User connectivity values may be positive, indicating some degree of trust between two or more parties, or may be negative, indicating some degree of distrust between two or more parties. In some embodiments, user connectivity values may be assigned automatically by the system (e.g., by application server 106 (FIG. 1)). For example, application server 106 (FIG. 1) may monitor all electronic interaction (e.g., electronic communication, electronic transactions, or both) between members of a network community. In some embodiments, a default user connectivity value (e.g., the link value 1) may be assigned initially to all links in the network community. After electronic interaction is identified between two or more nodes in the network community, user connectivity values may be adjusted upwards or downwards depending on the type of interaction between the nodes, the content of the interaction, and/or the result of the interaction. For example, each simple email exchange between two nodes may automatically increase or decrease the user connectivity values connecting those two nodes by a fixed amount. In some embodiments, the content of the emails in the email exchange may be processed by, for example, application server 106 (FIG. 1) to determine the direction of the user connectivity value change as well as its magnitude. For example, an email exchange regarding a transaction executed in a timely fashion may increase the user connectivity value, whereas an email exchange regarding a missed deadline may decrease the user connectivity value. The content of the email exchange or other interaction may be processed by using heuristic and/or data/text mining techniques to parse the content of the interaction. For example, a language parser may be used to identify keywords in the email exchange. In some embodiments, individual emails and/or the email exchange may be processed to identify keywords that are associated with successful/favorable transactions and/or keywords that are associated with unsuccessful/unfavorable transactions, and the difference between the frequency/type of the keywords may affect the user connectivity value. In certain embodiments, natural language parsers may be used to extract semantic meaning from structured text in addition to keyword detection.

More complicated interactions (e.g., product or service sales or inquires) between two nodes may increase or decrease the user connectivity values connecting those two nodes by some larger fixed amount. In some embodiments, user connectivity values between two nodes may always be increased unless a user or node indicates that the interaction was unfavorable, not successfully completed, or otherwise adverse. For example, a transaction may not have been timely executed or an email exchange may have been particularly displeasing. Adverse interactions may automatically decrease user connectivity values while all other interactions may increase user connectivity values (or have no effect). In some embodiments, the magnitude of the user connectivity value change may be based on the content of the interactions. For example, a failed transaction involving a small monetary value may cause the user connectivity value to decrease less than a failed transaction involving a larger monetary value. In addition, user connectivity values may be automatically harvested using outside sources. For example, third-party data sources (such as ratings agencies and credit bureaus) may be automatically queried for connectivity information. This connectivity information may include completely objective information, completely subjective information, composite information that is partially objective and partially subjective, any other suitable connectivity information, or any combination of the foregoing.

In some embodiments, user connectivity values may be manually assigned by members of the network community. These values may represent, for example, the degree or level of trust between two users or nodes or one node's assessment of another node's competence in some endeavor. As described above, user connectivity values may include a subjective component and an objective component in some embodiments. The subjective component may include a trustworthiness "score" indicative of how trustworthy a first user or node finds a second user, node, community, or subcommunity. This score or value may be entirely subjective and based on interactions between the two users, nodes, or communities. A composite user connectivity value including subjective and objective components may also be used. For example, third-party information may be consulted to form an objective component based on, for example, the number of consumer complaints, credit score, socio-economic factors (e.g., age, income, political or religions affiliations, and criminal history), or number of citations/hits in the media or in search engine searches. Third-party information may be accessed using communications network 104 (FIG. 1). For example, a third-party credit bureau's database may be polled or a personal biography and background information, including criminal history information, may be accessed from a third-party database or data source (e.g., as part of data sources 108 (FIG. 1) or a separate data source) or input directly by a node, user, or system administrator. In some embodiments, the third-party data source(s) or system(s) may also include third-party user connectivity values and transaction histories, related to user interactions with the third-party system(s). In these embodiments, the user connectivity value or composite user connectivity value may also include one or more components based on the third-party user connectivity values and transaction histories.

In other embodiments, the user connectivity or trust value may be calculated objectively. In one embodiment, the trust value of a first node for a second node may be calculated based on the number of paths linking the two nodes, one or more path scores associated with the linking paths, connectivity statistics associated with the first node, and/or other connectivity information associated with the first node.

Table 504 may store an identification of a link head, link tail, and user connectivity value for the link. Links may or may not be bidirectional. For example, a user connectivity value from node $n_1$ to node $n_2$ may be different (and completely separate) than a link from node $n_2$ to node $n_1$. Especially in the trust context described above, each user can assign his or her own user connectivity value to a link (i.e., two users need not trust each other an equal amount in some embodiments).

Table 506 may store an audit log of table 504. Table 506 may be analyzed to determine which nodes or links have changed in the network community. In some embodiments, a database trigger is used to automatically insert an audit record into table 506 whenever a change of the data in table 504 is detected. For example, a new link may be created, a link may be removed, and/or a user connectivity value may be changed. This audit log may allow for decisions related to connectivity values to be made prospectively (i.e., before an anticipated event). Such decisions may be made at the request of a user, or as part of an automated process, such as the processes described below with respect to FIG. 10. This prospective analysis may allow for the initiation of a transaction (or taking of some particular action) in a fluid and/or dynamic manner. After such a change is detected, the trigger may automatically create a new row in table 506. Table 506 may store an identification of the changed node, identification of the changed link head, changed link tail, and/or the user connectivity value to be assigned to the changed link. Table 506 may also store a timestamp indicative of the time of the change and/or an operation code. In some embodiments, operation codes may include "insert," "update," and/or "delete" operations, corresponding to whether a link was inserted, a user connectivity value was changed, or a link was deleted, respectively. Other operation codes may be used in other embodiments.

FIG. 5B shows illustrative data structure 510 used to support the connectivity determinations of the present invention. In some embodiments, data structure 510 may be stored using key-value store 112 (FIG. 1), while tables 500 are stored in data store 110 (FIG. 1). As described above, key-value store 112 (FIG. 1) may implement an HBase storage system and include BigTable support. Like a traditional relational database management system, the data shown in FIG. 5B may be stored in tables. However, the BigTable support may allow for an arbitrary number of columns in each table, whereas traditional relational database management systems may require a fixed number of columns.

Data structure 510 may include node table 512. In the example shown in FIG. 5B, node table 512 includes several columns. Node table 512 may include row identifier column 514, which may store 64-bit, 128-bit, 256-bit, 512-bit, or 1024-bit integers and may be used to uniquely identify each row (e.g., each node) in node table 512. Column 516 may include a list of all the incoming links for the current node. Column 518 may include a list of all the outgoing links for the current node. Node table 512 may also include one or more "bucket" columns 520 and 522. These columns may store a list of paths that connect, for example, a source node to the current node, the current node to a target node, or both. As described above, grouping paths by the last node in the path (e.g., the target node), the first node in the path (e.g., the source node), or both, may facilitate connectivity computations. As shown in FIG. 5B, in some embodiments, to facilitate scanning, bucket column names may include the target node identifier appended to the end of the "bucket:" column name.

Figure 5C:
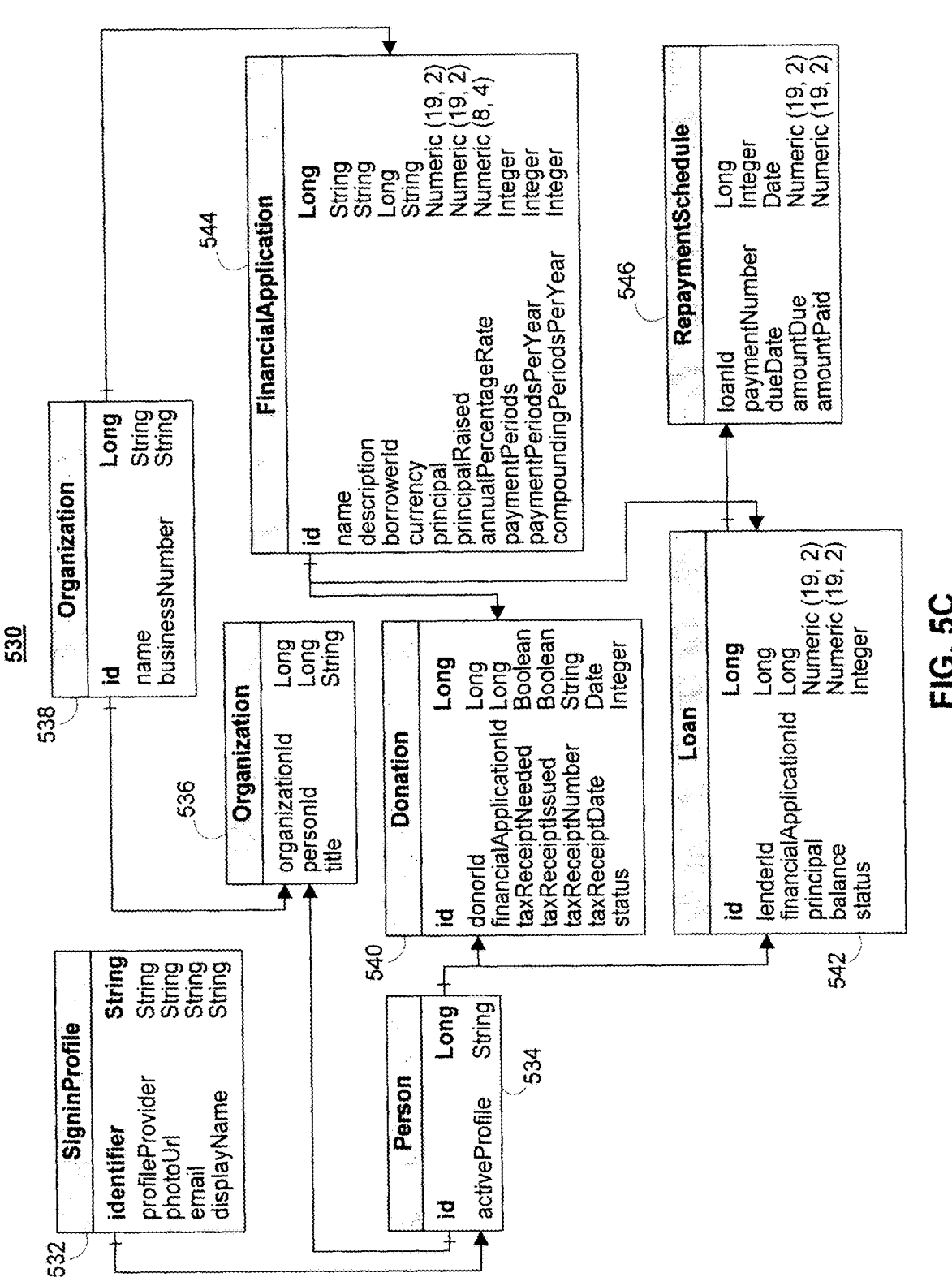

FIG. 5C shows illustrative database schema 530 used to facilitate financial transactions. Table 532 includes information related to users' sign-in profiles. For example, a user may have accounts for multiple email, social networking services, other online or network services, or any combination of the foregoing. Each of these accounts may be included in a separate sign-in profile associated with the user. As such, a single user may be associated with one or more sign-in profiles. In some embodiments, instead of including a distinct sign-in system specific to the connectivity system, a user may sign in to one of these existing accounts or services identified in a sign-in profile, and then the connectivity system may ask the existing service to vouch for or verify the identity of the user. Table 532 may include a string identification of the service or provider associated with the profile, a unique identifier associated with the profile, an email or username field, and a nickname, handle, or real name field.

For example, a user may wish to log into the connectivity system (or some loan or financial transaction system that uses the connectivity system) using access application 102 (FIG. 1). Application server 106 (FIG. 1) may then ask the user which service (of a list of available external services) to use for authentication. Application server 106 (FIG. 1) may then redirect the user to the external service's sign-in mechanism. The external service may then redirect the user back to the connectivity system (for example, a web page hosted by application server 106 (FIG. 1)). Application server 106 (FIG. 1) may then lookup the sign-in profile (e.g., in table 532) in order to identify the user.

Table 534 may include an indication of a person or node in the network community. For example, the person associated with table 534 may be an officer in a financial institution, a lender, a borrower, or a donor. Officer table 536 may include a unique identifier representing the financial institution associated with the officer and identified in organization table 538. Donation table 540 and loan table 542 may include any suitable information related to donations or loans, respectively, available on the network. Donation table 540 may include such information as a unique identifier associated with a donation, a unique identifier associated with the donor, a unique identifier associated with the financial application, whether or not a tax receipt is needed, whether or not a tax receipt has been issued, the tax receipt number, the tax receipt date, and a status indicator. The status indicator may include "0" if the donation is still waiting for a check as a source of funding for the donation, a "1" if the donation is still waiting for an external payment system as a source of funding for the donation, "2" if the donation has been canceled by the user, the financial application, the officer, or financial institution, "3" if the donation is currently active, "4" is the donation has been completed, "5" if the donor has defaulted, "6" is the donation is associated with a refund amount.

Similarly, loan table 542 may include a unique identifier associated with a loan, a unique identifier associated with the financial application, a unique identifier associated with the lender, the principal of the loan, the balance of the loan (e.g., the remaining principal on the loan), and a status indication. The status indicator may be the same as the status indicators described above with respect to the donation table. Financial application table 544 may identify the loans, donations, or other types of financial applications available in the network. Financial application table 544 may include a unique identifier for the application, a string description associated with the application (which may also include attribute flags and other metadata associated with the financial application and used in determining publication groups, as described in more detail with regard to FIG. 10 below), a unique borrower identifier, a currency type indication, the principal requested or available, the principal raised, the interest rate associated with the loan or donation, the payment period, the number of payment periods per year, and the number of compounding periods per year. Some fields in financial application table 544 may only apply to loan type applications or donation type applications.

In some embodiments, the description field in financial application table 544 may include "LIKE" and "DISLIKE" flags identifying affinity groups, blogs, newsgroups, and other information used to determine what nodes or users may be interested or not interested in a particular financial application. These flags may be used in determining publication groups, as described in more detail below. For example, a mortgage type financial application may include a "LIKE" flag for users or nodes interested in securing real property (e.g., users or nodes belonging to a real estate affinity group or real estate blog or newsgroup). As another example, a donation type financial application to support same-sex marriage may include a "LIKE" flag for users or nodes subscribed to the Human Rights Campaign or American Civil Liberties Union affinity group and a "DISLIKE" flag for users or nodes belonging to "Yes on Prop 8" or defense of marriage affinity group. Other attribute flags may also be defined in financial application table 544. These flags may be created by the sponsor or creator of the financial application and may be customized by users initiating financial transactions, in some embodiments.

Repayment schedule table 546 may be associated with each loan in loan table 542. Repayment schedule table 546 may include a unique identifier associated with the loan to which the repayment schedule relates, the current payment number, the due date for the net payment, the total amount due, and the total amount paid. Repayment schedule table 546 may be automatically generated, in some embodiments, whenever a new loan is created or initiated by a user and approved.

In a typical usage scenario, a user may be notified when certain users in the user's network have initiated a new financial transaction using a financial application identified in financial application table 544. For example, in some embodiments, users are notified whenever any other user initiates a financial transaction. In other embodiments, users are only notified about financial transactions made by other users meeting some threshold path weight or threshold user connectivity value with the to-be-notified user. For example, a message may be sent to second user that a first user has loaned $10,000 to "Save the Pandas" and that the specific financial application is the "Wildlife Sanctuary Project." This message may appear in email, as a pop-up message, or displayed as a link on the user's homepage, profile page, or initial log-in page.

The notified user may also decide to initiate a financial transaction using the same financial application. The user may then decide whether to fund the transaction using a check or using an external payment system (such as PayPal). Before the funding is received, the transaction may be marked as "waiting" for either a check or external payment system. For example, the status indicators in donation table 540 or loan table 542 may be set to "0" or "1". A repayment schedule may then be generated. For example, repayment schedule table 546 may be populated.

After funding has been received, the transaction may be marked as "active" and repayments may begin (depending on the transaction type). Repayments may be made, in some embodiments, by mailing a check, direct deposit, using an external payment system, or using any other suitable mechanism.

Although FIG. 5C shows one illustrative arrangement for schema 530, any other suitable schema may also be used. For example, more or fewer tables than those shown in FIG. 5C may be defined, each including more or fewer fields. In addition, although a relational database management system may be used in some embodiments to save and access information in accordance with schema 530, any other storage or access mechanism may be used in other embodiments.

Figure 6A:
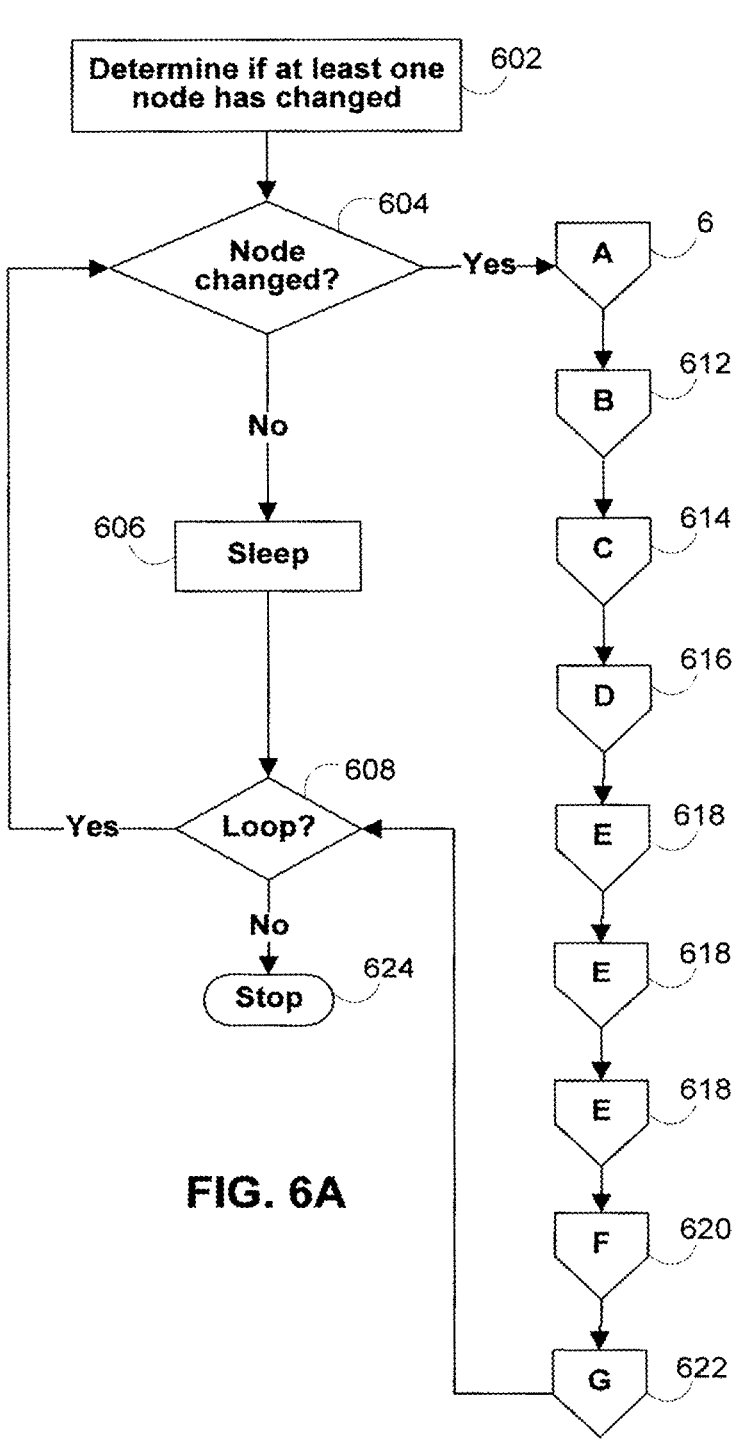
FIGS. 6A-6H show illustrative processes for supporting connectivity determinations within a network community in accordance with one embodiment of the invention.

FIGS. 6A-6H show illustrative processes for determining the connectivity of nodes within a network community. FIG. 6A shows process 600 for updating a connectivity graph (or any other suitable data structure) associated with a network community. As described above, in some embodiments, each network community is associated with its own connectivity graph, digraph, tree, or other suitable data structure. In other embodiments, a plurality of network communities may share one or more connectivity graphs (or other data structure).

In some embodiments, the processes described with respect to FIGS. 4A-4C and 6A-6H may be executed to make decisions prospectively (i.e., before an anticipated event). Such decisions may be made at the request of a user, or as part of an automated process, such as the processes described below with respect to FIGS. 7-10. This prospective analysis may allow for the initiation of a transaction (or taking of some particular action) in a fluid and/or dynamic manner.

In some embodiments, the processes described with respect to FIGS. 4A-4C and 6A-6H may be executed to provide information to a user. Such presentations may be made at the request of a user, or as part of an automated presentation. This information may include, but is not limited to, static and/or interactive visualizations of connectivity values within a user's associated network community or communities. In some embodiments, this information may be integrated into explorations of or interactions within a user's associated network community or communities. Providing this information to a user may allow the user to better understand what other individuals and/or entities they may trust within a network community, and/or may encourage and/or discourage particular interactions within a user's associated network community or communities.

At step 602, a determination is made whether at least one node has changed in the network community. As described above, an audit record may be inserted into table 506 (FIG. 5) after a node has changed. By analyzing table 506 (FIG. 5), a determination may be made (e.g., by application server 106 of FIG. 1) that a new link has been added, an existing link has been removed, or a user connectivity value has changed. If, at step 604, it is determined that a node has changed, then process 600 may continue to step 610 (shown in FIG. 6B) to process the changed links, step 612 (shown in FIG. 6C) to save the nodes with changed links, step 614 (shown in FIG. 6D) to create path set input files, step 616 (shown in FIG. 6E) to remove paths with changed nodes, one or more iterations of step 618 (shown in FIG. 6F) to grow paths by one link at a time, step 620 (shown in FIG. 6G) to save the paths that have grown by one or more links, and step 622 (shown in FIG. 6H) to join paths that go through changed nodes. It should be noted that more than one step or task shown in FIGS. 6B, 6C, 6D, 6E, 6F, 6G, and 6H may be performed in parallel using, for example, a cluster of cores. For example, multiple steps or tasks shown in FIG. 6B may be executed in parallel or in a distributed fashion, then multiple steps or tasks shown in FIG. 6C may be executed in parallel or in a distributed fashion, then multiple steps or tasks shown in FIG. 6D may be executed in parallel or in a distributed fashion, then multiple steps or tasks shown in FIG. 6E may be executed in parallel or in a distributed fashion, and so on. In this way, overall latency associated with process 600 may be reduced.

As described above, step 618 may be executed one or more times. This step may be operative to grow paths by a single link. Each iteration of step 618 may take as input the results of a previous iteration of step 618 so that paths may grow by more than one link, if desired. In the example of FIG. 6A, three iterations of step 618 are shown. Thus, process 600 may generate paths with lengths less than or equal to three. In other embodiments, more or fewer iterations of step 618 may allow process 600 to generate paths with more or fewer links.

If a node change is not detected at step 604, then process 600 enters a sleep mode at step 606. For example, in some embodiments, an application thread or process may continuously check to determine if at least one node or link has changed in the network community. In other embodiments, the application thread or process may periodically check for changed links and nodes every n seconds, where n is any positive number. After the paths are calculated that go through a changed node at step 616 or after a period of sleep at step 606, process 600 may determine whether or not to loop at step 608. For example, if all changed nodes have been updated, then process 600 may stop at step 618. If, however, there are more changed nodes or links to process, then process 600 may loop at step 608 and return to step 604.

In practice, one or more steps shown in process 600 may be combined with other steps, performed in any suitable order, performed in parallel (e.g., simultaneously or substantially simultaneously), or removed.

Figure 6B:
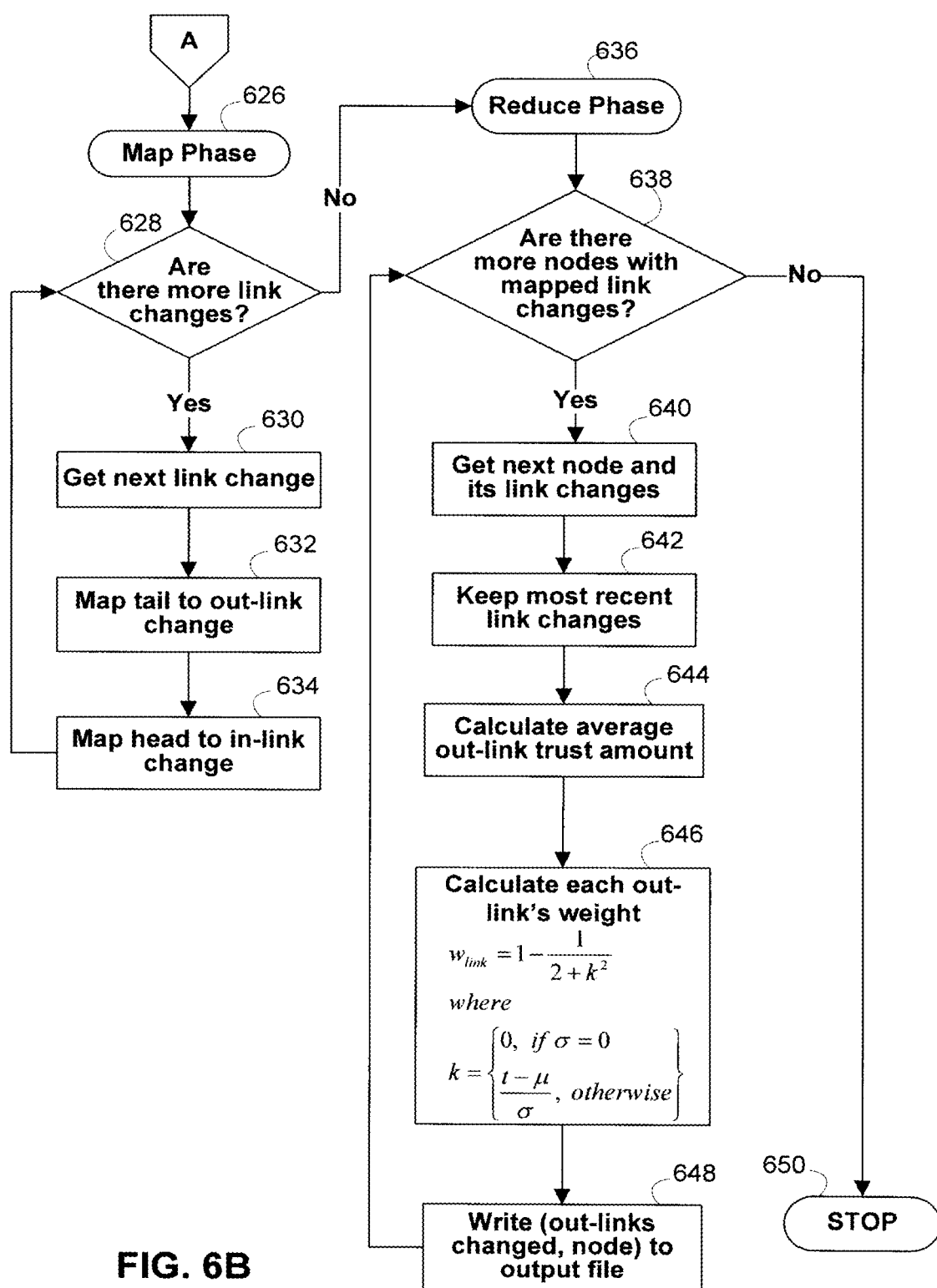

FIGS. 6B-6H each include processes with a "map" phase and "reduce" phase. As described above, these phases may form part of a map/reduce computational paradigm carried out by parallel computational framework 114 (FIG. 1), key-value store 112 (FIG. 1), or both. As shown in FIG. 6B, in order to process link changes, map phase 626 may include determining if there are any more link changes at step 628, retrieving the next link change at step 630, mapping the tail to out-link change at step 632, and mapping the head to in-link change at step 634.

If there are no more link changes at step 628, then, in reduce phase 636, a determination may be made at step 638 that there are more nodes with mapped link changes to process. If so, then the next node and its link changes may be retrieved at step 640. The most recent link changes may be preserved at step 642 while any intermediate link changes are replaced by more recent changes. For example, the timestamp stored in table 506 (FIG. 5) may be used to determine the time of every link or node change. At step 644, the average out-link user connectivity value may be calculated. For example, if node $n_1$ has eight out-links with assigned user connectivity values, these eight user connectivity values may be averaged at step 644. At step 646, each out-link's weight may be calculated in accordance with equation (1) or (2) above. At step 648, an output file may be created or appended with the out-links changed and corresponding changed node identifier. For example, one or more (out-links changed, node identifier) records may be written to the output file. Although the term "file" is sometimes used herein, the output need not be in a literal file or even file format. For example, any output stream, whether or not it is recorded, may be used. In some embodiments, some or all of the output file may be passed directly to a calling application, process, or function from a returning application, process, or function in the form of a stream or object return value. If there are no more nodes and link changes to process at step 638, the process may stop at step 650.

Figure 6C:
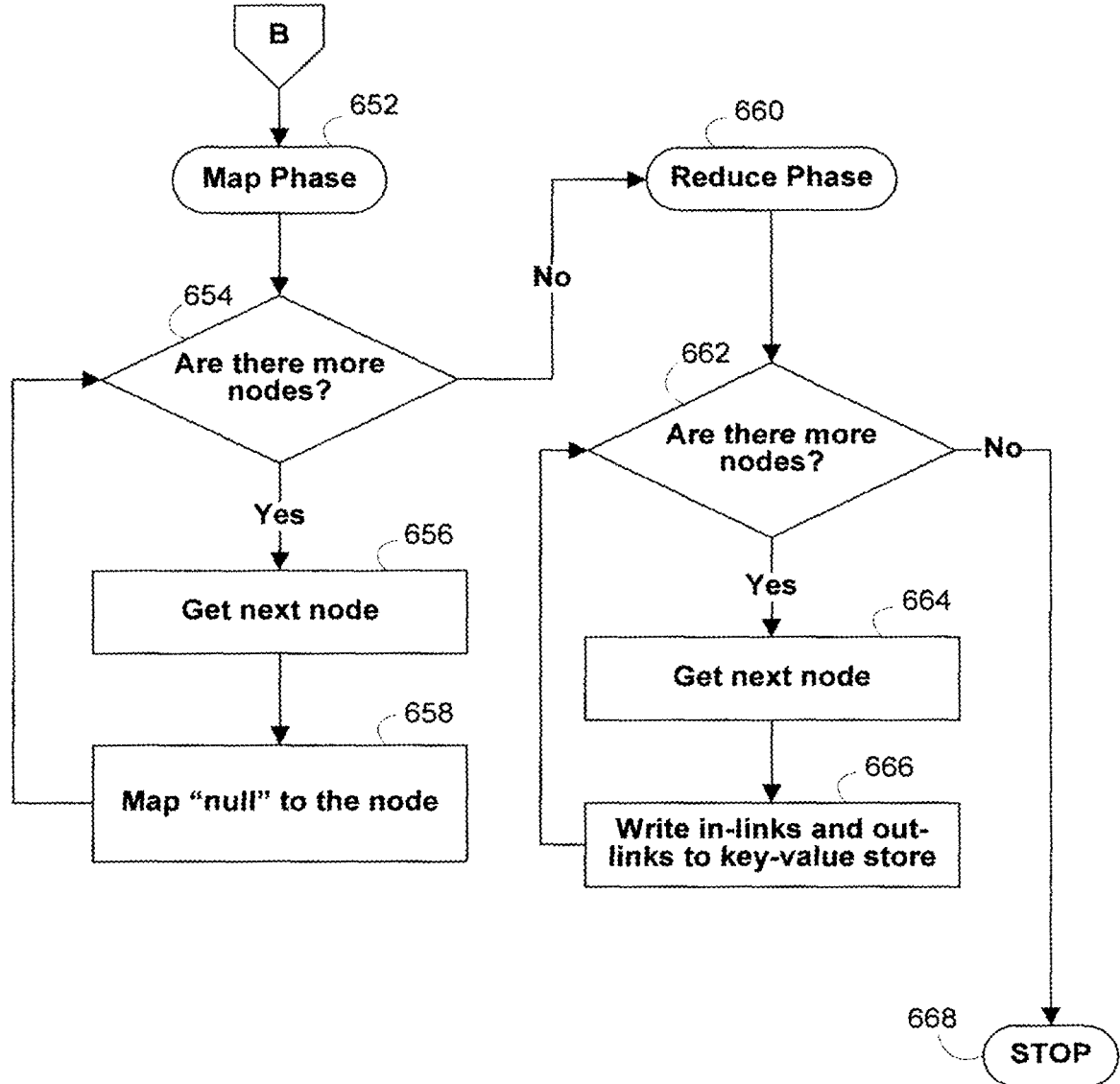

As shown in FIG. 6C, in order to save nodes with changed links, map phase 652 may include determining if there are any more changed nodes at step 654, retrieving the next changed node at step 656, and mapping "null" to the node at step 658.

If there are no more changed nodes at step 654, then, in reduce phase 660, a determination may be made at step 662 that there are more nodes to process. If so, then the next node may be retrieved at step 664. At step 666, the in-links and out-links associated with the node may be written to a key-value store (e.g., key-value store 112 of FIG. 1). As described above, the key-value store may implement an HBase cluster (or any other compressed, high performance database system, such as BigTable). If there are no more nodes to process at step 662, the process may stop at step 668.

Figure 6D:
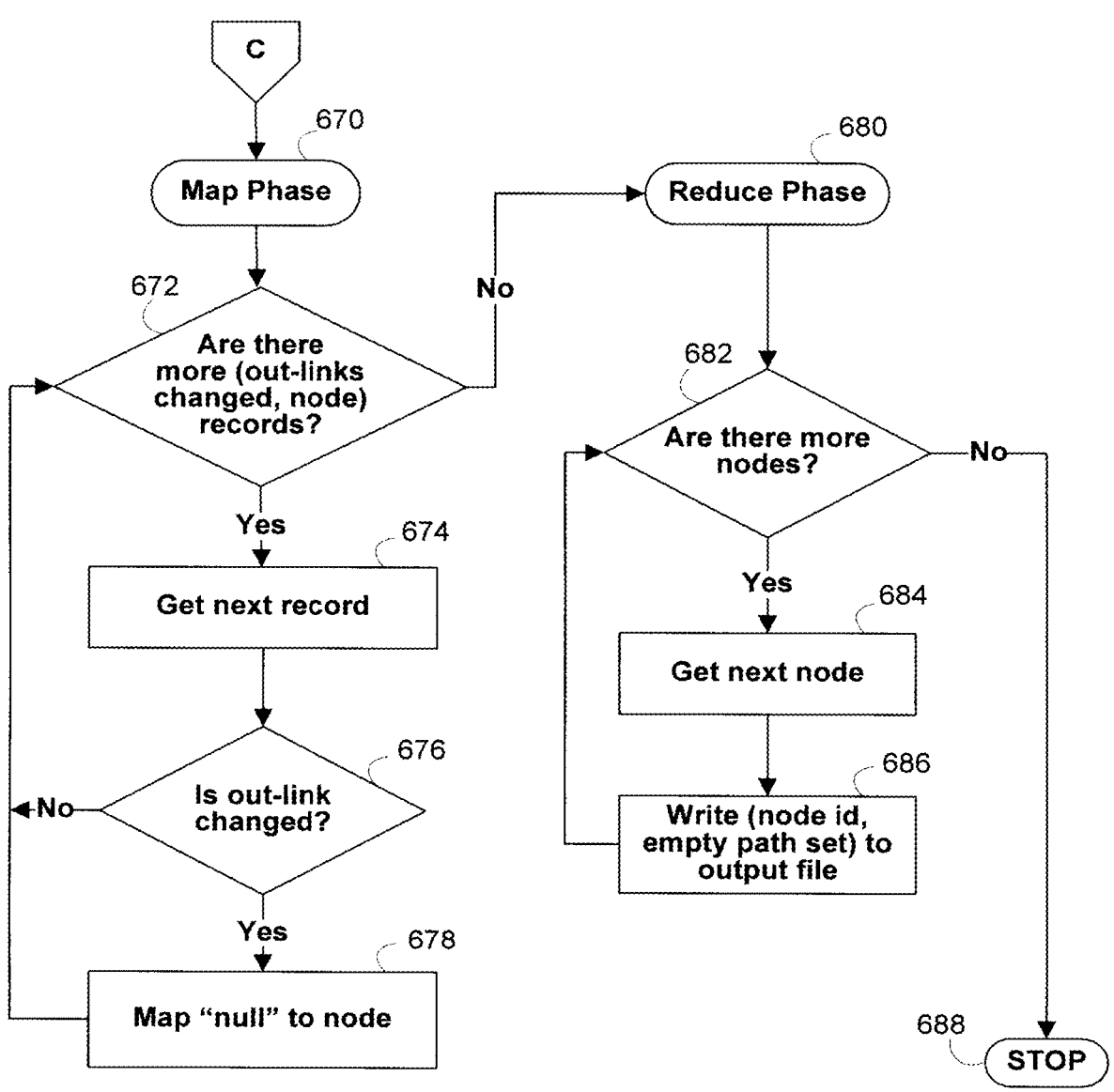

As shown in FIG. 6D, in order to create path set input files, map phase 670 may include determining if there are any more (out-links changed, node identifier) records in the output file created or appended at step 648 (FIG. 6B). If so, the next record may be retrieved at step 674. At step 676, a determination may be made if an out-link has changed. If so, then at step 678 a "null" value may be mapped to the node. Otherwise, map phase 670 may return to step 672 to determine if there are any more (out-links changed, node identifier) records in the output file.

If there are no more changed records at step 672, then, in reduce phase 680, a determination may be made at step 682 that there are more node to process. If so, then the next node may be retrieved at step 684. At step 686, new records may be written to the output file. In some embodiments, the records written at step 686 may include records of the form (node identifier, empty path set for the node identifier). If there are no more nodes to process at step 682, the process may stop at step 688.

Figure 6E:
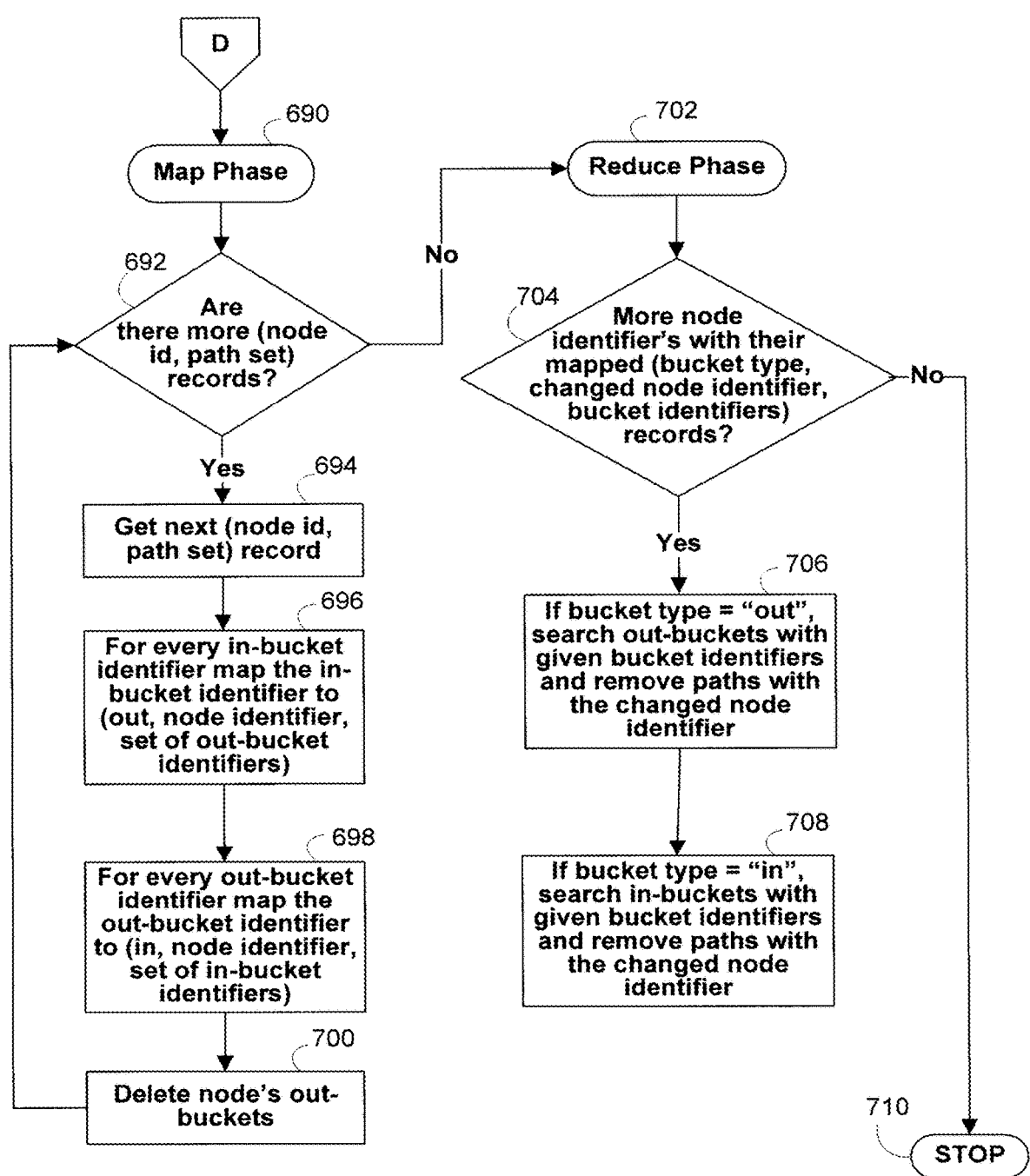

As shown in FIG. 6E, in order to remove paths with changed nodes, map phase 690 may include determining if there are any more (node identifier, path set) records in the output file at step 692 and retrieving the next such record at step 694. At step 696, for every "in" bucket identifier, the "in" bucket identifier may be mapped to a record of the form (out bucket type, node identifier, set of "out" bucket identifiers) (or any other suitable form). At step 698, for every "out" bucket identifier, the "out" bucket identifier may be mapped to a record of the form (in bucket type, node identifier, set of "in" bucket identifiers) (or any other suitable form). At step 700, the node's "out" buckets may be deleted, and the process may return to step 692 to determine if there are more records to process.

If there are no more records at step 692, then, in reduce phase 702, a determination may be made at step 704 that there are more node identifiers with their mapped (bucket type, changed node identifier, bucket identifiers) records to process. If so, then at step 706, if the bucket type is "out", out-buckets with the given bucket identifiers may be searched and paths with the changed node identifier may be removed. At step 708, if the bucket type is "in", in-buckets with the given bucket identifiers may be searched and paths with the changed node identifier may be removed. If there are no more records to process at step 704, the process may stop at step 710.

Figure 6F:
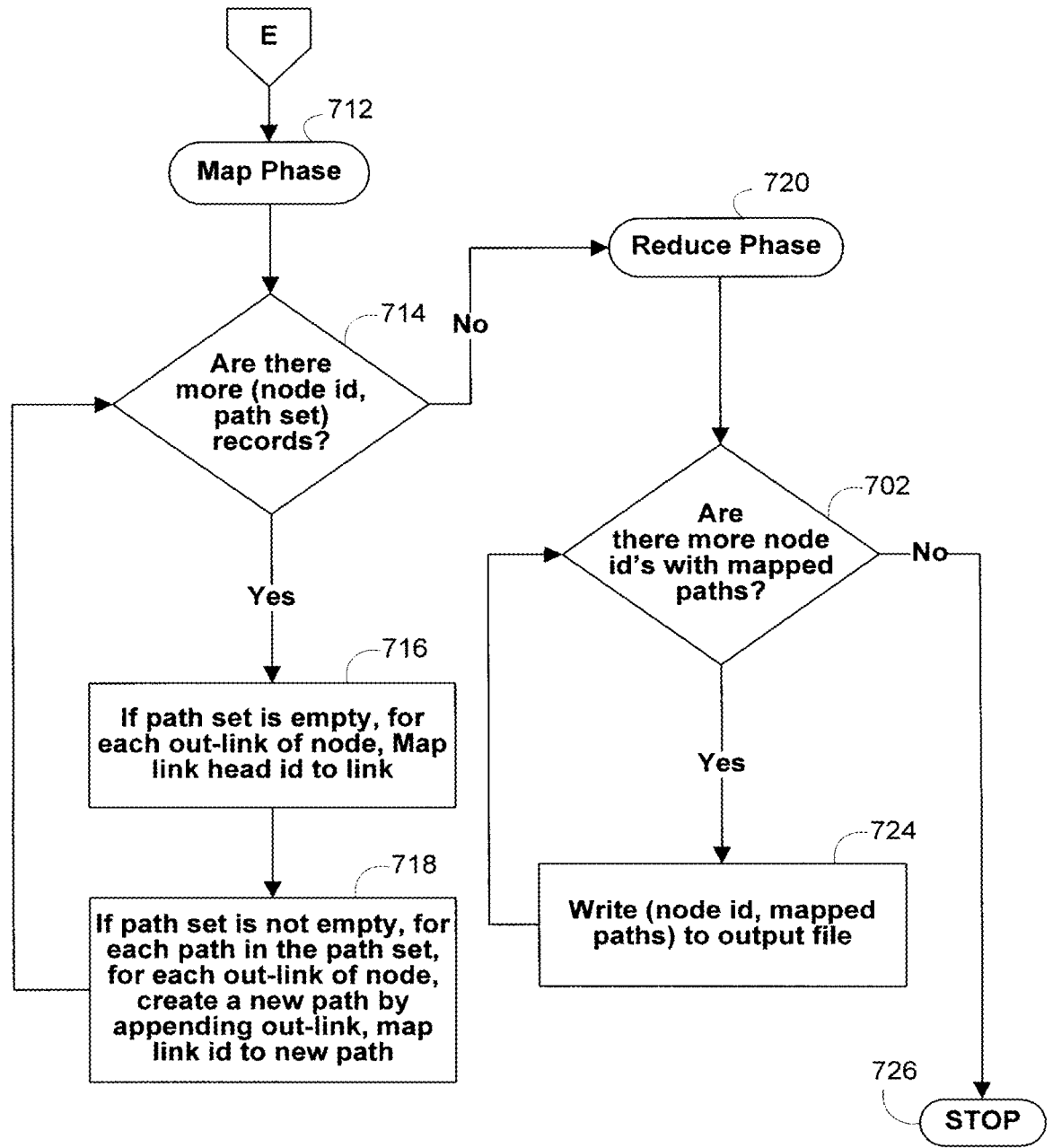

As shown in FIG. 6F, in order to grow paths by one link, map phase 712 may include determining if there are any more (node identifier, path set) records in the output file at step 714. If so, then at step 716, if the path set is empty, for each out-link of the node, a link head identifier may be mapped to the link. At step 718, if the path set is not empty, then for each path n in the path set, and for each out-link of a node, a new path may be created by appending (out-link, map link head identifier) to the new path.

If there are no more records at step 714, then, in reduce phase 720, a determination may be made at step 722 that there are more node identifiers with mapped paths to process. If so, then at step 724, new records of the form (node identifier, mapped paths) (or any other suitable form) may be written to the output file. If there are no more records to process at step 722, the process may stop at step 726.

The process shown in FIG. 6F may be executed one or more times, with the result of growing path lengths by one link for each execution. As shown in FIG. 6A, in some embodiments, three iterations of the process shown in FIG. 6F are used to grow paths by three links. In other embodiments, more or fewer iterations are used.

Figure 6G:
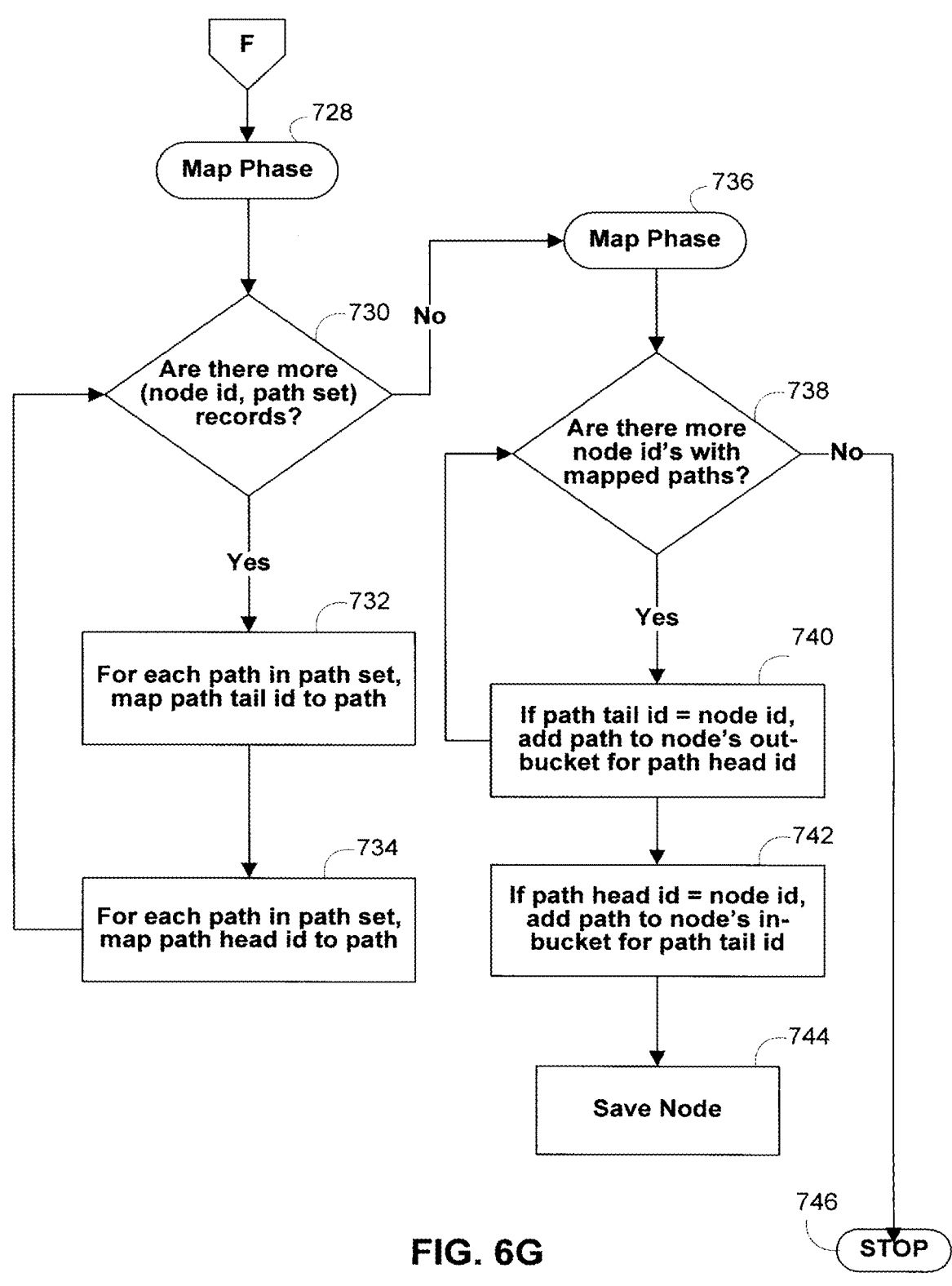

As shown in FIG. 6G, in order to save the new paths, map phase 728 may include determining if there are any more (node identifier, path set) records in the output file at step 730. If so, then at step 732, for each path in the path set, the path tail identifier may be mapped to the path. At step 734, for each path in the path set, the path head identifier may be mapped to the path.

If there are no more records at step 730, then, in reduce phase 736, a determination may be made at step 738 that there are more node identifiers with mapped paths to process. If so, then at step 740, if the path tail identifier equals the node identifier, then that path may be added to the node's "out" bucket for the path head identifier. At step 742, if the path head identifier equals the node identifier, then that path may be added to the node's "in" bucket for the path tail identifier. At step 744, the node may be saved. If there are no more records to process at step 738, the process may stop at step 746.

Figure 6H:
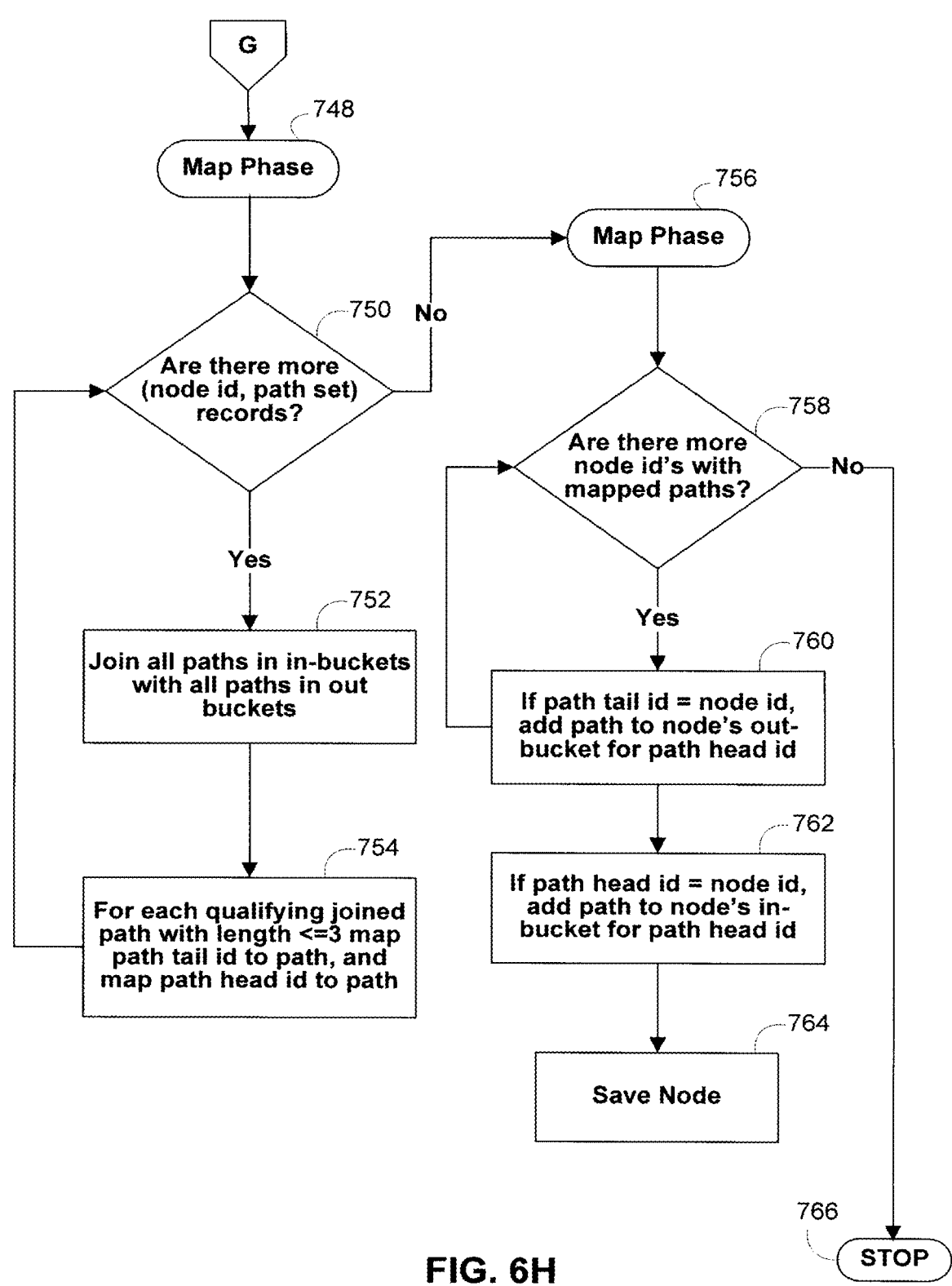

As shown in FIG. 6H, in order to join paths that go through changed nodes, map phase 748 may include determining if there are any more (node identifier, path set) records in the output file at step 750. If so, then at step 752, all paths in "in" buckets may be joined with all paths in "out" buckets. At step 754, for each qualified joined path with length less than or equal to three (or the number of iterations of the process shown in FIG. 6F), the path tail identifier may be mapped to the path, and the path head identifier may also be mapped to the path.

If there are no more records at step 750, then, in reduce phase 756, a determination may be made at step 758 that there are more node identifiers with mapped paths to process. If so, then at step 760, if the path tail identifier equals the node identifier, then that path may be added to the node's "out" bucket for the path head identifier. At step 762, if the path head identifier equals the node identifier, then that path may be added to the node's "in" bucket for the path tail identifier. At step 764, the node may be saved. If there are no more records to process at step 758, the process may stop at step 766.

Figure 7:
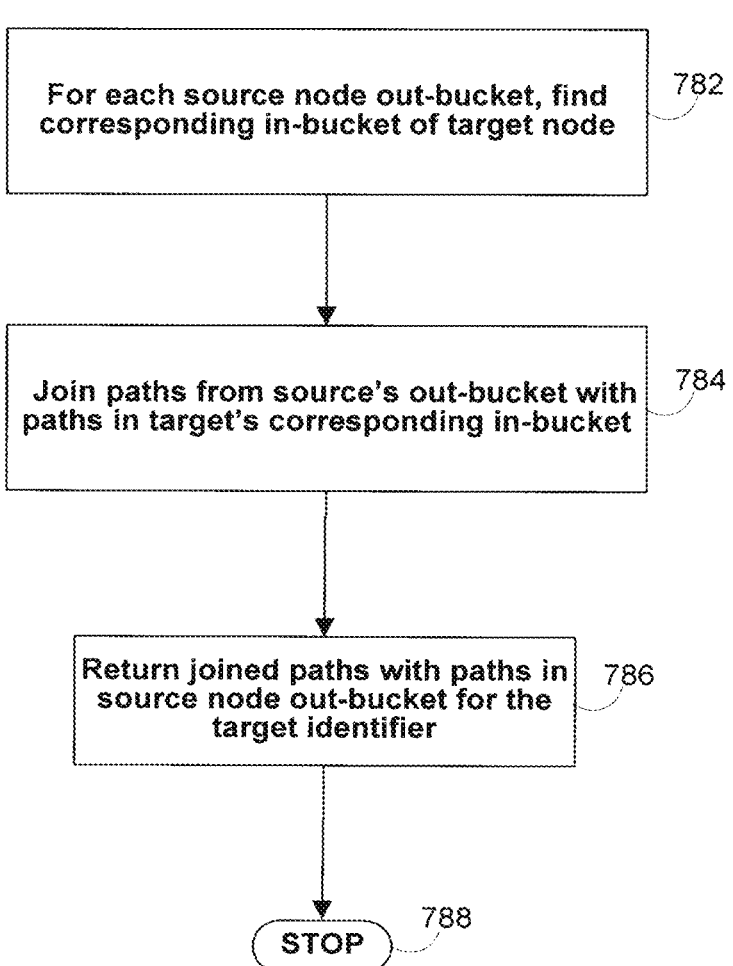
FIG. 7 shows an illustrative process for querying all paths to a target node and computing a network connectivity value in accordance with one embodiment of the invention.

FIG. 7 shows illustrative process 780 for supporting a user query for all paths from a first node to a target node. For example, a first node (representing, for example, a first individual or entity) may wish to know how connected the first node is to some second node (representing, for example, a second individual or entity) in the network community. In the context of trust described above (and where the user connectivity values represent, for example, at least partially subjective user trust values), this query may return an indication of how much the first node may trust the second node. In general, the more paths connecting the two nodes may yield a greater (or lesser if, for example, adverse ratings are used) network connectivity value (or network trust amount).

At step 782, for each source node "out" bucket, the corresponding "in" bucket of target nodes may be located. For example, column 520 of node table 512 (both of FIG. 5B) may be accessed at step 782. Paths from the source node's "out" bucket may then be joined with paths in the target node's "in" bucket at step 784. Joined paths with paths in the source node's "out" bucket may then be returned for the target node's identifier. Process 780 may stop at step 788.

Having returned all paths between the source and target node (of length less than or equal to three, or any other suitable value depending on the number of iterations of the process shown in FIG. 6F), a network connectivity value may be computed. The path weights assigned to the paths returned at step 786 may then be summed. The path weights may be normalized by dividing each path weight by the computed sum of the path weights. A network connectivity value may then be computed. For example, each path's user connectivity value may be multiplied by its normalized path weight. The network connectivity value may then be computed in some embodiments in accordance with:

$$t_{network} = \sum t_{path} \times w_{path} \qquad (7)$$

where $t_{path}$ is the user connectivity value for a path (given in accordance with equation (5)) and $w_{path}$ is the normalized weight for that path. The network connectivity value may then be held or output by processing circuitry of application server 106 (FIG. 1), stored on data store 110 (FIG. 1), or both. In addition, a decision-making algorithm may access the network connectivity value in order to make automatic decisions (e.g., automatic network-based decisions, such as authentication or identity requests) on behalf of the user. Network connectivity values may additionally or alternatively be outputted to external systems and processes located at third-parties. The external systems and processes may be configured to automatically initiate a transaction (or take some particular course of action) based, at least in part, on the received network connectivity values. For example, some locales or organizations may require identity references in order to apply for a document (e.g., a passport, driver's license, group or club membership card, etc.). The identity reference or references may vouch that an individual actually exists and/or is the individual the applicant is claiming to be. Network connectivity values may be queried by the document issuer (e.g., a local government agency, such as the Department of Motor Vehicles or a private organization) and used as one (or the sole) metric in order to verify the identity of the applicant, the identity of an identity reference, or both. In some embodiments, network connectivity values may be used as an added assurance of the identity of an applicant or reference in conjunction with more traditional forms of identification (e.g., document verification and knowledge-based identity techniques). If the document issuer (or some other party trusted by the document issuer) has a set of strong paths from the applicant or reference, this may indicate a higher degree of confidence in the identity of the applicant or reference. Such an indication may be outputted to the third-party system or process.

As another example, credit-granting decisions may be made by third parties based, at least in part, on network connectivity values. One or more queries for a network connectivity value may be automatically executed by the credit-granting institution (e.g., a bank, private financial institution, department store) as part of the credit application process. For example, a query for a network connectivity value between the applicant and the credit-granting institution itself (or its directors, board members, etc.) and between the applicant and one or more trusted nodes may be automatically executed as part of the credit application process. The one or more network connectivity values returned to the credit-granting institution may then be used as an input to a proprietary credit-granting decision algorithm. In this way, a credit-granting decision may be based on a more traditional component (e.g., occupation, income, repayment delinquencies, and credit score) and a network connectivity component. Each component may be assigned a weight and a weighted sum or weighted average may be computed. The weighted sum or average may then be used directly to make an automatic credit-granting decision for the applicant. The weights assigned to each component of the weighted sum or average may be based on such factors as the applicant's credit history with the financial institution, the amount of credit requested, the degree of confidence in the trusted nodes, any other suitable factor, or any combination of the foregoing factors. In some embodiments, the credit-granting or other decisions made by third parties may be made based entirely on network connectivity values.

In practice, one or more steps shown in process 780 may be combined with other steps, performed in any suitable order, performed in parallel (e.g., simultaneously or substantially simultaneously), or removed. In addition, as described above, various threshold functions may be used in order to reduce computational complexity. For example, one or more threshold functions defining the maximum and/or minimum number of links to traverse may be defined. Paths containing more than the maximum number of links or less than the minimum number of links specified by the threshold function(s) may not be considered in the network connectivity determination. In addition, various maximum and/or minimum threshold functions relating to link and path weights may be defined. Links or paths above a maximum threshold weight or below a minimum threshold weight specified by the threshold function(s) may not be considered in the network connectivity determination.

Although process 780 describes a single user query for all paths from a first node to a target node, in actual implementations groups of nodes may initiate a single query for all the paths from each node in the group to a particular target node. For example, multiple members of a network community may all initiate a group query to a target node. Process 780 may return an individual network connectivity value for each querying node in the group or a single composite network connectivity value taking into account all the nodes in the querying group. For example, the individual network connectivity values may be averaged to form a composite value or some weighted average may be used. The weights assigned to each individual network connectivity value may be based on seniority in the community (e.g., how long each node has been a member in the community), rank, or social stature. In addition, in some embodiments, a user may initiate a request for network connectivity values for multiple target nodes in a single query. For example, node $n_1$ may wish to determine network connectivity values between it and multiple other nodes. For example, the multiple other nodes may represent several candidates for initiating a particular transaction with node $n_1$. By querying for all the network connectivity values in a single query, the computations may be distributed in a parallel fashion to multiple cores so that some or all of the results are computed substantially simultaneously.

In addition, queries may be initiated in a number of ways. For example, a user (represented by a source node) may identify another user (represented by a target node) in order to automatically initiate process 780. A user may identify the target node in any suitable way, for example, by selecting the target node from a visual display, graph, or tree, by inputting or selecting a username, handle, network address, email address, telephone number, geographic coordinates, or unique identifier associated with the target node, or by speaking a predetermined command (e.g., "query node 1" or "query node group 1, 5, 9" where 1, 5, and 9 represent unique node identifiers). After an identification of the target node or nodes is received, process 720 may be automatically executed. The results of the process (e.g., the individual or composite network connectivity values) may then be automatically sent to one or more third-party services or processes as described above.

In an embodiment, a user may utilize access application 102 to generate a user query that is sent to access application server 106 over communications network 104 (see also, FIG. 1) and automatically initiate process 780. For example, a user may access an Apple IOS, Android, or WebOs application or any suitable application for use in accessing application 106 over communications network 104. The application may display a searchable list of relationship data related to that user (e.g., "friend" or "follower" data) from one or more of Facebook, MySpace, open Social, Friendster, Bebop, hi5, Rout, PerfSpot, Yahoo! 360, LinkedIn, Twitter, Google+, Really Simple Syndication readers or any other social networking website or information service. In some embodiments, a user may search for relationship data that is not readily listed—i.e., search Facebook, Twitter, or any suitable database of information for target nodes that are not displayed in the searchable list of relationship data. A user may select a target node as described above (e.g., select an item from a list of usernames representing a "friend" or "follower") to request a measure of how connected the user is to the target node. Using the processes described with respect to FIGS. 4A-C, 5A-5C, and 6A-6H, this query may return an indication of how much the user may trust the target node. The returned indication may be displayed to the user using any suitable indicator. In some embodiments, indicator may be a percentage that indicates how trustworthy the target node is to the user.

In some embodiments, a user may utilize access application 102 to provide manual assignments of at least partially subjective indications of how trustworthy the target node is. For example, the user may specify that he or she trusts a selected target node (e.g., a selected "friend" or "follower") to a particular degree. The particular degree may be in the form of a percentage that represents the user's perception of how trustworthy the target node is. The user may provide this indication before, after, or during process 780 described above. The indication provided by the user (e.g., the at least partially subjective indications of trustworthiness) may then be automatically sent to one or more third-party services or processes as described above. In some embodiments, the indications provided by the user may cause a node and/or link to change in a network community. This change may cause a determination to be made that at least one node and/or link has changed in the network community, which in turn triggers various processes as described with respect to FIGS. 4A-C, 5A-5C, and 6A-6H. In some embodiments, a user may utilize access application 102 to interact with or explore a network community. For example, a user may be presented with an interactive visualization that includes one or more implicit or explicit representations of connectivity values between the user and other individuals and/or entities within the network community. This interactive visualization may allow the user to better understand what other individuals and/or entities they may trust within a network community, and/or may encourage and/or discourage particular interactions within a user's associated network community or communities.

In some embodiments, a path counting approach may be used in addition to or in place of the weighted link approach described above. Processing circuitry (e.g., of application server 106 (FIG. 1)) may be configured to count the number of paths between a first node $n_1$ and a second node $n_2$ within a network community. A connectivity rating $R_{n_1 n_2}$ may then be assigned to the nodes. The assigned connectivity rating may be proportional to the number of paths, or relationships, connecting the two nodes. A path with one or more intermediate nodes between the first node $n_1$ and the second node $n_2$ may be scaled by an appropriate number (e.g., the number of intermediate nodes) and this scaled number may be used to calculate the connectivity rating.

Figure 8:
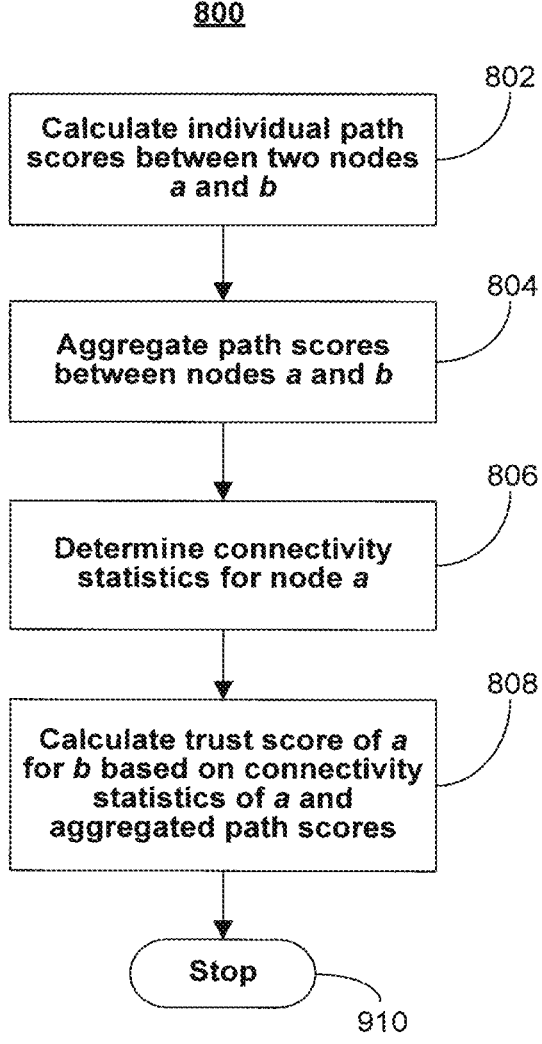
FIG. 8 shows an illustrative process for determining a connectivity or trust score of one node for another node based on connectivity statistics, in accordance with one embodiment of the invention.

In certain embodiments, the connectivity statistics of one or more nodes may be used to determine the connectivity score or rating between one node and another node. FIG. 8 shows illustrative process 800 for determining a connectivity or trust score of a node a for another node b based on connectivity statistics, in accordance with one embodiment of the invention. In step 802, a path score is determined for each path between node a and node b. In some embodiments, path scores may vary as a function of the path length. For example, the path score of a particular path may be calculated in accordance with:

$$PathScore(\text{path}) = \frac{1}{Length(\text{path})^2} \qquad (8)$$

where Length(path) is the length of a particular path between a and b, for example in terms of the number of nodes the path passes through. While in equation (8), the path score is shown to vary inversely according to the square of the length of the path, in other embodiments, the exponent may vary, and/or the path score function may vary according to some other function of path length. In some embodiments, the path score may also be based on one or more specific ratings or weights associated with one or more edges along the path, where an edge is a path between two adjacent nodes. For example, the path score may vary either directly or inversely proportional to the sum or the product of one or more ratings or weights associated with each edge along the path. In some embodiments, only the ratings or weights associated with specific edges may be included, and in other embodiments, ratings or weights associated with all of the edges in a particular path may be considered. For example, in some embodiment, the path score of a particular path may be calculated in accordance with:

$$PathScore(\text{path}) = \frac{\prod_{edge \in path} w_{edge}}{Length(\text{path})^2} \qquad (8a)$$

where $0 \leq w_{edge} \leq 1$

In some embodiments, the path score may vary as one or more functions of the weights associated with one or more edges along the path. For example, in some embodiment, the path score of a particular path may be calculated in accordance with:

$$PathScore(\text{path}) = g(\text{path}) * \prod_{edge \in path} f(w_{edge}) \qquad (9)$$

where f(w) is defined in accordance with:

$$f(w) = \begin{cases} 4, & \text{if } w < 0.2 \\ 2, & \text{if } 0.2 \leq w < 0.4 \\ 1, & \text{if } 0.4 \leq w < 0.8 \\ 2, & \text{if } 0.8 \leq w < 1.0 \\ 4, & \text{if } w < 1.0 \end{cases} \qquad (10)$$

and g(path) is defined in accordance with:

$$g(\text{path}) = \begin{cases} -1, & \exists\, w_{edge} < .6 \\ 1, & \text{otherwise} \end{cases} \qquad (11)$$

After path scores for one or more of the paths linking nodes a and b have been calculated in step 802, the calculated path scores may be aggregated in step 804 to result in a connectivity value between the two nodes. The connectivity value between nodes a and b may be given in accordance with:

$$Connectivity(a, b) = \sum_{p \in Paths(a,b)} PathScore(p) \qquad (12)$$

where Paths(a, b) represent one or more of the paths between nodes a and b and PathScore(p) represents the path score of one of the paths in Paths(a, b) (i.e., one of the paths between nodes a and b). While in equation (12), the connectivity between nodes a and b is a summation of path scores associated with one or more paths between a and b, in other embodiments, the connectivity may be a product or any other function of the path scores associated with one or more paths between a and b.

In step 806, the connectivity statistics for node a may be determined. First, a node sample may be selected for node a. In one embodiment, the node sample may include nodes that meet some network parameter with respect to node a. For example, every individual node with a network distance less than or equal to some number x from node a (i.e., a path exists from the node to node a with length less than or equal to x) may be included in the node sample. For example, in certain embodiments, every individual node with a network distance less than or equal to 3 from node a may be included in the node sample. In some embodiments, the node sample may include a certain number of individual nodes randomly selected from the population. In some embodiments, the node sample may include a certain number of individual nodes visited via a random exploration of the network, starting from node a, in a manner similar to a graph traversal. In some embodiments, the node sample may include a certain number of nodes that are directly connected to a. For example, in certain embodiments, the node sample may include every node with a network distance of 1 from node a. In other embodiments, any other suitable method for selecting individual nodes in the network may be used to create the node sample.

Once the sample has been selected, a mean path score Ja, in accordance with:

$$\mu_a = \frac{1}{|S|} \sum_{y \in s} Connectivity(a, y) \qquad (13)$$

and a standard deviation $\sigma_a$, in accordance with:

$$\sigma_a = \sqrt{\frac{1}{|S|} \sum_{y \in s} (Connectivity(a, y) - \mu_a)^2} \qquad (14)$$

may be calculated for node a, where S is the number of individual nodes in the sample and Connectivity(a, y) is the connectivity (as described above in equation (12) between node a and a node y in the sample S.

Once the connectivity statistics have been determined for node a, the trust or connectivity score (not to be confused with the connectivity described above in equation (12)) of node a for node b may be determined in step 808, based on the connectivity statistics of node a and the connectivity between node a and node b. In one embodiment, the trust or connectivity score may be determined as a function of the area under the normal curve for $\mu_a$ and $\sigma_a$. For example, let n be the number of standard deviations the connectivity between node a and node b is away from the mean path score $\mu_a$:

$$n = \frac{Connectivity(a, b) - \mu_a}{\sigma_a} \qquad (15)$$

The trust or connectivity score between node a and node b TrustScore(a, b) may then be determined as a function of the area under the normal curve, in accordance with:

$$TrustScore(a, b) = 0.5 + \frac{erf\left(\frac{n}{\sqrt{2}}\right)}{2} \qquad (16)$$

In some embodiments, the trust score may be used as is, be multiplied by 100 and presented as a percentage, or be multiplied by 1000 and presented as a number. The process 800 may then stop at step 810.

Figure 9:
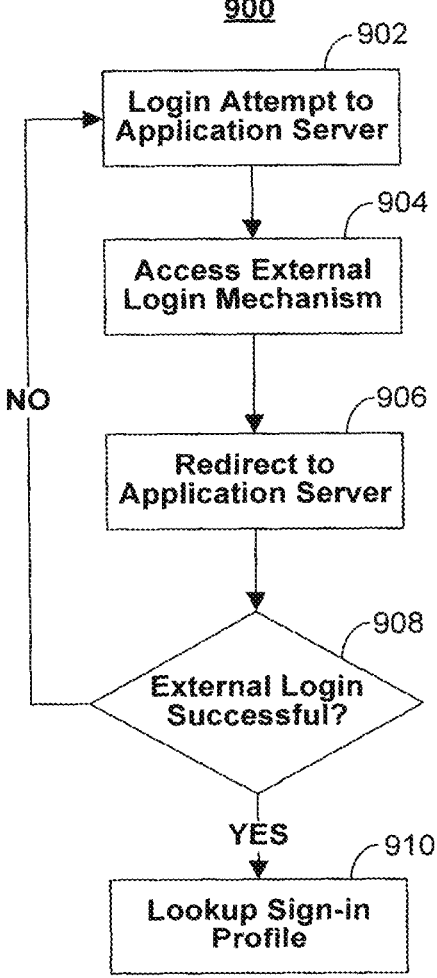
FIG. 9 shows an illustrative process for supporting user sign-in profiles in accordance with one embodiment of the invention.

FIG. 9 shows illustrative process 900 for logging into the connectivity system. At step 902, a user request to login may be received. For example, application server 106 (FIG. 1) may receive a login attempt from access application 102 (FIG. 1). At step 904, one or more external login mechanisms may be accessed. For example, the user may be redirected to a login mechanism associated with an email or social networking service, like Facebook, Hotmail, Gmail, Twitter, or the like. After the external login mechanism is accessed, the user may be redirected to the application server at step 906. For example, the user may be redirected back to the page associated with application server 106 (FIG. 1). At step 908, a determination is made whether the external login mechanism was completed successfully. For example, the external login mechanism may return a token, timestamp, username, handle, email address, unique identifier, cryptographic hash (e.g., of a username or unique identifier associated with the user), any other identity information, or any combination of the foregoing in the URL to the redirected application server page. The information may be verified using any known authentication protocol. If the external login mechanism was successful, then at step 910 application server 106 (FIG. 1) may lookup a corresponding sign-in profile in order to identify the user. For example, the provider of the external login mechanism may pass its name as a string along with a unique identifier to application server 106 (FIG. 1). Application server 106 (FIG. 1) may then look this information up in table 532 (FIG. 5C). If a corresponding sign-in profile record is located, this profile may be used to identify the user.

In practice, one or more steps shown in process 900 may be combined with other steps, performed in any suitable order, performed in parallel (e.g., simultaneously or substantially simultaneously), or removed.

Figure 10:
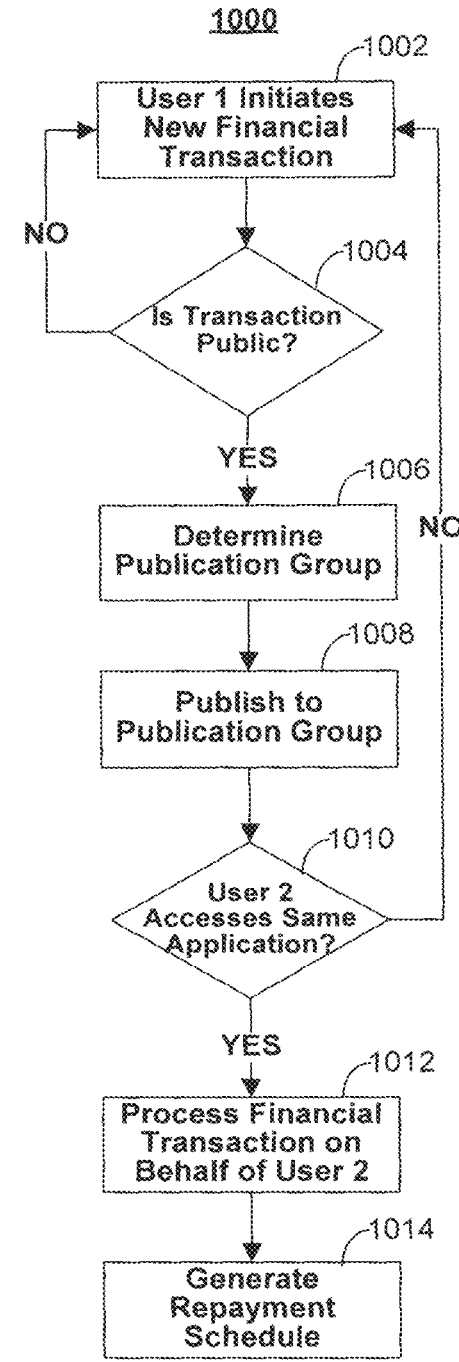
FIG. 10 shows an illustrative process for facilitating financial transactions in accordance with one embodiment of the invention.

FIG. 10 shows illustrative process 1000 for facilitating a financial transaction. Although the described embodiments sometimes refer to a loan or donation financial application or transaction, the present invention may be used to facilitate any type of financial transaction. For example, financial transactions may include purchases, sales, donations of cash, donations of property, loans, mortgages, liens, credit applications, credit-granting decisions, or any other type of financial transaction involving the change in status of finances or change in legal status between two or more individuals, nodes, users, institutions, organizations, pieces of property, tangible assets, or things. At step 1002, a first user may initiate a new financial transaction. For example, the user may access a loan or donation application at step 1002. The application may include a series of electronic forms (e.g., web pages) to be filled out by the user and submitted for approval. At step 1004, a determination is made whether the transaction is a public or private transaction. In some embodiments, users may designate specific transactions as public or private. In some embodiments, the financial application itself may also determine whether a transaction is public or private. For example, charitable contributions may always be designated as public transactions whereas personal loans may always be designated as private transactions.

At step 1006, a publication group is determined. For example, all users or nodes meeting or exceeding a minimum threshold connectivity value and/or not exceeding a maximum threshold connectivity value with the first user may be added to the publication group. As another example, all nodes or users meeting or exceeding some minimum threshold path weight and/or not exceeding a maximum threshold path weight to the first user may be added to the publication group. In some embodiments, the first user is given an opportunity to select the publication group or groups to which the user wants transaction information to be published. For example, the user may specify custom connectivity value maximum/minimum thresholds, custom path weight maximum/minimum thresholds, or both. This threshold value (or values) may then be used to determine the appropriate publication group. The user may also be given an opportunity to view a listing of publication group members, add additional members, and remove existing members, if desired.

In some embodiments, publication groups may be further refined using additional information known about other nodes or users in the network. For example, a first user may initiate a donation transaction for a wildlife refuge. In determining the appropriate publication group, nodes with high connectivity values with a known wildlife affinity or support group may be automatically added to the publication group, whether or not they meet the path weight or connectivity threshold values. Application server 106 (FIG. 1) may automatically compare attribute flags and other metadata associated with the financial application (for example, stored in the description field in financial application table 544 (FIG. 5C)) with attributes known about other nodes or users in the network and use the results of this comparison in adding additional members to, or removing otherwise qualifying members from, publication groups. For example, "LIKE" and "DISLIKE" flags (as described above with regard to FIG. 5C) may be read from financial application table 544 (FIG. 5C) and used to refine publication group membership using information other than (or in addition to) connectivity values and path weights. Users matching a "LIKE" flag may be automatically added to the publication group whether or not they meet one or more threshold values in some embodiments. In other embodiments, users or nodes must both match any defined "LIKE" flag and meet applicable threshold values in order to be added to a publication group. Similarly, users matching a "DISLIKE" flag may be automatically removed from the publication group even if they meet one or more threshold values in some embodiments.

At step 1008, transaction information may be published to the selected publication group or groups. Publication may take a variety of forms, including email messages, text messages, voicemails, listings on a homepage, listings on a profile page, listings on a shared-access or community page, postings to a discussion forum, notification messages, other suitable notifications, or any combination of the foregoing. The type of notifications may be dependent on the active sign-in profile, in some embodiments. For example, if the active sign-in profile is for an email account provider, at least some of the notifications may take the form of email messages. If the active sign-in profile is for a social networking service provider, at least some of the notifications may take the form of provider notifications, wall postings, profile page postings, or the like.

At step 1010, a determination is made whether a second user (e.g., a member of the publication group) has accessed the same financial application. In some embodiments, the second user may access the same financial application directly from the publication. For example, a published notification may include a link (e.g., hyperlink) to the financial application. The second user may directly access the financial application by activating the link (e.g., by clicking or selecting the link). In some embodiments, at least some of the information from the first user's financial transaction is automatically carried over to the second user's transaction, allowing the second user to efficiently execute a partly or wholly-identical transaction as the first user. For example, if the transaction is a donation, the donation amount (or more generically the principal) from the first user's transaction may be pre-populated in the electronic forms associated with the second user's transaction. In that way, users may be encouraged to donate (or borrow) the same amount as the first user. In some embodiments, users are not allowed to change pre-populated information (e.g., so as to encourage a minimum level of charitable giving). In other embodiments, pre-populated information may be changed by the user. If at step 1010 the second user does access the same financial application, a new financial transaction may be processed on behalf of the second user at step 1012. If applicable, a repayment schedule may also be automatically generated at step 1014. For example table 546 may be automatically populated, if the financial transaction is a loan.

In processing financial transactions, connectivity values may be used to determine eligibility of the lender, borrower, or both (in the case of a loan transaction). For example, eligible borrowers may need to meet a threshold connectivity value with the lender, the lending institution, one or more officers or directors of the lending institution, or any combination of the foregoing. In addition, as described above, third-party processes may make automatic transaction decisions based, at least in part, the connectivity values. For example, in some embodiments, at least three threshold network connectivity values may be defined, $N_1$, $N_2$, and $N_3$, where $N_1 > N_2 > N_3$. Potential borrowers may be automatically approved for the financial transaction if they meet the threshold network connectivity value $N_1$. If borrowers fail to meet the threshold network connectivity value $N_1$, but meet threshold network connectivity value $N_2$, then a composite score based on the actual network connectivity value and a third-party ratings agency (such as a credit ratings bureau score) may be used to determine the approval status for the financial transaction. If potential borrowers do not meet threshold network connectivity value $N_2$, but meet threshold network connectivity value $N_3$, these potential borrowers may be referred for manual processing. If potential borrowers do not meet threshold network connectivity value $N_3$, these potential borrowers may be automatically denied participation in the financial transaction. The values of $N_1$, $N_2$, and $N_3$ may be specified by the lending institution, an officer of the lending institution, or the financial application.

In practice, one or more steps shown in process 1000 may be combined with other steps, performed in any suitable order, performed in parallel (e.g., simultaneously or substantially simultaneously), or removed. In some embodiments, process 1000 may be used to facilitate other transactions, such as identity assessments, security risk assessments, or any other transaction that can take advantage of user connectivity values.

In some embodiments, virtual and/or electronic currency systems based on network connectivity and/or trust values may be used to facilitate transactions. These virtual currency systems may provide means for facilitating transactions between a node in a network and another node within the same network, in a different network, or not in a network at all. In some embodiments, a single virtual currency system may be associated with a particular network, or may be associated with a plurality of networks. For example, different networks may each be associated with the same or different virtual currency systems. The virtual/electronic currencies in these virtual currency systems may be in the form of points, or any other suitable markers or units. A node may exchange these virtual/electronic currency units for goods, services, or other currencies, with other nodes within the same network, in a different network, or not in a network at all. In an embodiment, a node in a virtual currency system may be implemented substantially similar to node 302 in a distributed storage/computation network such as distributed storage/computation network 300 (FIG. 3).

In some embodiments, each virtual currency system may be linked to other currency systems via one or more exchange rates. These other currency systems may be implemented on any suitable combination of software and hardware, such as the hardware used to implement distributed storage/computation network 300 (FIG. 3). For example, a unit of a virtual currency may be valued at some fraction or multiple of a different virtual currency. In some embodiments, a unit of a virtual currency may be valued at some fraction or multiple of a different currency system, such as a currency backed and/or issued by a government, nation, or other political, business, or other entity. The exchange rate between a particular virtual currency and some other currency may be static or dynamic. For example, the exchange rate between a virtual currency and another currency may be set at a static value, periodically reset to different static values, or varied continuously. The exchange rate may be determined based upon the values or one or more parameters, such as the network connectivity of one or more nodes in the network, the exchange rate(s) between other currencies, or any other parameter.

In certain embodiments, one or more nodes within a network with a virtual currency system may issue a virtual currency. For example, a node in a network may generate and/or distribute virtual currency units for facilitating transactions within the network. In some embodiments, an entity at least partially responsible for the administration of a network with a virtual currency system may issue, generate, and/or distribute virtual currency units. Optionally, each node in a network with a virtual currency system may be able to generate virtual currency units. Different nodes may generate different types of virtual currency units, or different nodes may generate the same type of virtual currency units.

Virtual currencies in a network community may be generated and/or distributed based on network connectivity/trust values between different nodes within the network community. In some embodiments, a node may be provided with virtual currency units at a rate commensurate with one or more network connectivity/trust values associated with that node. In some embodiments, a network connectivity/trust values may be calculated or computed according to the connectivity value calculation or computation described with respect to equations (1) through (5), the network connectivity value calculation or computation described with respect to equation (7), the connectivity value calculation or computation between two nodes described with respect to equations (8) through (12), the calculation or computation of connectivity statistics described with respect to equations (13) through (16), or any suitable combination of these calculations or computations. In some embodiments, these calculations and computations for determining connectivity information may be performed in a distributed fashion across the processors in distributed graph storage/computation system 300 (FIG. 3). In some embodiments, the processing circuitry included in application server 106 may perform any of the calculations and computations in connection with determining network connectivity.

For example, a node with a large composite network connectivity value may be provided with or accumulate virtual currency units at a greater rate than a node with a small composite network connectivity value. As another example, a node with larger incoming network connectivity/trust values may be provided with or accumulate virtual currency units at a greater rate than a node with smaller incoming network connectivity/trust values. Optionally, the rates at which virtual currency is provided/accumulated may also vary based on outgoing network connectivity/trust values. In some embodiments, the amount of virtual currency accumulated or currently possessed by a node may be directly associated to its current network connectivity/trust values. For example, if a node gains (or loses/spends) virtual currency units, one or more of its network connectivity/trust values may increase (or decrease). In some embodiments, the network connectivity/trust values of a node may be able to increase as a result of gaining virtual currency units, but may not be able to decrease as a result of losing or spending virtual currency units. Similarly, in other embodiments, the network connectivity/trust values of a node may be able to decrease as a result of losing/spending virtual currency units, but may not be able to increase as a result of gaining virtual currency units.

In some embodiments, nodes and/or entities associated with a network may generate and/or distribute virtual currency instruments with static and/or dynamic virtual currency values. For example, a node may be able to generate a virtual currency instrument for use in facilitating transactions for goods and/or services, where the value of the virtual currency instrument is linked to the current (or future, or past) value of one or more network connectivity/trust values associated with the node.

Each equation presented above should be construed as a class of equations of a similar kind, with the actual equation presented being one representative example of the class. For example, the equations presented above include all mathematically equivalent versions of those equations, reductions, simplifications, normalizations, and other equations of the same degree.

The above described embodiments of the invention are presented for purposes of illustration and not of limitation. The following claims give additional embodiments of the present invention.

What is claimed is:

1. A system comprising:
a distributed computation network comprising a plurality of clusters of processors, wherein each of the plurality of clusters of processors comprises a plurality of processors and each of the plurality of clusters is registered in a cluster registry;
an application server configured to receive communications via a communication network from a plurality of access applications;
the application server configured to distribute information regarding communications from access applications to one or more of the plurality of clusters registered in a cluster registry;
the one or more of the plurality of clusters configured to:
determine, using a plurality of processors, at least one network connectivity value associated with a computer and a mobile device of a network of a set of nodes as a function of an aggregation of respective paths scores of respective paths of a set of paths between the computer and the mobile device, wherein the path score is associated with a path of the set of paths,
wherein the respective path scores are determined as a function of respective lengths of the respective paths between the computer and the mobile device,
wherein, to facilitate determination of the at least one network connectivity value, respective tasks associated with the determination of the at least one network connectivity value are distributed to respective processors within the one or more of the plurality of clusters, and wherein the respective tasks are performed by the respective processors;
present, by one or more of the processors altering an electronic database, a virtual marker related to the computer for use at least within the network, wherein the virtual marker is presented based at least in part on the at least one network connectivity value; and
permit, by manipulation of the electronic database, the computer to distribute the virtual marker to a second computer of the set of nodes.

2. The system of claim 1, wherein a value of a unit of the first virtual marker system is based at least in part on the at least one network connectivity value.

3. The system of claim 1, wherein a first value of a first unit of the first virtual marker system is based at least in part on a second value of a second unit of a second virtual marker system that is different from the first virtual marker system.

4. The system of claim 1, wherein the distributed computing network is further configured to provide a marker of the first virtual marker system, wherein the marker is issued by the computer, wherein a value of the marker is expressed in units of the first virtual marker system, and wherein the value of the marker is determined based at least in part on the at least one network connectivity value.

5. The system of claim 4, wherein the distributed computing network is further configured to adjust the value of the marker in response to a change in the at least one network connectivity value.

6. The system of claim 1, wherein the distributed computing network presents the first virtual marker system, in part, by presenting a quantity of markers of the first virtual marker system to the computer, and wherein the quantity is determined based at least in part on the at least one network connectivity value.

7. The system of claim 1, wherein a value of or associated with the at least one network connectivity value is based at least in part on a quantity of markers of the first virtual marker system accumulated by the computer.

8. The system of claim 1, wherein, to facilitate determination of the at least one network connectivity value, the distributed computing network is further configured to compute the at least one network connectivity value as a function of an equation:

$$t_{network} = \sum t_{path} \times w_{path}$$

wherein $t_{path}$ is a user connectivity value for the path with at least one intermediate node between the computer in the network and the mobile device in the network, and wherein $w_{path}$ is the normalized weight for the path.

9. The system of claim 1, wherein, to facilitate determination of the at least one network connectivity value, the distributed computing network is further configured to compute the at least one network connectivity value according to an equation:

$$Connectivity(a, b) = \sum\nolimits_{p \in Paths(a,b)} PathScore(p),$$

wherein Paths(a, b) is at least one path between a node a in the network and a node b in the network, wherein node a is the computer and node b is the mobile device, and wherein PathScore(path) represents the path score of the path in Paths(a, b).

10. The system of claim 9, wherein the distributed computing network is further configured to compute the Pathscore(path) according to another equation:

$$Pathscore(\text{path}) = g(\text{path}) * \prod_{edge \in path} f(w_{edge}),$$

wherein $w_{edge}$ is a weight of an edge in one of the paths in Paths(a, b), wherein f(w) is defined according to a first function:

$$f(w) = \begin{cases} 4, & \text{if } w < 0.2 \\ 2, & \text{if } 0.2 \leq w < 0.4 \\ 1, & \text{if } 0.4 \leq w < 0.8 \\ 2, & \text{if } 0.8 \leq w < 1.0 \\ 4, & \text{if } w = 1.0 \end{cases},$$

and wherein g(path) is defined according to a second function:

$$g(\text{path}) = \begin{cases} -1, & \exists\, w_{edge} < .6 \\ 1, & \text{otherwise} \end{cases}.$$

\* \* \* \* \*